United States Patent [15] 3,697,949
Carter et al. [45] Oct. 10, 1972

[54] ERROR CORRECTION SYSTEM FOR USE WITH A ROTATIONAL SINGLE-ERROR CORRECTION, DOUBLE-ERROR DETECTION HAMMING CODE

[72] Inventors: William C. Carter, Ridgefield, Conn.; Keith A. Duke, Wappinger Falls; Donald C. Jessep, Jr., Poundridge, both of N.Y.

[73] Assignee: International Business Machines Corporation, Armonk, N.Y.

[22] Filed: Dec. 31, 1970

[21] Appl. No.: 103,262

[52] U.S. Cl...........................340/146.1 AL, 235/153
[51] Int. Cl...............................................G06f 11/12
[58] Field of Search.........340/146.1, 172.5; 235/153

[56] References Cited

UNITED STATES PATENTS

| | | |
|---|---|---|
| 3,568,153 | 3/1971 | Kurtz................340/146.1 AL |
| 3,573,728 | 4/1971 | Kolankowsky...340/146.1 AL |

*Primary Examiner*—Charles E. Atkinson
*Attorney*—Hanifin and Jancin and Roy R. Schlemmer, Jr.

[57] ABSTRACT

The present invention relates to a highly-efficient system for performing single-error correction when utilized with a memory system including a memory equipped with error-detection circuitry for use with rotationally-encoded, single-error correction, double-error detection Hamming coded data wherein said memory system circuitry includes means for developing syndrome bits, the patterns of which indicate faulty operation. Hardware is included for first identifying the specific byte which contains the error and still further hardware is provided to locate the particular bit which is erroneous. By efficient use of the rotational characteristic of the present coding scheme, correction is made only when necessary and only that hardware necessary to correct a single byte is provided in the correction circuitry.

14 Claims, 53 Drawing Figures

INVENTORS
WILLIAM C. CARTER
KEITH A. DUKE
DONALD C. JESSEP, JR.
BY [signature]
ATTORNEY

| | | | |
|---|---|---|---|
| FIG.6A | FIG.6B | FIG.6C | FIG.6D |
| FIG. 6E | FIG. 6F | FIG. 6G | FIG. 6H |

WRITE ACCESS

READ ACCESS

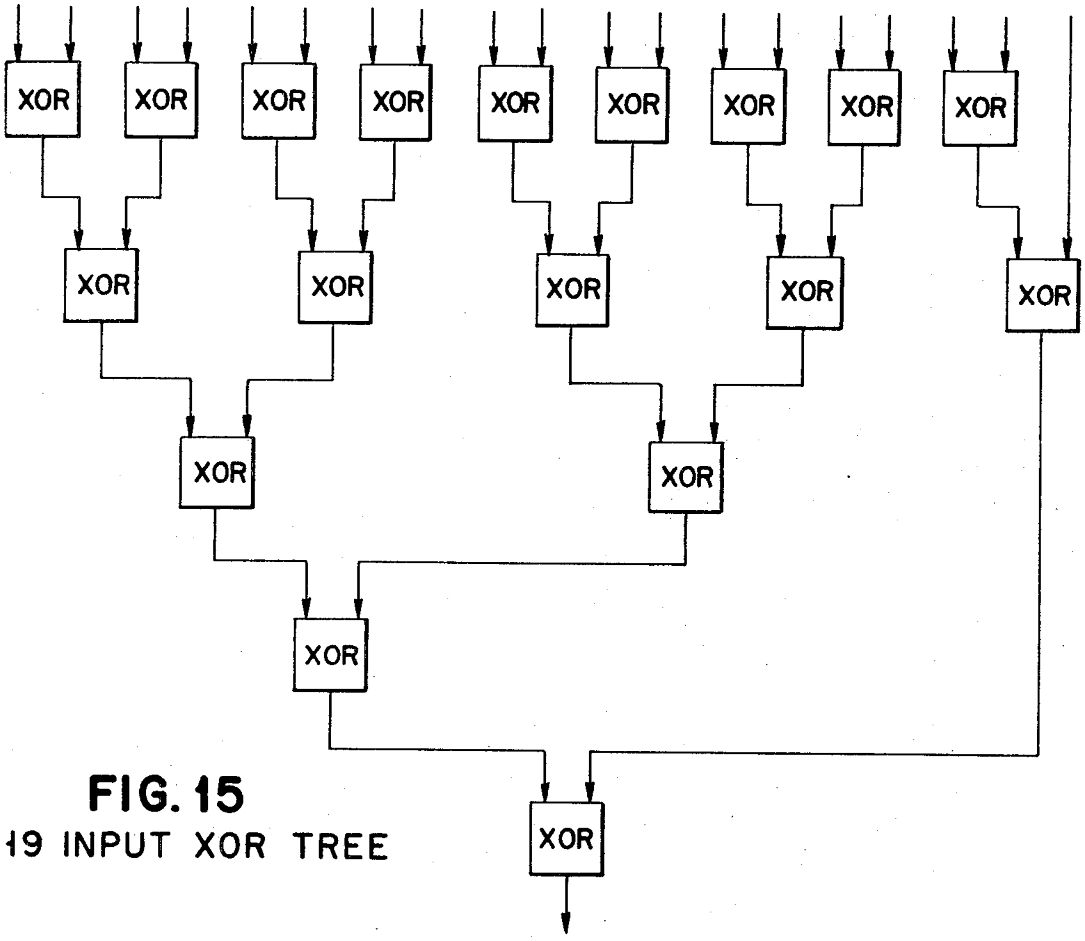
FIG. 15
19 INPUT XOR TREE
FIG. 19
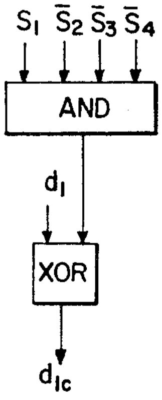
FIG. 16
| | 1 | 2 | 3 | 4 | 5 | 6 | 7 | 8 |
|---|---|---|---|---|---|---|---|---|
| 1 | 1 | 1 | 1 | 1 | 1 | 1 | 1 | 1 |
| 2 | 1 | | 1 | | 1 | | | 1 |
| 3 | 1 | 1 | | 1 | | | | 1 |
| 4 | | 1 | 1 | | | 1 | 1 | 1 |
| 5 | | | | 1 | 1 | 1 | | 1 |
| 6 | | | | | | | 1 | |
| 7 | | | | | | | | |
| 8 | | | | | | | | |

ERROR CORRECTION SYSTEM FOR USE WITH A ROTATIONAL SINGLE-ERROR CORRECTION, DOUBLE-ERROR DETECTION HAMMING CODE

CROSS REFERENCE TO RELATED APPLICATIONS

U.S. Pat. Application Ser. No. 51,302 of the present inventors, W.C. Carter et al, filed on June 30, 1970, and entitled "A System for Translating To and From Single-Error Correction, Double-Error Detection Hamming Code and Byte Parity Code," discloses a memory system wherein single-error correction/double-error detection coding is utilized and wherein the necessary hardware is disclosed for developing the necessary syndrome bits required for error correction. However, in this application, the actual correction is done with the complete gating of the complete data word through the connection circuitry in parallel with the necessary generation of each proper bit utilizing said generated syndromes.

BACKGROUND OF THE INVENTION

For many years the computer industry has relied upon the now familiar three-dimensional random access magnetic core type of memory as its high speed working storage. Inherent with these memories and their manufacturing processes was a high degree of reliability. In other words, it would be very rare for a core memory to come out of the manufacturing process that was not essentially 100 percent usable. This is due to a number of factors. The primary factor is that each individual bit storage location or core is separately testable before it is assembled into the final memory.

Thus, individual bit failures in magnetic core memories are somewhat unusual. The type of failures that normally occur in this sort of a memory will affect a complete plane row or column of the memory due usually to some wiring or driver breakdown. This obviously necessitates a complete remanufacture or fix of the memory.

However, with the advent of newer or extremely high-speed solid-state memories generally referred to as the large scale integrated circuit memories, it is not normally possible to inspect individual bit storage locations as they are generally made on either a plane or a complete three-dimensional entity basis. Thus, it is intrinsic in the manufacturing process that such a memory can normally not be tested until it is completely fabricated and assembled. It is accordingly not possible to monitor the manufacturing process of such memories on a step-by-step basis but the final testing must literally be delayed until well along in the manufacturing process. Once in operation it is not possible to cast out individual bit storage locations. It may thus be readily seen that it is desirable to have some way of tolerating a certain percentage of failure in this type of a memory. One way of avoiding bad storage locations is of course mapping around said storage locations as is well known, but this requires great amounts of hardware and programming effort on the part of the overall system supervisor in assigning storage locations to tasks. However, this is the technique that must be resorted to in the case of massive errors in such a memory where a large section is rendered unusable. However, another possible way of avoiding, for example, errors in a memory word is the use of error-correcting codes such as those of Hamming wherein extra bits are provided with a data word and by logically combining the data bits with the extra or check bits, it may be determined whether or not a data word read out is erroneous and if the errors detected can be corrected within the capabilities of the code.

The coding techniques of Hamming have been known and used widely in the communications industry for many years. However, such error detection and correction has seen rather limited use in the computer field due to the expense both in terms of providing extra bit storage in the computer memories and also in the rather large quantities of additional logical circuitry which has been necessary in the past to effect the necessary error detection and correction.

It should be noted that in a computer system when data is being transferred from the various portions of the computer such as the various short-term registers, computational circuits, etc. parity checking is used to check for the correctness of data. Whenever a parity error is detected, a signal is provided and a retry or retransmission of the data is called for; and in the great majority of cases, this will provide correct information. However, in the case of memories, where an error is normally not due to circuit transients as in the former case, parity checking would obviously provide an error indication; but since most memory failures are hard failures, there is no way of identifying the exact bit failure location with parity-checking techniques. It is for these reasons that some error-correcting codes, such as Hamming codes, must be utilized if some form of error correction is to be obtained. However, as stated before, the majority of error correction schemes known in the computer industry have required excessive and expensive quantities of logical circuitry. Also, in most prior art schemes separate parity generators had to be used in addition to the error detection and correction circuitry to parity encode data being transmitted from a memory to some other location in the system. Additionally, Hamming encoding circuitry had to be provided to generate the necessary error-correcting check bits to be stored in memory with each new data word being written herein. Thus, it may readily be seen that the provision of both error detection and correction circuitry plus the various parity encoding and decoding circuits totally comprise large quantities of logical circuitry which in the past have all been separate units.

For the previously stated reasons, error-detection and correction circuitry have been provided in the past only in extremely expensive, highly reliable computer systems where the user was willing to pay the high price necessary to obtain desired error detection and correction together with more conventional parity checking features both in the memory and elsewhere in the system.

In previously-referenced copending application Ser. No. 51,302, a novel multi-purpose SEC/DED encoding and decoding circuit design was disclosed, however, the disclosed correction scheme involved massive parallel-correction circuitry wherein the entire data word was flushed through the correction circuit. Such a parallel correction apparatus is thus very expensive in terms of hardware and also required many additional circuits which could themselves become faulty.

SUMMARY AND OBJECTS

It has now been found that a very efficient error-correction circuit may be provided for use with computer storage elements or memories and which is especially adaptable for use with large-scale integrated memories wherein data is stored in said memories utilizing a Hamming type of SEC/DED code. The particular code utilized must have rotational properties. Utilizing the rotational characteristics of the code, only the byte in error is corrected and the actual bit correction may be accomplished utilizing a single set of interconnection circuits connected to the error-detection circuitry and more specifically, to the syndrome register forming final outputs thereof. The use of the single set of correction-circuit connections is allowed by the rotation of the contents of said syndrome register which in turn is made feasible by the rotational characteristics of the actual code. By being able to identify the byte in error immediately upon generation of the syndrome bits, it is then possible to either correct the byte in error immediately at considerable savings in circuitry or by utilizing the rotational characteristic of the code and the syndrome bits to rotate the contents of the syndrome register to achieve the proper correction pattern wherein it is only necessary to provide in effect correction circuitry for a single byte rather than for the entire data word.

It is thus a primary object of the present invention to provide single data bit error correction in a computer system wherein data is stored utilizing a rotational SEC/DED Hamming code wherein the generated syndrome bits are examined and an immediate indication of the incorrect byte is generated. It is another object to provide such a system wherein the generated syndrome bits are placed in a rotational register wherein the contents of said register may in effect be rotated each time a new byte is examined for potential correction.

It is yet another object of the invention to provide such a system wherein a minimum amount of correction circuitry is provided utilizing the rotational characteristics of the correction code and resulting syndrome bit patterns.

It is a still further object of the invention to provide such a system wherein all bytes of the data word are examined sequentially and the incorrect byte is automatically corrected.

It is a still further object to provide such a system wherein all bytes of the data word are examined sequentially until the incorrect byte has been corrected whereupon the correction procedure is terminated.

It is still another object of the invention to provide such a system wherein the incorrect byte is immediately identified and corrected utilizing special circuitry for immediately accessing the proper correction pattern from the syndrome bits.

It is another object of the invention to provide such a system wherein the byte in error is identified and utilizing the syndrome bit pattern, an address in a special local store is generated wherein the correction pattern is directly accessible and sent to the arithmetic and logical unit of the system together with the incorrect byte for correction.

The foregoing and other objects, features and advantages of the invention will be apparent from the following more particular description of several embodiments of the invention, as illustrated in the accompanying drawings.

DESCRIPTION OF THE DRAWINGS

FIG. 1 comprises a functional block diagram of an overall memory system including the error-correction system of the present invention.

FIG. 15 comprises a logical schematic diagram of one of the nineteen inputs EXCLUSIVE-OR trees shown in the FIG. 6D wherein each said trees has nineteen logical inputs for the particular data configuration described.

FIG. 16 illustrates a single block of a parity-check or connection matrix.

FIG. 19 comprises a logical schematic diagram of the correction circuitry for a single data bit.

DESCRIPTION OF THE DISCLOSED EMBODIMENTS

Figures 1, 1A:
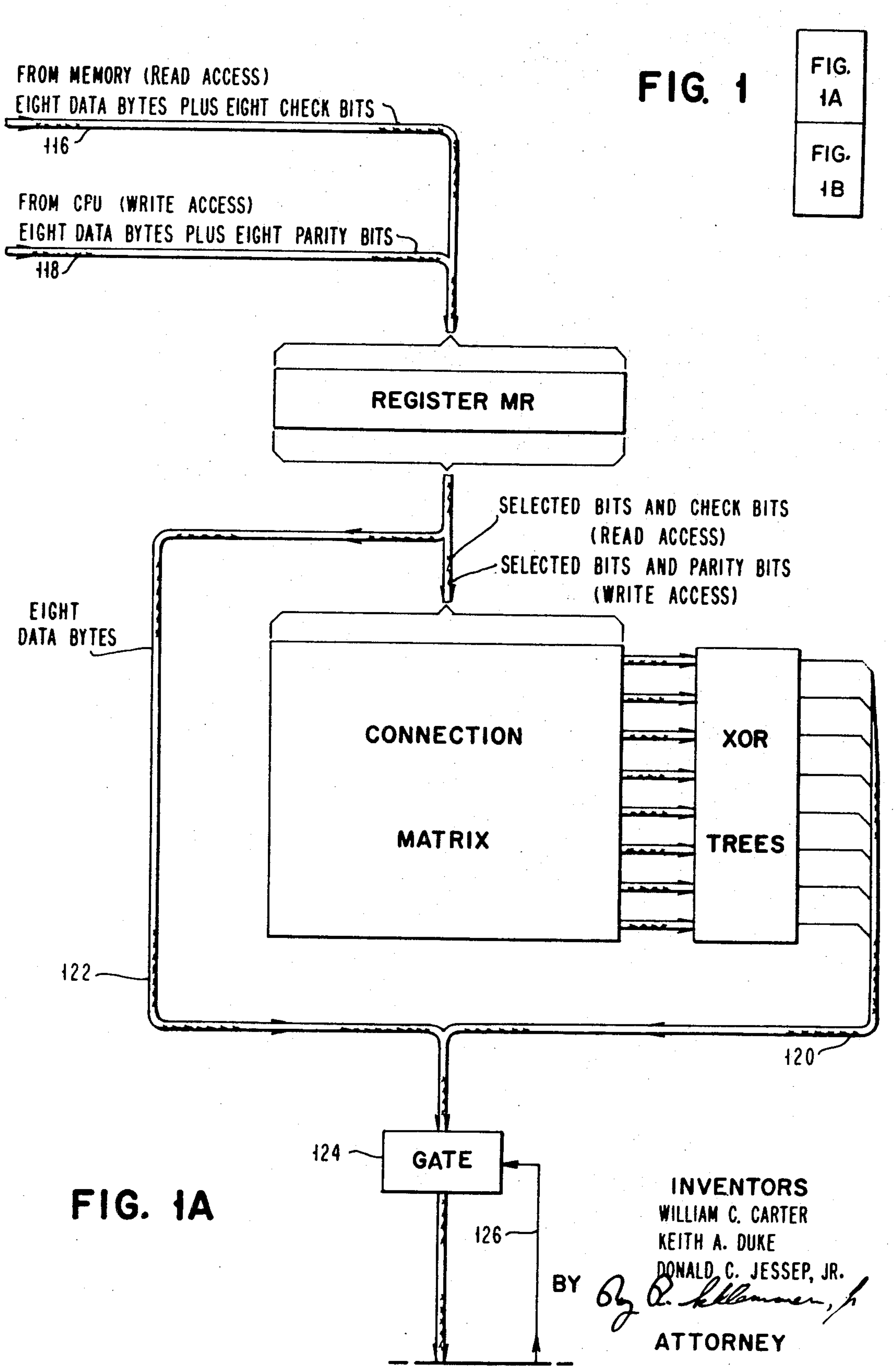
FIG. 1 comprises an organizational diagram for FIGS. 1A and 1B.

The objects of the present invention are accomplished in general by a computer memory system including a memory, means for accessing single-error correcting/double-error detecting, Hamming coded data from said memory, means for generating a syndrome bit pattern from the data word accessed from said memory, and means for determining if the single data bit error is present in the accessed memory word. The improvement of the present invention comprises means for examining a syndrome bit pattern to identify the data byte containing an erroneous bit. Further means are provided for producing a bit-error correcting pattern in the erroneous byte based upon said syndrome bit pattern. Further means are provided for combining said erroneous byte and the error-correcting pattern to correct the erroneous bit present in said byte, there being only as much correcting circuitry as is necessary to correct a single byte at a time. Further means are provided for sending the corrected data word back to the memory for storage and to the processing unit requesting same.

According to a first embodiment of the present invention, the syndrome bit pattern is stored in a syndrome register and the data word bytes and byte-error indicators are sequentially tested for an error condition and the contents of said syndrome register are rotated in synchronism with said testing sequence. A correction matrix is connected to said syndrome register in a predetermined configuration to provide a distinct bit-error correction pattern which pattern changes as the contents of the syndrome register are rotated. At any given time, the pattern will be correct for the byte of said data word currently being examined. Further means are provided whereby the erroneous byte and the correction-bit pattern are combined in an actual correction circuit. A "1" in a byte-error indicator pattern specifies that such correction is required.

In the above-described embodiment, it is necessary that the single-error correction/double-error detection Hamming coded data (to be hereinafter referenced as SEC/DED) must be rotational in character. The exact meaning of rotational character of the code will be specified in detail subsequently. As will be apparent from the subsequent description, the rotational character of the code is necessary if the syndrome bit pattern is to be rotated in the storage register therefore with a resultant automatic generation of the error-correcting bit patterns being produced with a fixed connecting matrix.

According to further embodiment of the invention (FIGS. 5A through 5E) instead of generating the bit-correction patterns utilizing the contents of the syndrome register plus the connection matrix all 64 possible correction patterns are prestored in a special high-reliability memory and are accessed utilizing the contents of the syndrome register. In the disclosed embodiment, the addresses to the local store are generated after the contents of the syndrome register are rotated, and it is found that a given byte needs correction. However, the direct byte indication could be produced, the byte accessed immediately and the proper correction-bit pattern accessed from the memory without rotating the syndrome bits. However, these storage requirements could be reduced if a more complex address-decoding circuit were to be used. When the actual correction-bit pattern is accessed from the local store, it is sent to the CPU arithmetic and logic unit directly with the erroneous bit where it is merely combined utilizing an EXCLUSIVE-OR circuit such as shown in the other three embodiments whereby the single bit of the erroneous byte will be automatically corrected.

According to a further embodiment of the present invention (FIGS. 4A through 4H) the erroneous byte identification is made immediately whereupon the erroneous byte is gated into the correction circuitry and the proper error-correction bit pattern is produced for the erroneous byte effectively rotating the contents of the syndrome register by means of a further connection matrix and set of gate circuits.

Before proceeding with the specific description of the present invention and especially how the present correction circuit operates, it will first be set forth a general description of the overall operation of a type of error detection system built into a relatively conventional memory organization. It should be clearly understood, however, that the particular error-detection system and circuits used are not important other than they must be capable of producing the syndrome bit pattern from the check bits stored with the data word in memory and the controls could also be capable of indicating that a single-bit error is present and can be corrected. The fact that the single-bit error is present actually implies of course that it can be corrected using the present coding scheme.

FIG. 1 is a general block diagram of the present system illustrating the primary functional units thereof together with the general data flow. Referring to the figure, which is made up of FIGS. 1A and 1B, it will be noted that the data is brought in from memory on cable 116 and comprises both the eight data bytes illustrated plus the eight Hamming code SEC/DED check bits. It will also be noted that this register may be loaded from the CPU but in this case will contain the eight data bytes plus eight byte parity bits. Cable 116 is used in a "read" access and cable 118 is used for a "write" access into the memory. It should be clearly understood that the eight data bytes of eight bits each plus the eight check bits or parity bits are chosen for purposes of the present embodiment only. It should be understood that an appropriate number of check bits and parity bits would be provided depending upon the number and size of the data bytes. In the case of a read access, certain selected data bits and check bits are applied to an implementation of the parity-check matrix, the Connection Matrix. In the case of a write access, the same selected data bits and the parity bits are applied to the Connection Matrix. It will be noted that the output of the Connection Matrix extends through the EXCLUSIVE-OR trees to the cable 120, which are then gated through gate 124 to the MDR Register. The output on cable 120 will comprise eight parity bits and the actual data bits are transferred to the MDR Register via the cable 122. As stated previously in the case of a read access, the Connection Matrix and the EXCLUSIVE-OR trees convert check bits to parity bits. While in the case of a write access, the same Connection Matrix and the EXCLUSIVE-OR trees convert the parity bits to check bits. On a write access, the register MDR is loaded directly from the CPU and in this case, the word loaded into the MDR Register consists of the eight data bits plus the eight parity bits. As will be seen this information comes in over cable 128. It will be noted that on a write access that both the MR Register and the MDR Register are loaded directly from the CPU over cables 118 and 128 respectively. The reason for this is that it is first necessary to check the data coming from the CPU to see if it has proper parity or in other words, to see if it is correct. If it is correct, then it is necessary to change the eight parity bits to eight check bits in order to store the word in memory with the proper SEC/DED Hamming codes. As stated previously, this is done by gating the MR Register through the Connection Matrix to the MDR Register where the word is available to the memory via cable 130 in proper Hamming word form.

Figure 1B:
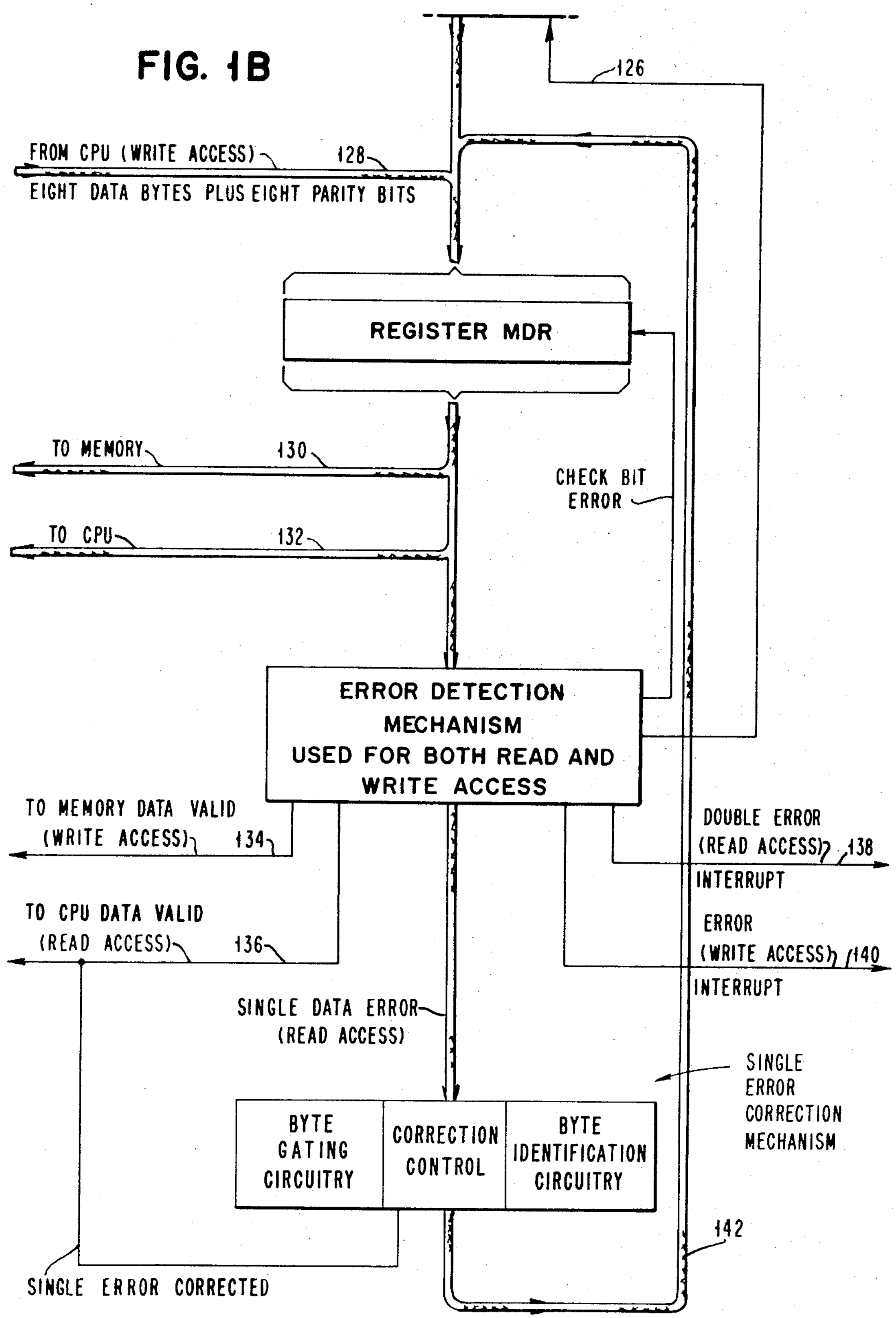

Referring to FIG. 1B, it will be noted that a block indicated as Error Detection Mechanism is attached to the output of the MDR Register. This block in essence contains dual function EXCLUSIVE-OR circuitry for performing the parity check on a write access and for finally converting the parity encoded data appearing in the MDR Register on a read access to a final set of syndrome bits which are utilized to signal the type of error present, if any, and also utilized to perform single-error correction.

As was explained previously, the output of the Error Detection Mechanism on parity check will have to test the byte parity in each byte section of the MDR Register. Since odd parity is being used, as will be apparent, a simple AND circuit can perform this check. In the case of a read access, the detection is somewhat more complex in that the circuitry must distinguish between a check-bit error in which case it will be determined that the data is correct, a single data bit error which will imply that a correction algorithm must be initiated or that a double error has been detected in which case the system must be interrupted and this fact made known, and finally that no error has been detected and that the data currently in the MDR register may be transferred to the CPU.

Finally, the block entitled Single Error Correction Mechanism makes corrective use of the generated syndrome bits produced by the Error Detection Mechanism. This block contains the initial mechanisms for effecting correction which comprises the essential features of the present invention. It will be noted that this block is made up of three portions. The Byte Gating Circuitry controls the gating of bytes of the data and into the Correction circuitry. The block entitled Correction Control essentially comprises the clocks and rotation Byte Identification Circuitry comprises the connection matrix which provides the "byte in error" identification.

It should be understood that the circuitry used to produce the error indicators could be purely conventional and is generally described at many places in the available literature, such as (1) W.W. Peterson, Error-Correction Codes, the MIT Press, 1961, pp. 30–35; (2) I.S. Reed, "A Class of Multiple Error-Correcting Codes and the Decoding Scheme," Trans. IRE (PGIT), Vol. 4, 1954, pp. 38–49; or (3)P. Elias, "Coding for Noisy Channels," IRE Conventional Record, part 4, 1955, pp. 37–45.

Figure 8:
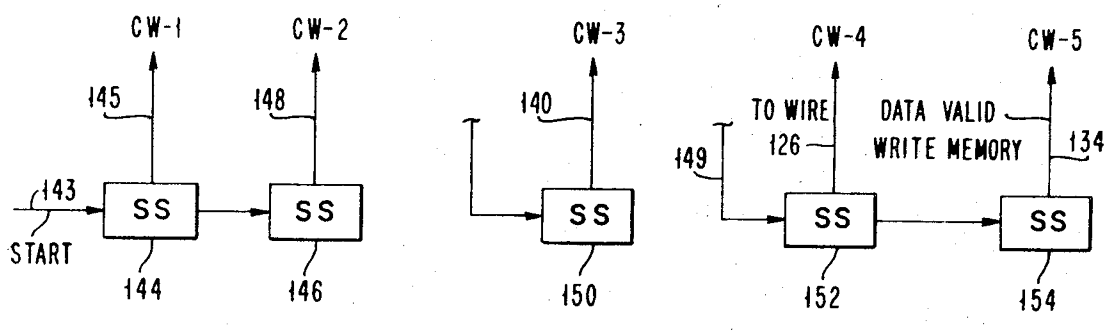
FIG. 8 comprises a logical block diagram of the CW clock which essentially controls operation of the system during a "write" memory cycle.

The following general description of FIGS. 7–10 will generally set forth the operations involved in both the "read" access and a "write" access. First the operation of a "write" access will be explained together with the flow chart shown on FIG. 7 and the single shot clock circuit shown on FIG. 8. The mechanism shown on FIG. 8 is for illustrative purposes only and represents one sort of timing arrangement that could be utilized with the present system. However, it is to be understood that other timing means could readily be employed. Any suitable pulse generator could be used. During a write access, a pulse is delivered to the Start line which starts the sequence of events. As shown in the flow chart of FIG. 7, the start pulse causes a box labelled "ingate Register S." At this point, it should be noticed that above each block in FIG. 7 there is an indication of which step of the CW clock is involved in performing the particular step. It will also be noted that on FIG. 8 that a number of the inputs have reference numerals thereon indicating the source of some of the enabling pulses. It will be noted that these reference numerals are also the same reference numerals utilized on FIGS. 2–6 (all sheets of composites) and are utilized for purposes of convenient reference. It should be noted at the beginning of a write access that both the register MR and MDR are loaded with data and parity bits from the CPU. What the ingating to the Register S does is to perform a parity check on the data currently in the MDR register. The next block turned on by CW-2 tests for an error. If the answer is no, the program branches to CW-4 and generates "check bits." This causes the data and parity bits stored in the register MR to be passed through the Connection Matrix and the EXCLUSIVE-OR trees to automatically generate check bits and place the original data bits plus the newly generated check bits in the MDR register. CW-5 sends valid data to memory and then branches to the end. If after CW-2 there had been an error indication, the next step would have initiated clock step CW-3 and would have caused an "interrupt." This interrupt would be a conventional interrupt and might cause a retransmission or some other diagnostic or error routine in the system. However, since this is a parity error, there is no possibility of correcting same and it will be apparent that the data could not be stored in memory in the obviously incorrect form. This completes the description of the basic steps of a "write" access.

Figure 3:
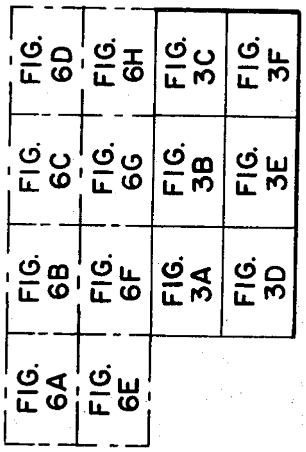
FIG. 3 comprises an organizational diagram illustrating the organization of FIGS. 3A through 3F.
Figures 4, 4A:
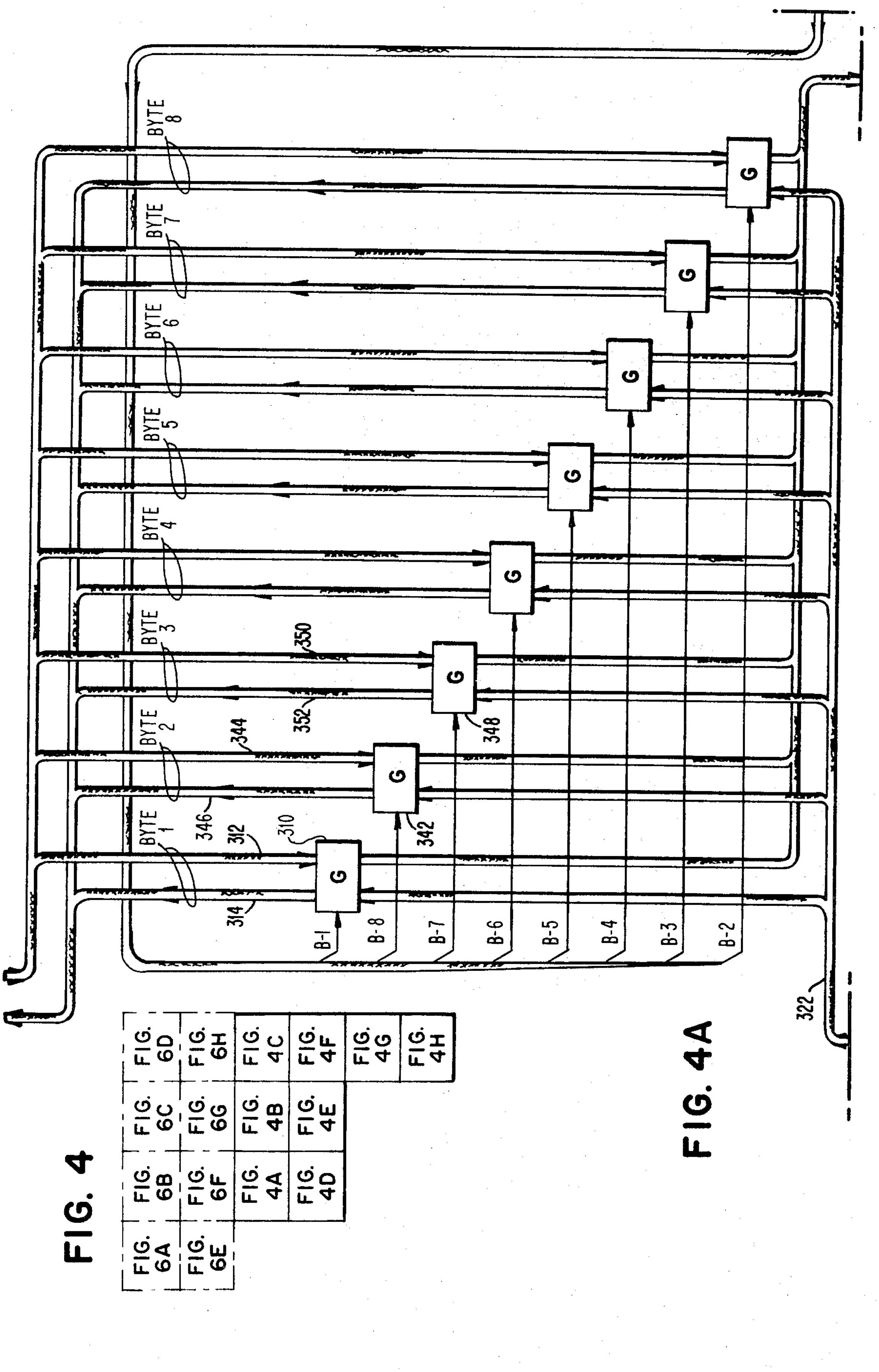
FIG. 4 comprises an organizational drawing for FIGS. 4A through 4H.
FIGS. 4A through 4H comprise a combination functional and logical block diagram of a third embodiment of the present invention.
Figure 4B:
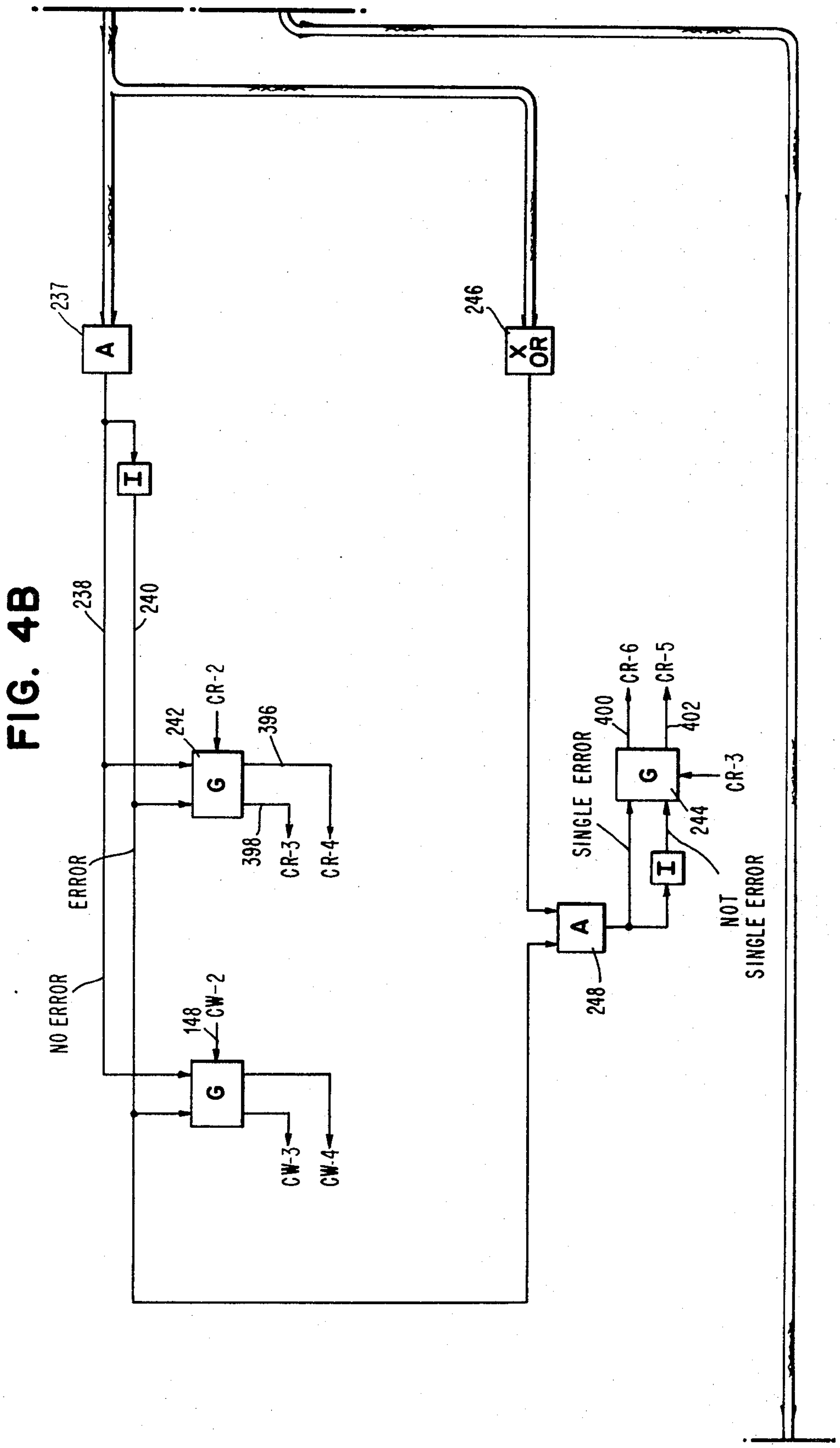
Figure 4C:
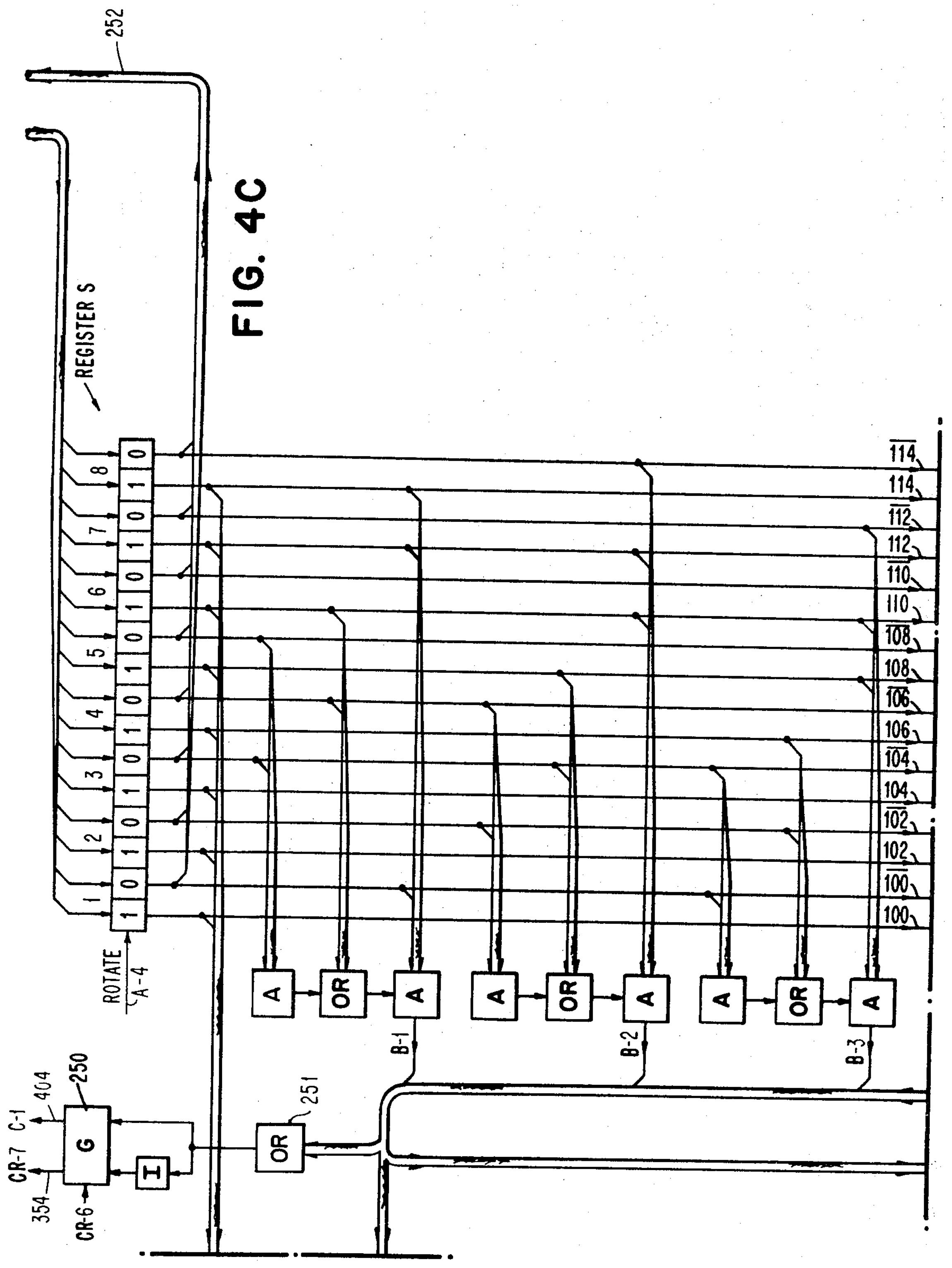
Figure 5:
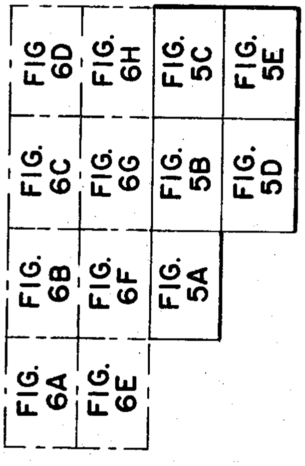
FIG. 5 comprises an organizational drawing for FIGS. 5A through 5E.
Figure 9:
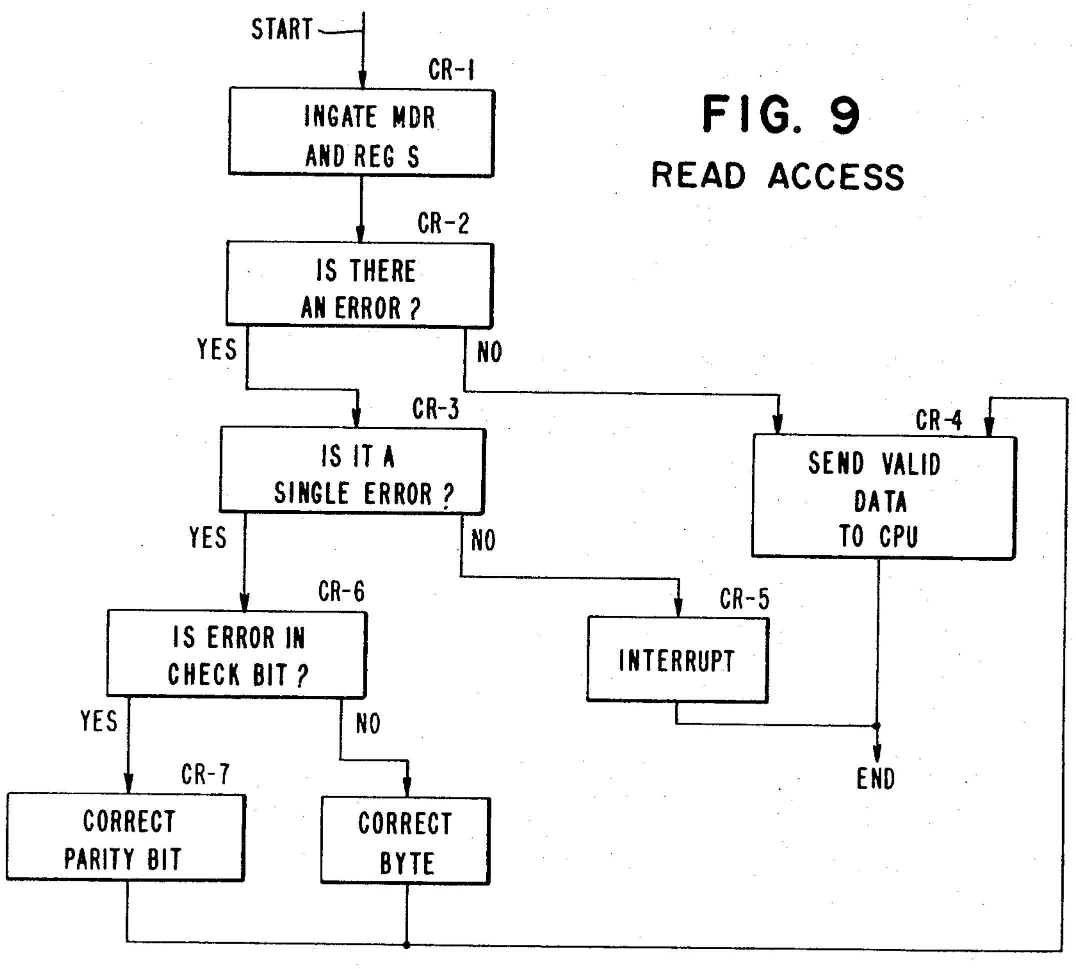
FIG. 9 comprises a flow chart of the operation of the present system during a memory "read" access.
Figure 10:
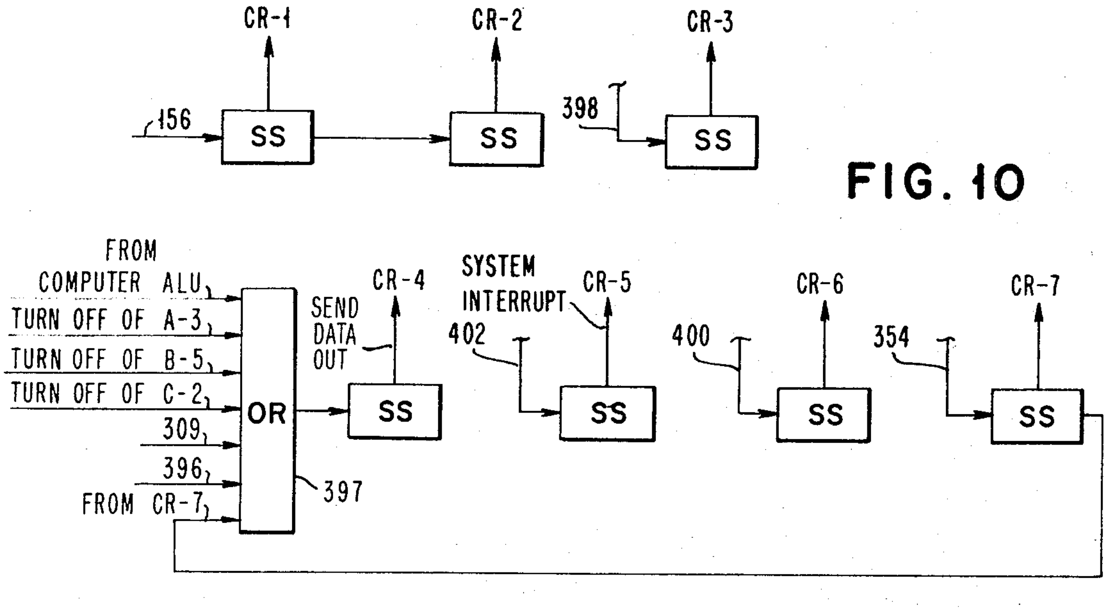
FIG. 10 is a diagram of the CR Clock which controls the system during a memory "read" cycle.

Referring now to FIGS. 9 and 10, a "read" access will be described. FIGS. 9 and 10 are laid out identically to FIGS. 7 and 8 wherein FIG. 5 is a flow chart and the individual clock steps, i.e., the CR clock shown in FIG. 10 is tied in to the various individual operations set forth in FIG. 9. Again the specific embodiment of the clock of FIG. 10 is not fixed in that the timing sequences could be performed by other circuitry that the indicated single shots. Again the reference numerals, principally the line references shown turning on the various single shot stages, are the same reference numerals utilized on FIGS. 2–6. The start line at the top of FIG. 9 initiates the first block "ingate MDR Register and Register S." Since this is a memory read cycle, the MDR Register will be loaded with data bits plus the parity bits generated by the Connection Matrix. And subsequently passing the contents of the MDR Register through the associated EXCLUSIVE-OR circuits converts this information into the syndrome bits and stores same in the Register S.

CR-2 asks the question "Is there an error?" by testing the contents of the Register S as described previously. As will be remembered, there are four possible conditions which can occur. The first is no error, the second is a check bit error, the third is a single-data error and the fourth is a double error. If there is no error, the system branches to CR-4, which provides a signal "valid data to CPU" and ends this clock routine. If there is an error, the system branches to clock pulse CR-3 and the test is made to determine "Is it a single error?". If the answer to this test is no, a double error is implied and the system branches to CR-5 and an "interrupt" is generated which causes the end of this clock. If the error is single, the system branches to CR-6 which makes the test "Is the error in a check bit?". If yes, the system branches to CR-7, which will cause one of the previously generated parity bits to be corrected. If the error is not in the check bit, the system branches to the block designated "Correct byte" and this is designated by line 404 proceeding to the clock stages A-1, B-1, C-1 and D-1 (for the four embodiments) which initiate a single data bit correction step. After both the parity bit and the data bit correction, the system will then branch back to the clock step CR-4 which causes the now valid data to be sent to the CPU or elsewhere in the system after which the read access will have been completed. The A, B, C and D Clocks just mentioned are on FIGS. 11 through 14 and as will be noted comprise very simple clocks which as will be apparent from the subsequent description of FIGS. 2–5, are all that is required since when a correction is necessary the data word is gated a byte at a time into the correction circuitry and reread back into the MR Register and thence into the MDR Register with corrected parity bits.

Figures 6, 6A:
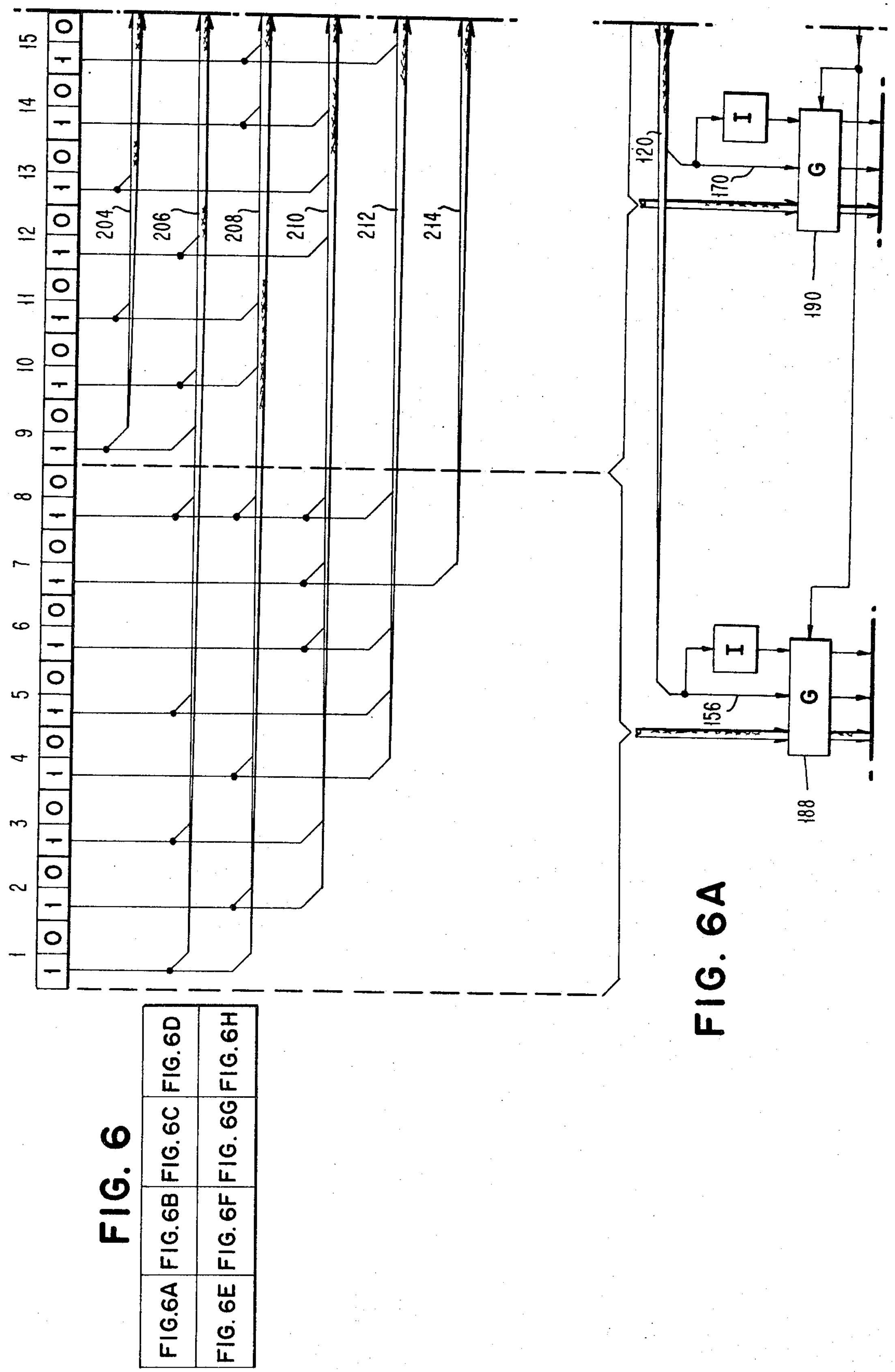
FIG. 6 comprises an orgizational drawing for FIGS. 6A through 6H.
FIGS. 6A through 6H comprise a combination functional and logical block diagram of an error-detection circuit suitable for use with the present invention.
Figure 6B:
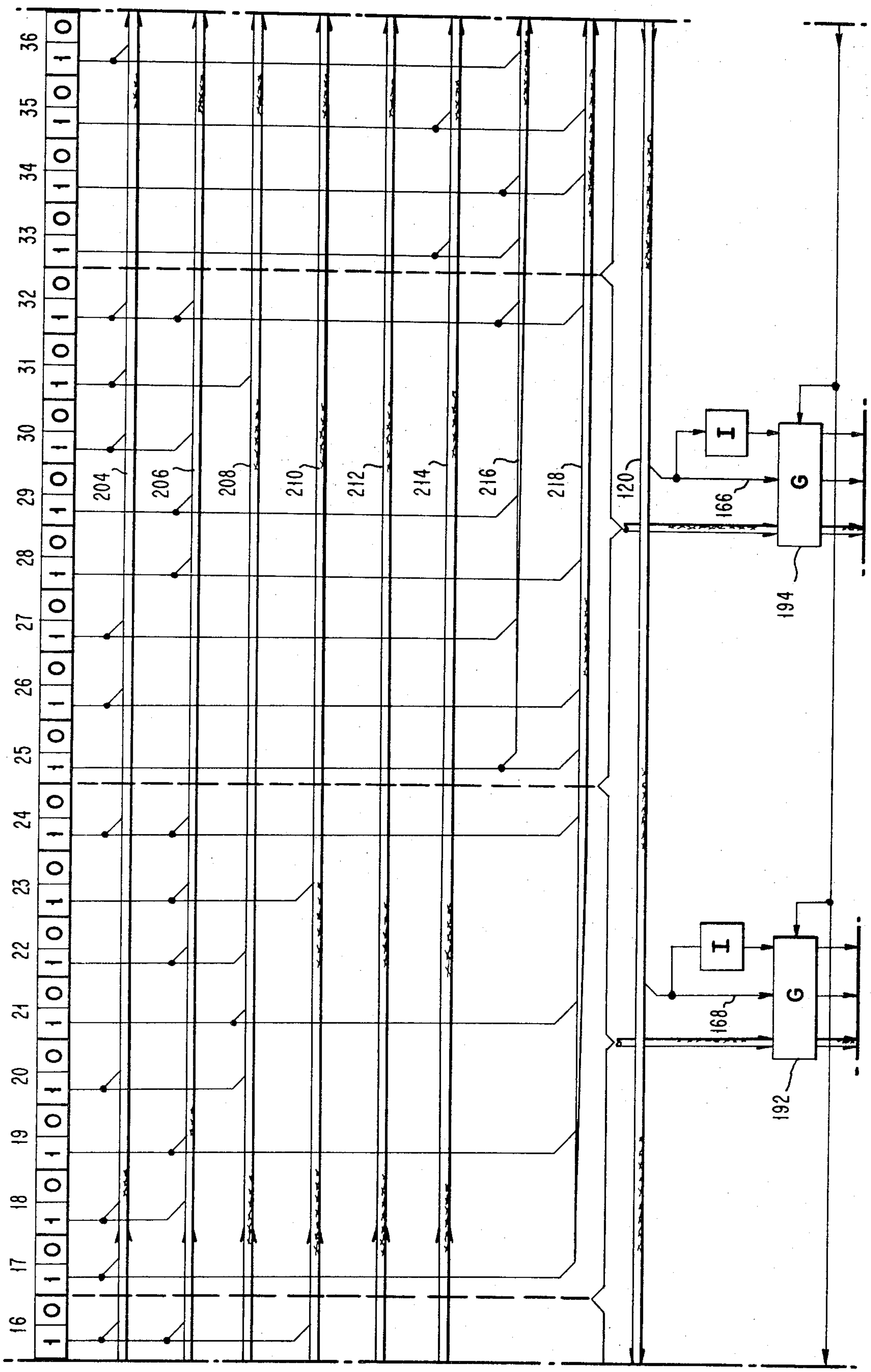
Figure 6C:
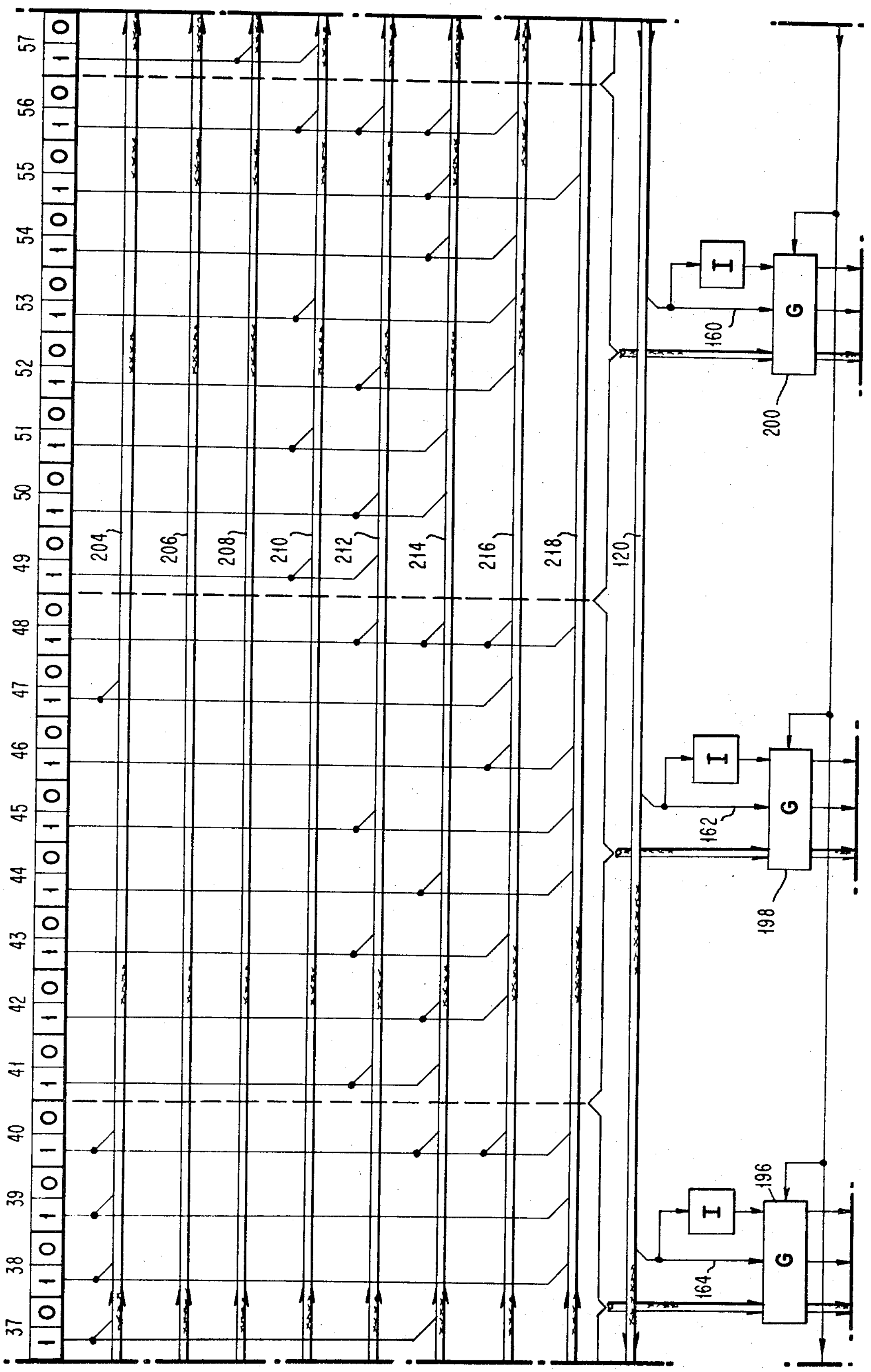
Figure 6D:
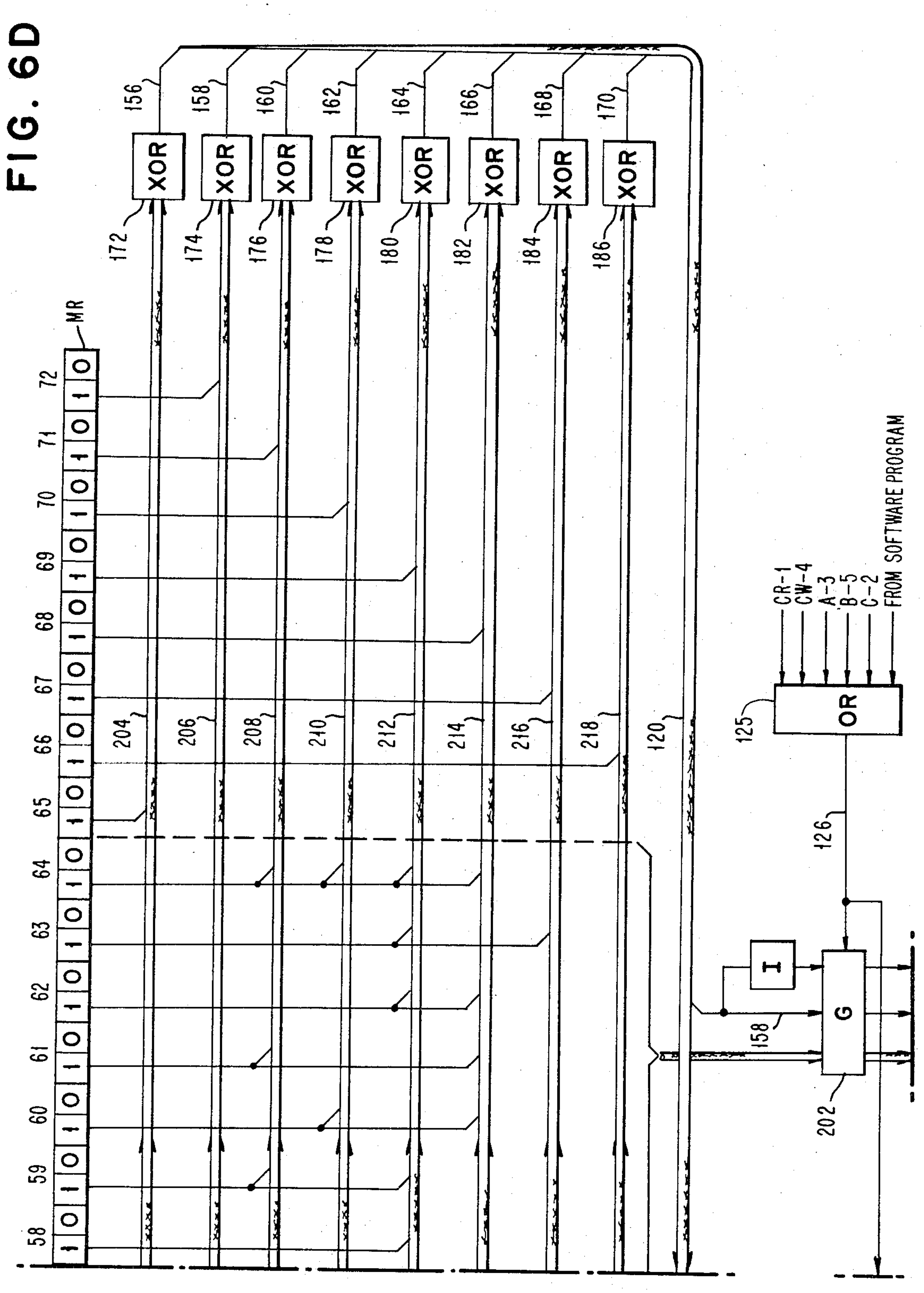
Figure 6E:
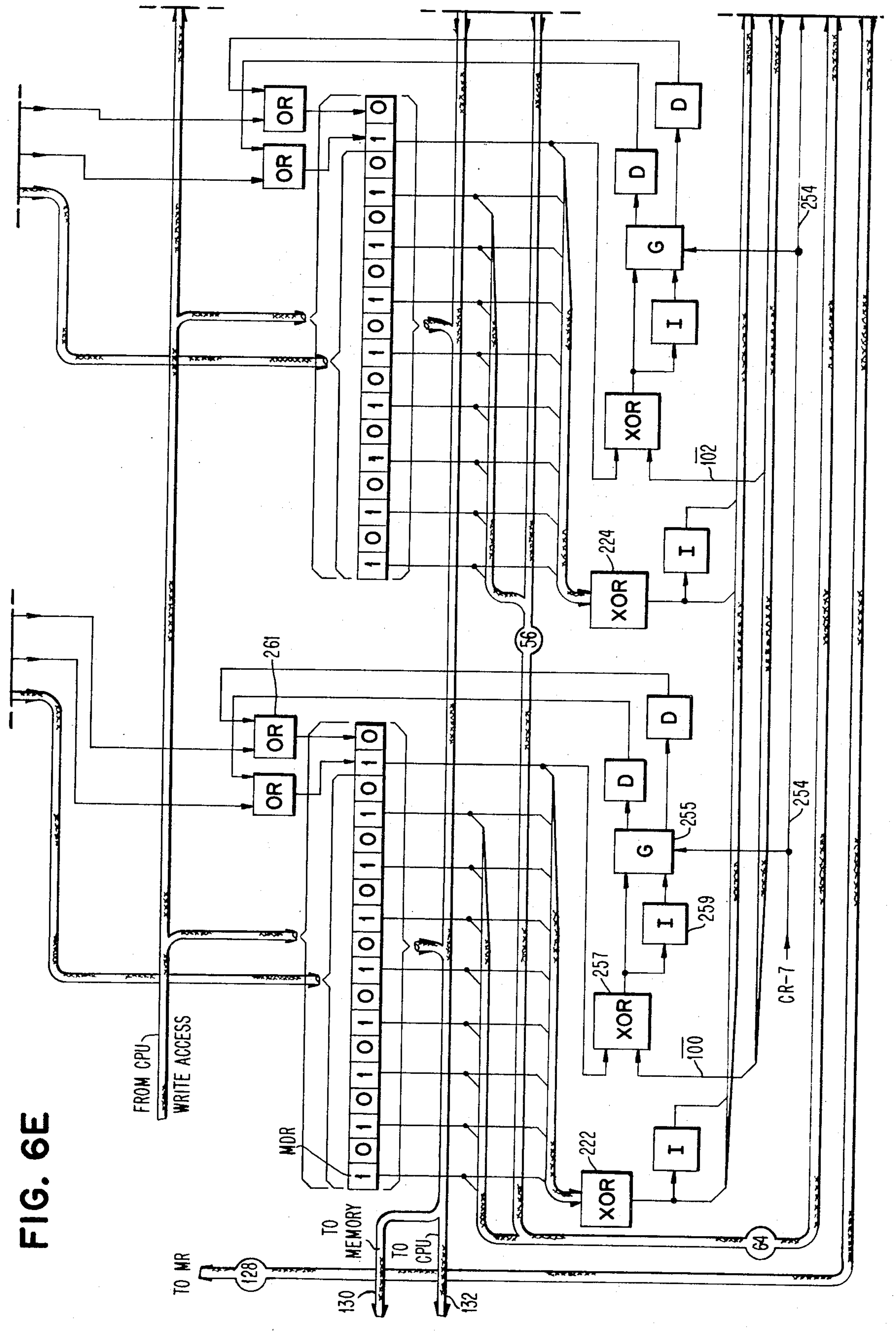
Figure 6F:
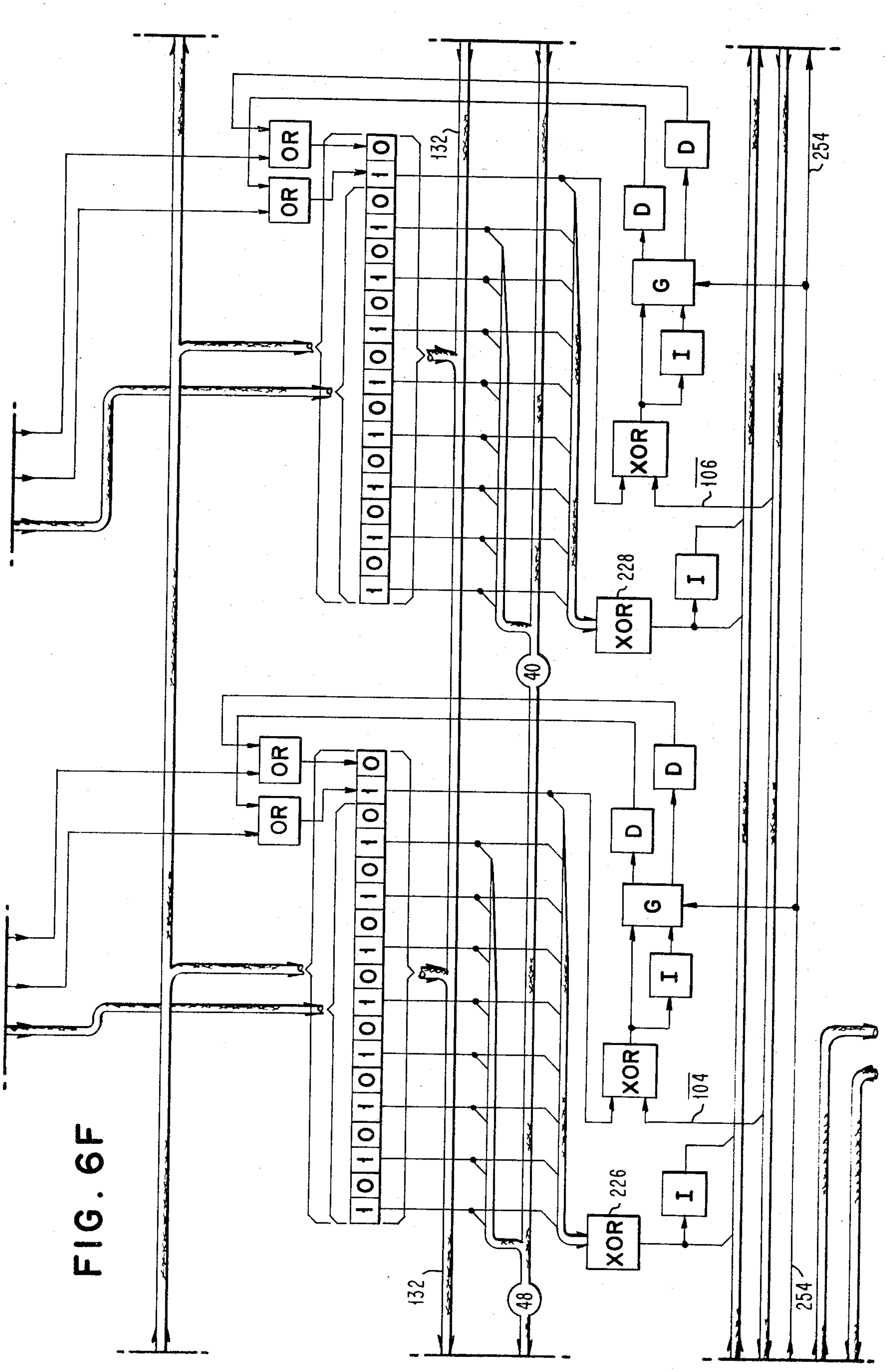
Figure 6G:
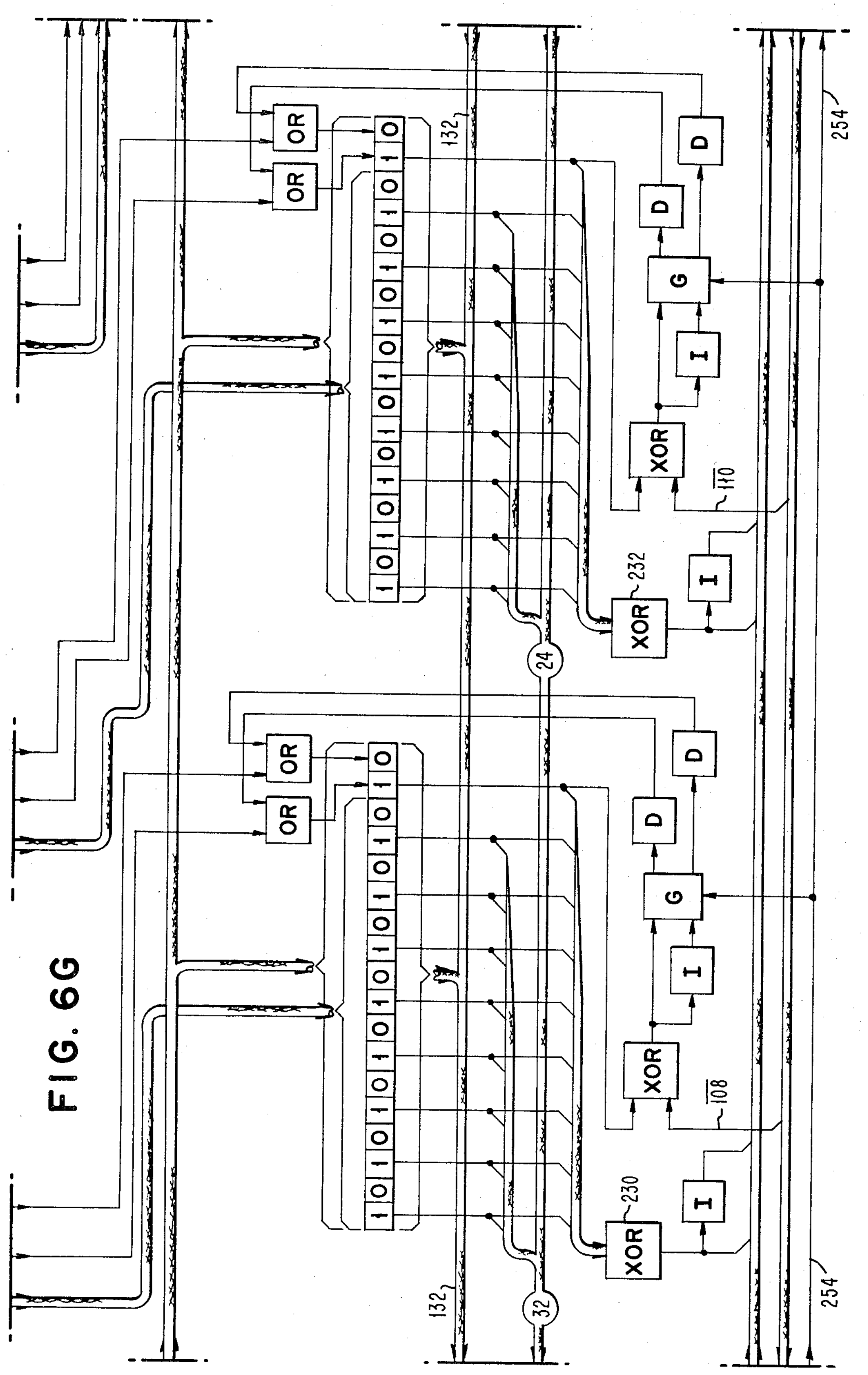
Figure 6H:
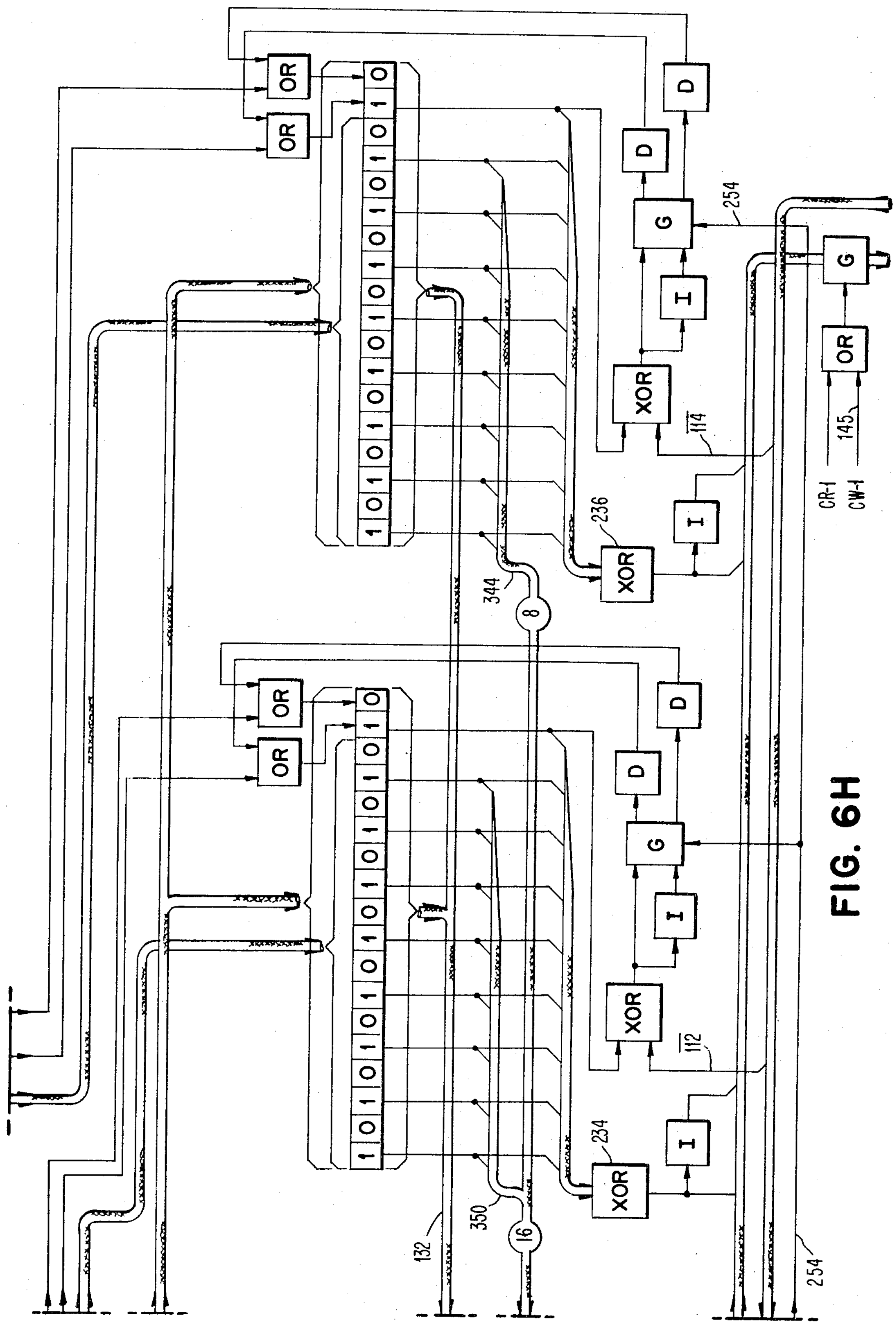
Figure 7:
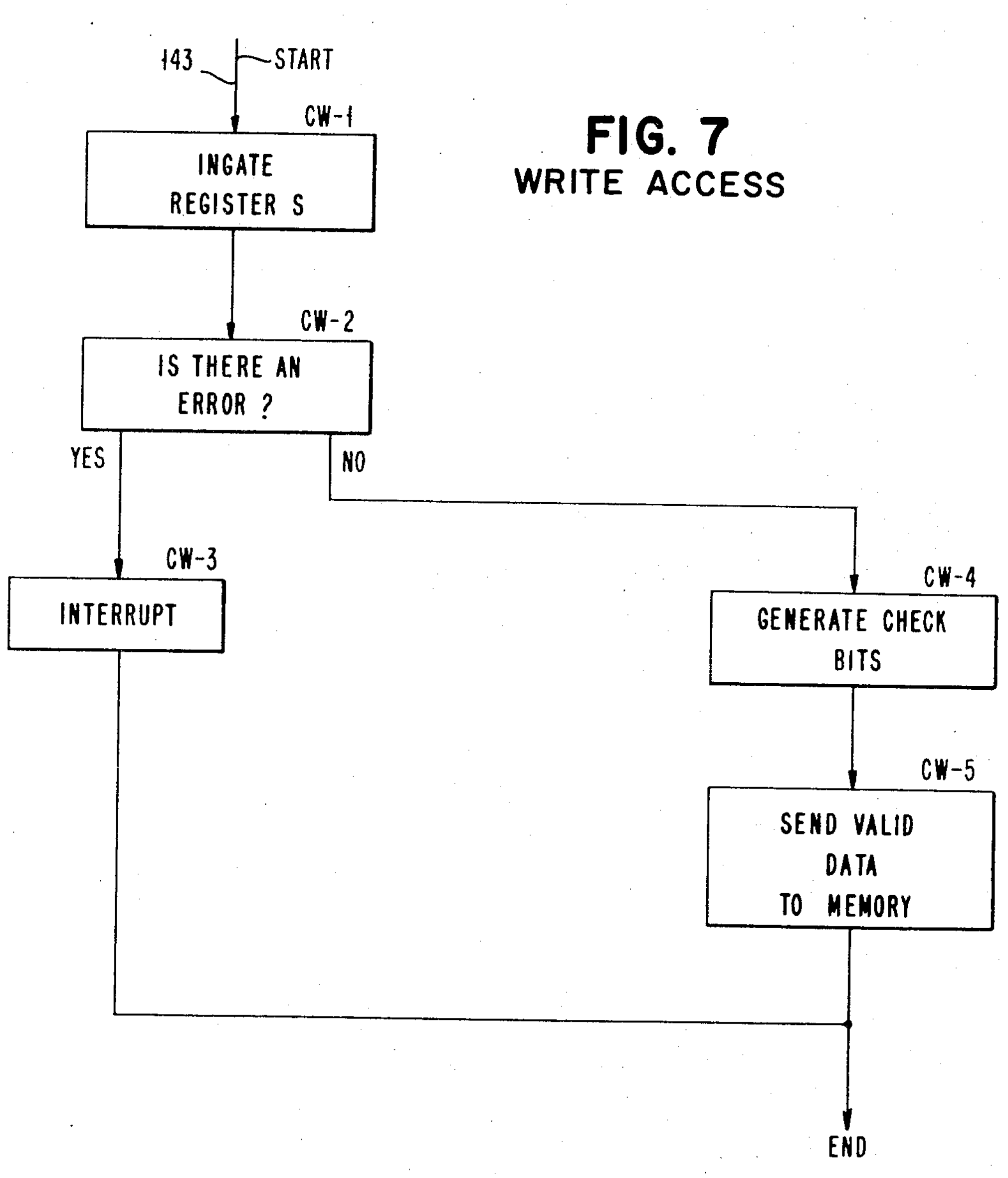
FIG. 7 comprises a flow chart of the operations occurring in the present system on a memory "write" access.

FIG. 15 is a detailed logical schematic diagram of one of the EXCLUSIVE-OR trees shown on FIGS. 6D and also on FIG. 1A. As discussed in detail with respect to FIGS. 6A–6H, each of these EXCLUSIVE-OR trees has 19 inputs and a single output. The operation of the EXCLUSIVE-OR circuit is believed to be quite well known in the art it being apparent that an odd number of ones coming on the input lines will produce odd parity or a "1" on the output line.

FIGS. 11–14 show the A, B, C and D clocks, which in effect control the four correction circuitry embodiments shown in FIGS. 2–5 respectively. These clocks are configured in substantially the same way as the CR-clock and CW-clock being composed of a plurality of single shots the turn-on of which produces a particular clock pulse and the turn-off of which may either test a branch condition or continue to the next single shot depending upon the particular routine in progress. In any event, the operation of these clocks and the correction circuitry will be described in detail with respect to the description of the four embodiments disclosed in FIGS. 2–5.

The following explanation is intentionally not rigorously algorithmic. It is for a general understanding available by a casual reading.

General Theory of Operation of the SEC/DED Translator

The operation of the Translator (so-called because it can generate check bits from parity bits or, conversely, parity bits from check bits, depending on whether the memory is being written into or read from, it being understood that the data bits are also involved in the translation) is predicated on the "parity-check or correction matrix." The parity- check matrix has been previously treated in the literature by W.W. Peterson, Error-Correction Codes, the MIT Press, 1961, pp. 30–35. Although its foundations were properly laid in the early classic paper by R.W. Hamming, "Error Detecting and Error Correcting Codes," The Bell System Technical Journal, Vol. XXVI, No. 2, Apr. 1950, pp. 147–160.

Let us treat a simple example of a conventional use of the parity-check matrix as it is found in the implementation of a rudimentary communications system. The communications system will be assumed to consist of a transmitter of binary signals, a receiver of the same, and a channel denoted by "C." The channel will be considered to be inherently much more unreliable than either the transmitter or receiver circuitry. Hence, the channel will be subjected to disturbances which can logically complement a transmitted bit; i.e., a "1" will be transmitted and received as a "0" or a "1" received for a transmitted "0."

This is directly analogous to the situation of a memory in which the transmitter has, as its analogue, the memory "write" circuitry and the receiver has, as its analogue, the memory "read" circuitry.

Consider next the use of a SEC/DED code for this situation. A word (a set of bits) will be encoded, transmitted, checked with subsequent correction or detection within SEC/DED capabilities of the code, and, in decoded form, presented at the output of the receiver. The code will be prescribed by a parity check matrix H as given below.

$$
\begin{array}{cccccccc}
d_1 & d_2 & d_3 & d_4 & c_1 & c_2 & c_3 & c_4 \\
\end{array}
$$

$$
H= \begin{array}{cccccccc}
0 & 1 & 1 & 1 & 1 & 0 & 0 & 0 \\
1 & 0 & 1 & 1 & 0 & 1 & 0 & 0 \\
1 & 1 & 0 & 1 & 0 & 0 & 1 & 0 \\
1 & 1 & 1 & 0 & 0 & 0 & 0 & 1
\end{array}
$$

For this matrix, each column "corresponds," respectively, to the data bits $d_1$, $d_2$, $d_3$, $d_4$, and the check bits $c_1$, $c_2$, $c_3$, $c_4$. The verb "corresponds" appears in quotation marks here to emphasize that the correspondence is between a "1" in a given row and the appearance of the data or check bit associated with the column in the parity equation for that row. Thus, we are illustrating that an error can be located (and corrected) if we selectively take the parity of several subsets of the data bits, and further, if we can observe which of these parity bits are in a logic state opposite to the state of their "no-error" values. This is because we know the patterns of these parity bits for each correct and incorrect value of every data bits.

The question now is, "how does the parity check matrix determine the parity bits and permit error location?" the answer to this must be drawn from another "correspondence" —that of the parity bits, or syndromes as they are clinically referred to, to the individual rows of the parity check matrix. To answer the question above, then, let us write the parity equations prescribed by the parity-check matrix.

First row: 0 1 1 1 1 0 0 0

↓ ↓ ↓ ↓ ↓ ↓ ↓ ↓

First Eqtn:

$$0.d_1 \oplus 1.d_2 \oplus 1.d_3 \oplus 1.d_4 \oplus 1.c_1 \oplus 0.c_2 \oplus 0.c_3 \oplus 0.c_4 = S_1$$

or $$d_2 \oplus d_3 \oplus d_4 \oplus c_1 = S_1,$$

where $S_1$ is the syndrome for row 1.

The check bit $c_1$ is chosen so that $S_1 = 1$ for the "no-error" case in odd parity. The other three equations are:

Second row: $d_1 \oplus d_3 \oplus d_4 \oplus c_2 = S_2$

Third row: $d_1 \oplus d_2 \oplus d_4 \oplus c_3 = S_3$

Fourth row: $d_1 \oplus d_2 \oplus d_3 \oplus c_4 = S_4$ and $S_1 = S_2 = S_3 = S_4 = 1$ will denote the "no-error" condition for odd parity. Thus, the explanation as to how an error is located is now possible in terms of the equations above. It can be seen that $d_1$ only appears in the parity (syndrome) equations for rows 2, 3, and 4. As such, $d_1$ is the only bit that, if incorrectly received and decoded, will change the syndromes according to the table below.

| | $S_1$ | $S_2$ | $S_3$ | $S_4$ |
|---|---|---|---|---|
| $d_1$ rec'd correctly | 1 | 1 | 1 | 1 |
| $d_2$ rec'd incorrectly | 1 | 0 | 0 | 0 |

Note that $S_1$ did not change because it is independent of $d_1$ in its formation, as witnessed in the equation for row 1 above.

For an example, then suppose, at the sending end (our transmitter), we have the data bits $d_1=1$, $d_2=0$, $d_3=0$, $d_4=1$. The "message," $d_1d_2d_3d_4$, is seen to be 1 0 0 1. Our communication system assumes the pedagogical form:

Transmitter-end encoding:

$S_1 = 1 = c_1 \oplus d_2 \oplus d_3 \oplus d_4 = c_1 \oplus 0 \oplus 0 \oplus 1$ so that $c_1$ is chosen to be 0 to satisfy this equation $S_2 = 1 + c_2 \oplus 1 \oplus 0 \oplus 1 \Rightarrow c_2 = 1$ $S_3 = 1 = c_3 \oplus 1 \oplus 0 \oplus 1 \Rightarrow c_3 = 1$ $S_4 = 1 = c_4 \oplus 1 \oplus 0 \oplus 0 \Rightarrow c_4 = 0$

| Message becomes | $d_1$ | $d_2$ | $d_3$ | $d_4$ | $c_1$ | $c_2$ | $c_3$ | $c_4$ |
|---|---|---|---|---|---|---|---|---|
| | 1 | 0 | 0 | 1 | 0 | 1 | 1 | 0 |

Assume now that the channel has an error condition imposed on it such that the disturbance erroneously inverts $d_1$ and only $d_1$. This will result in the following data and check bit string.

Receiver end Decoding:

| $d_1$ | $d_2$ | $d_3$ | $d_4$ | $c_1$ | $c_2$ | $c_3$ | $c_4$ |
|---|---|---|---|---|---|---|---|
| 0 | 0 | 0 | 1 | 0 | 1 | 1 | 0 |

$S_1 = c_1 \oplus d_2 \oplus d_3 \oplus d_4 = 1$ $S_2 = c_2 \oplus d_1 \oplus d_3 \oplus d_4 = 0$ $S_3 = c_3 \oplus d_1 \oplus d_2 \oplus d_4 = 0$ $S_4 = c_4 \oplus d_1 \oplus d_2 \oplus d_3 = 0$ as predicted previously Since $d_1$ being incorrect is the only way we can obtain this unique pattern of syndromes, the only bit which can be in error is $d_1$. Correction is trivial; it merely amounts to logically inverting the $d_1$ bit (we know that the correct version of $d_1$ is merely the opposite of whatever it is now). Hence, the circuit for correcting $d_1$ is shown in FIG. 19 where $d_{1c}$ is data bit $d_1$, corrected. One obvious fact can now be underlined. For odd parity, the syndrome pattern which corrects (inverts) $d_1$ is simply the complement (logical negation) of the column in the parity check matrix corresponding to $d_1$ (the first column). And, in general, the syndrome pattern which corrects $d_1$, $d_2$, $d_3$ or $d_4$ is the complement of column 1, 2, 3 or 4. The corrections for check bits $c_1$, $c_2$, $c_3$ or $c_4$ is found as simply from the columns 5, 6, 7 or 8 in the parity check matrix, if such correction is warranted. In even parity, the syndrome is uncomplemented if the matrix entry is a "1" or complemented if the matrix entry is a "0."

A double error will be signified by a syndrome pattern not found as a column in the parity check matrix and not the pattern for "no error." Thus, the patterns which will signal a double error are:

$(S_1, S_2, S_3, S_4) = (0, 0, 0, 0)$, $(0, 0, 1, 1)$, $(0, 1, 0, 1)$, $(0, 1, 1, 0)$, $(1, 0, 0, 1)$, $(1, 0, 1, 0)$, $(1, 1, 0, 0)$.

Obviously, these are patterns in which two syndromes have been changed from their expected value. But, it is not possible to specify the culprits: If (0, 0, 1, 1) is received, are the culprits $d_1$ and $d_2$ or are they $c_1$ and $c_2$? Hence, by the reception of the above patterns, a double error can be recognized or detected, but no action beyond alerting the system can be taken.

The parity check matrix for the disclosed minimum circuit involves a more subtle relationship between parity over a selected byte of data and parity over a selected subset of data bits and precisely one check bit, uniquely associated with the chosen data byte. Examinations of the parity check matrix shown in FIG. 16 or FIG. 17 will reveal a significant relationship. Under the encoding and decoding used (and specified by the parity check matrix), a set of 1's appears in each row, as a subset of all 1's in the row, in such a fashion that parity across all bits of one complete byte (in the data word) would be included in the formation of the syndrome corresponding to that row if the normal circuit implementation of the parity for the row was to be used. However, a dictate of the circuit technology used for a rough lay-out of the presently disclosed translator in its inception was that any byte-register provided byte parity, automatically, for any information loaded into it. This has not been assumed for the present implementation but it does partly explain why it is possible to include parity generation as part of the decoding process and why the same circuitry can be used for both READ and WRITE processes. The rotational parity check matrix disclosed herein basically is derived by specifying columns with only single 1 in them as check bit columns, using eight columns with three, five, . . . , etc., 1's in them for the section of the parity check matrix associated with the first byte, then rotating this vertically, in an ascending fashion, for each of the seven successive bytes. A discussion of the parity check matrix to be provided later will illustrate how the rotational property is used for the general case of the parity check matrix formation. Precaution must be exercised to obtain a row of entire 1's for the first byte prior to the seven rotations and special care must be taken to assure that no two columns have identical patterns of 1's and 0's. This is basically how the "rotational" parity check matrix is formed. The manner in which correction is achieved will be set forth subsequently.

Theoretical Description of the Dual Functioning of the Disclosed Translation System The implementation and use of rotational parity codes in a memory translator, as it is presently disclosed, will now be explained. First, examine the READ process. The basic steps are:

1. Formulate a parity bit for each byte by use of the parity check matrix and data and check bits.
2. Load both data byte and parity from the MR into the MDR registers for every byte of the word.
3. Form the syndromes from the parity check on the byte parity and its parity bit (formulated in Step 1) for each data byte.
4. Determine if an error condition exists in the data read out. If the data contains no errors, gate the word out to the CPU: otherwise, correct any single error or notify the CPU of any double errors.

Each of the four broad steps above will now be amplified to permit a better understanding of the invention. Initially, the parity bit for each byte is generated by taking the parity over a selected set of data bits and precisely one check bit. Observe the first row of the rotational check matrix shown in FIG. 17. There will be eight 1's in a row in the columns corresponding to $d_1$, $d_2, \ldots, d_8$. There will be a single 1 in the column (first row) under $c_1$ (column 65 in an eight byte, eight bits/byte rotational parity check matrix). There will also be a set of 1's corresponding to other data bits (neither for $c_1$ nor data bits in the first byte) which are hereby defined as the first row Parity Subset. Similar comments can be made about the structure of any such row of a rotational parity check matrix. The burden of proof remains, however, to show how the parity bit is to be generated. Therefore, define the following variables:

$y_1$ — the parity over the first row Parity Subset
$x_1$ — the parity over the first byte
$p_1$ — the parity bit to maintain odd parity across the first byte Note that a distinction is made here on the parity of a byte and the parity bit for the same byte. If parity (number of 1's) for a byte is even (an even number of 1's for byte data bits), the parity bit will be a 1 if odd parity is required for error detection.

The following equations derive from the above considerations for odd parity in use with a rotational parity check matrix.

$$x_1 \oplus y_1 \oplus c_1 = 1, \text{ where } c_1 \text{ is the first check bit,}$$

and $$x_1 \oplus p_1 = 1$$

By adding these equations together (addition mod 2), the sum is $$x_1 \oplus y_1 \oplus c_1 \oplus x_1 \oplus p_1 = 1 \oplus 1 = 0$$

and $$x_1 \oplus y_1 \oplus c_1 \oplus x_1 \oplus p_1 = x_1 \oplus x_1 \oplus (y_1 \oplus c_1) \oplus p_1$$

$$= p_1 \oplus (y_1 \oplus c_1) = 0.$$

Then, $$p_1 \oplus (y_1 \oplus c_1) \oplus (y_1 \oplus c_1) = 0 \oplus (y_1 \oplus c_1)$$

$$0 = y_1 \oplus c_1$$

when $y_1 \oplus c_1$ is added to both sides of the above equations. Hence, $$p_1 = y_1 \oplus c_1$$

The significance of this equation is that the parity bit for the first data byte is to be generated as the parity of the first row Parity subset and the check bit, $c_1$ (and does not include the actual bits of the first data byte).

The outputs of this parity generation circuitry are loaded directly into the byte parity positions of the MDR. Simultaneously, with this loading of the parity bits into MDR, the data bits of all bytes are transferred from MR to MDR. This completes Step 2 above.

Once the parity bits are generated (from $y_1 \oplus c_1$) and stored, the eight data bits of each byte (with parity $x_1$) and the associated parity bits are used as inputs to a parity (or XOR) tree. Since $y_1 \oplus c_1 = p_1$ and $x_1 \oplus p_1 = 1$, the output of this parity tree, $S_1$, will be a 1 for no error in the byte. This is done to generate a set of syndrome bits: for the embodiment, there will be one syndrome from each byte and its parity bit. If, however, there is a single error in the first byte, $x_1 \oplus p_1 = 0 = = S_1$ and an error condition will be signalled. This completes step 3 above and leads into step 4. As long as no error exists, $S_1 = S_2 = \ldots = S_8 = 1$ (for odd parity) and a signal, $NE$, can be formed as $NE = S_1 \circ S_2 \circ S_3 \circ \ldots \circ S_8$. If $NE = 1$, no error exists in the data word. Hence, it is not necessary to disturb the normal routing of the word currently stored in MDR out to the CPU. However, if $NE = 0$, it becomes necessary to suspend transfer of the word, determine the type of error — single or double — and take appropriate action. A single error is generated from knowing that $NE \neq 1$ because $\overline{NE} = 1$ indicates an error condition exists in the data word. But the term "error condition" does not define whether the error is single or double. To classify the error condition requires the use of one property of the parity check matrix. Any time a single data error exists, an odd number of the syndromes change. If one syndrome, and only one syndrome, changes, the error is in a check bit. It is not necessary that check bits be corrected in this translator; however, it is important that the parity bit generated by the use of the erroneous check bit be changed (inverted) to its correct value. Therefore, the need for this correction is determined and, if required, correction is performed on all parity bits by EXCLUSIVE-ORing them with the complement of the syndromes.

As an example of this, if the eight parity bits, $p_1, p_2, \ldots, p_8$ are given as $p_1 = 1$, $p_2 = 0$, $p_3 = 0$, $p_4 = 1$, $p_5 = 1$, $p_6 = 0$, $p_7 = 1$, $p_8 = 0$ and the syndromes $S_1, S_2, \ldots, S_8$ are $S_1 = 1$, $S_2 = 0$, $S_3 = S_4 = S_5 = S_6 = S_7 = S_8 = 1$. Since $S_2 = 0$, this implies that the second parity bit is erroneous. To correct the parities, then, the parities are replaced by $P \oplus \overline{S}$, where $p = (p_1, p_2, \ldots, p_8)$ and $\overline{S} = (\overline{S_1}, \overline{S_2}, \ldots, \overline{S_8})$. Then, for this example above, $$P \oplus \bar{S} = (1\oplus 0,\ 0\oplus 1,\ 0\oplus 0,\ 1\oplus 0,\ 1\oplus 0,\ 0\oplus 0,\ 1\oplus 0,\ 0\oplus 0) = (1, 1, 0, 1, 1, 0, 1, 0)$$

and this is the original parity bit set except that the second bit is inverted from the $P_2$ given above. It will be noted in the present embodiment on FIG. 2J that the set $\bar{S}$ is carried over to the MDR register on cables $\overline{100}$, $\overline{102}, \ldots, \overline{114}$.

For any other single data error, an odd number, in excess of one, of syndromes will change (there are an odd number of 1's in each column of the parity check matrix). Thus, a single error single can be formed if:

1. the error signal is a 1 ($\overline{NE}= 1$)
2. parity across the syndromes changes For the second case, it should be noted that, for eight syndromes (eight bytes) parity across the syndromes in normal, no-error operation is even, i.e., there are eight syndromes, all identically 1. However, if an odd number changes, the parity will change too to odd parity. Thus, the single error signal, $SE$, is formulated as $SE = \overline{NE}\,(S_1 \oplus S_2 \oplus \ldots \oplus S_8)$. If $SE = 1$, a single error signal exists in the data word read out of the memory. If there is an error signal ($\overline{NE} = 1$) and it is not a single error ($\overline{SE} = 1$), then it is a double error, $DE = \overline{NE} \wedge \overline{SE} = 1$ and an alert can be sent to the CPU.

If it is possible and necessary for a correction to be made on the data bits in the MDR (single data error), the data bits are gated into the Correction Circuit by clocks A, B, C or D and back through the MR and Connection Matrix to the MDR by the subsequent clock stages as will be explained later. Then, the data word, with all parity bits attached, can be routed to the CPU. Correction, of course, has been performed at this time as explained generally previously.

The WRITE process for the memory consists, broadly, of accepting a set of parity-encoded data bytes from the CPU (via the buss), checking the parity for each byte, re-encoding the data bits using the Connection Circuit, and depositing the newly re-encoded word in a register to be gated into the memory.

To handle the first two steps of a WRITE easily and avoid complicated controls and excess data moves, the incoming word is loaded into both the MDR and MR. The word is loaded in both places with all parity bits attached. The word loaded into the MDR is put there so that the parity bits for each byte can be checked using the existing EXCLUSIVE-OR Parity check trees that are used in the READ process to generate the syndromes from the previously generated parity bits and the data bits. For WRITE, however, the information coming out of the EXCLUSIVE-OR trees for each byte is or should be a set of 1's indicating that parity is satisfied for each byte or 0's in those parity positions in which byte parity is not correct for the associated byte. If parity is not correct, retransmission of the information will be required. However, if no error is indicated, then the word is ready to be re-encoded and put into memory.

The word that is to be re-encoded for storage is in the MR. (Otherwise, the word in the MDR would have to be moved to the MR and checking parity on it is not as effective.) Once the MDR version of the word is pronounced fit for storage, the check bits for the newly re-encoded form can be generated using the circuitry provided to implement the parity check matrix for a READ. The data bits and parity bits obey these equations $$x_1 \oplus y_1 \oplus c_1 = 1$$

$$x_1 \oplus p_1 = 1$$

shown previously for the case of the first row of the parity-check matrix in a READ. Once again, similar considerations apply for the other rows and data bytes.

Specifically, the above equations can be re-arranged to show that check bits can be generated from data and parity bits. From above developments, the equations shown are rearranged to give $$p_1 \oplus y_1 \oplus c_1 = 0$$

For the READ case, this equation was re-arranged to $c_1 \oplus y_1 = p_1$. For the WRITE case, the equation is re-arranged to give $p_1 \oplus y_1 = c_1$. This equation represents what is carried out on the word in the MR. The parity bit for each byte and the Parity Subset denoted by $y_1$ in the equation above for the first byte, are EXCLUSIVE-ORed together to provide the check bits required by the data bits in each byte prior to storage. The check bits are then physically stored in the parity bit position in the MDR. Once the check bits are generated, the word (data and check bits) can be removed from the MR, into which they have been loaded from the MDR during the re-encoding phase of the WRITE process, and stored.

The Formation of the Connection Matrix from the Parity Check Matrix

The following description of the basic parity matrix 9 and the full parity check matrix of FIG. 10 developed therefrom specifically describes the manner in which the Connection Matrix shown both on FIGS. 1 and 6 is formed. The theoretical discussion of the reasons such a check matrix must be utilized if the desired dual function circuitry is to be achieved and the way it is generated has just been described. The following discussion merely illustrates the particular use of a particular matrix having the desired properties suitable for use with the present embodiment.

To form the Connection Matrix referred to on FIGS. 1A & 1B and shown in detail on FIGS. 6A, 6B, 6C and 6D, the following procedure is used. Referring to FIG. 16, a matrix is first constructed having 8 columns and 8 rows. This matrix is then copied to the rectangle 410 on FIG. 17.

This does not mean that the top row of all "1's" is not important in understanding the mathematical rules that underlie this invention. For the specific purpose of constructing the interconnection matrix referred to above, the top row of "1's" is disregarded.

Figure 17:
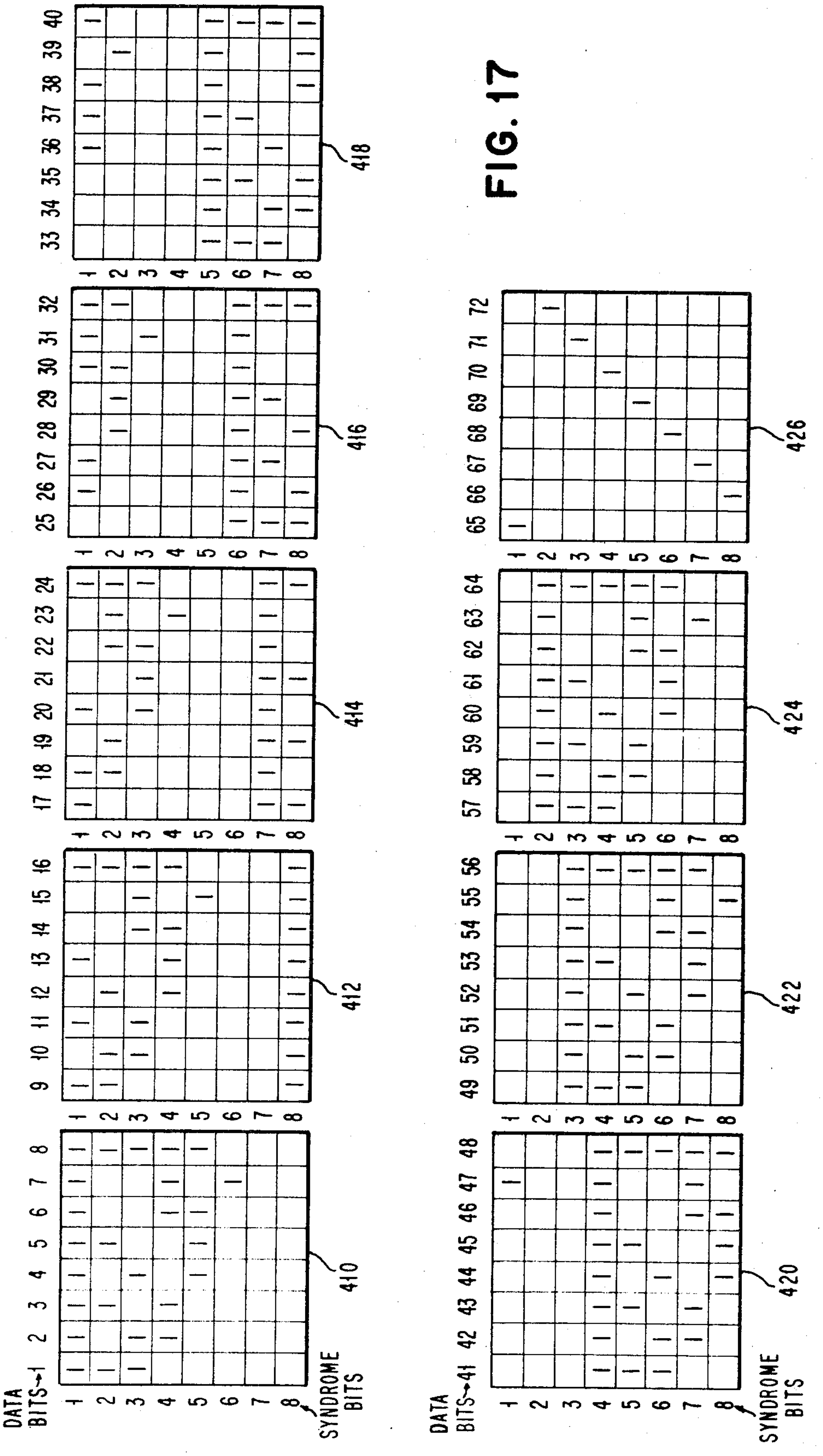
FIG. 17 comprises the parity-check or connection matrix of FIG. 16 shown in all of its rotational phases which is utilized to specify the actual connection of the middle connection of Matrix shown in FIG. 1A and also the connections for the actual correction patterns.

On FIG. 17, the rightmost rectangle 426 indicates the location of the check bits. To form the matrix shown in the rectangle 412 shown on FIG. 17, the matrix in rectangle 410 is rotated upwardly. In other words, the first row is replaced by the second row, the second row is replaced by the third row and so on. The topmost or first row goes to the bottom or the 8the row. The matrix shown in the rectangle 414 is the matrix of the rectangle 412 again rotated once vertically upwards as described before. The rectangle containing the matrix 416 is formed by rotating the matrix in the rectangle 414 once upwardly and so on in the same manner and constructing the matrices shown in rectangles 418, 420, 422 and 424. Thus, the matrix of the rectangle 412 is the matrix of 410 rotated once. The matrix in rectangle 414 is the matrix of 410 rotated twice. The matrix in rectangle 416 is the matrix 410 rotated three times. The matrix in rectangle 418 is the matrix 410 rotated four times. The rectangle 420 contains the matrix of 410 rotated five times. The matrix in 422 is the matrix of 410 rotated six times. The matrix in rectangle 424 is the matrix of 410 rotated seven times.

Considering next the nine rectangles on FIG. 17 labelled 410–426 inclusive as a single matrix of eight rows and 72 columns, it will be seen that this matrix corresponds to the configuration on FIGS. 6A, 6B, 6C and 6D. The 72 columns on FIG. 17 correspond to the 72 bits in the Register MR on the same figures. The eight rows on FIG. 17 correspond to the eight cables 204 through 218 inclusive on the figure. Still on the FIG. 17, it will be noted that each row contains 19 "1' s." Each "1" in a row of the matrix corresponds to the "1" output of the same numbered flip-flop of the MR register. For example, the first "1" appearing in row No. 1 is column No. 9. On FIG. 6A, it will be noted that the "1" output of flip-flop No. 9 is the first input to cable 204. The remainder of the connections of cable 204 are made by referring to the matrix, thus bits 11, 13, 17, 18, etc. are all connected to cable 204. The connections of the other cables are selected in exactly the same way by referring to the rows of the matrix of FIG. 17.

Methods of Constructing Parity-Check Matrices

The following is a general discussion of how a parity-check matrix would be constructed where there are a different number of bytes (byte parity bits) and check bits. If there are $m$ bytes of $b$ bits, then there are $mb=K$ data bits. Given $K$, the usual Hamming relationship set forth in the previously referenced book of W.W. Peterson, "Error Correcting Codes," determines the number of check bits $r$. All parity-check matrices will have $K+r$ columns and $r$ rows. The last $r$ columns will have one 1 and $(r-1)$ 0's arranged so the $r$ columns have a 1 in the 1st, 2nd, ..., $r$th row. Each column corresponds to a check bit.

Divide the $m$ bytes evenly into $r$ sets $T_i$. If $m=dr+e$ 0 $e \leq r$ put $d+1$ bytes into the first $e$ sets $T_1, \ldots, T_e$ and $d$ bytes into the last $(r-e)$ $T_{e+1}, \ldots, T_r$. Let set $T_i$ correspond to the $i^{th}$ check bit and the $i^{th}$ row. Begin by putting $b(d+1)$ into the first row under $T_1$, $b(d+1)$ 1's into the second row under $T_2$, and continue for the first $e$ sets. Now put $bd$ 1's into the $(e+1)^{st}$ row under the set $T_{e+1}$ and continue until under each set there are $b(d+1)$ or $bd$ 1's each in a separate row. (In Table I, rows 1 to 8 and in Table IV rows 1 to 7 with 8 bits on row 1, 4 on the rest.)

There are $$\binom{r}{3}=r\,\frac{(r-1)(r-2)}{6}$$

different ways of placing three 1's in $r$ places and $$\frac{(r-1)(r-2)}{2}$$

combinations of three 1's with a 1 in a particular row. Use all of the combinations of three bits, since the fewer 1's there are in a parity-check matrix, the fewer the connections and the fewer XOR circuits used.

For $r=7$, there are 35 such combinations possible and 32 for Table IV are needed. A possible choice is shown in Table IV. If more than $$\binom{r}{3}$$

are needed, then there are $$\binom{r}{5}=r\,\frac{(r-1)(r-2)(r-3)(r-4)}{120}$$

possible choices with five 1's, $$\binom{r}{7}$$

with seven, $$\binom{r}{9}$$

with nine and so on.

It is best to choose the 1's so that the number in each row is balanced so the circuit delays are approximately equal. One way is to make one choice — say, column 1 in Table I, then rotate the choice through all the bytes, then make a second and rotate it, etc. Care must be taken to make these all distinct. Choose the last ones by picking from what is left and moving columns if necessary.

Example 1: $m<r$

The example with two bytes and six check bits in Table II will help clarify the following statements.

(a) For the cases in which a check bit is formed using all the data bits in a byte ($c_1$ and $c_4$ in the example), form the parity bit and the syndrome bit as before.

(b) Form the other syndrome bits as usual, e.g., take the XOR of the proper subset of data bits for each check bit ($s_2, s_3, s_5, s_6$ in the example).

(c) Form the error signals and perform the correction, if necessary, just as before using the syndrome and parity bits.

(d) Once again, the number of bits in a byte are arbitrary. See the example in Table III with four bit bytes and six check bits.

Example 2: $m>r$

Figure 18:
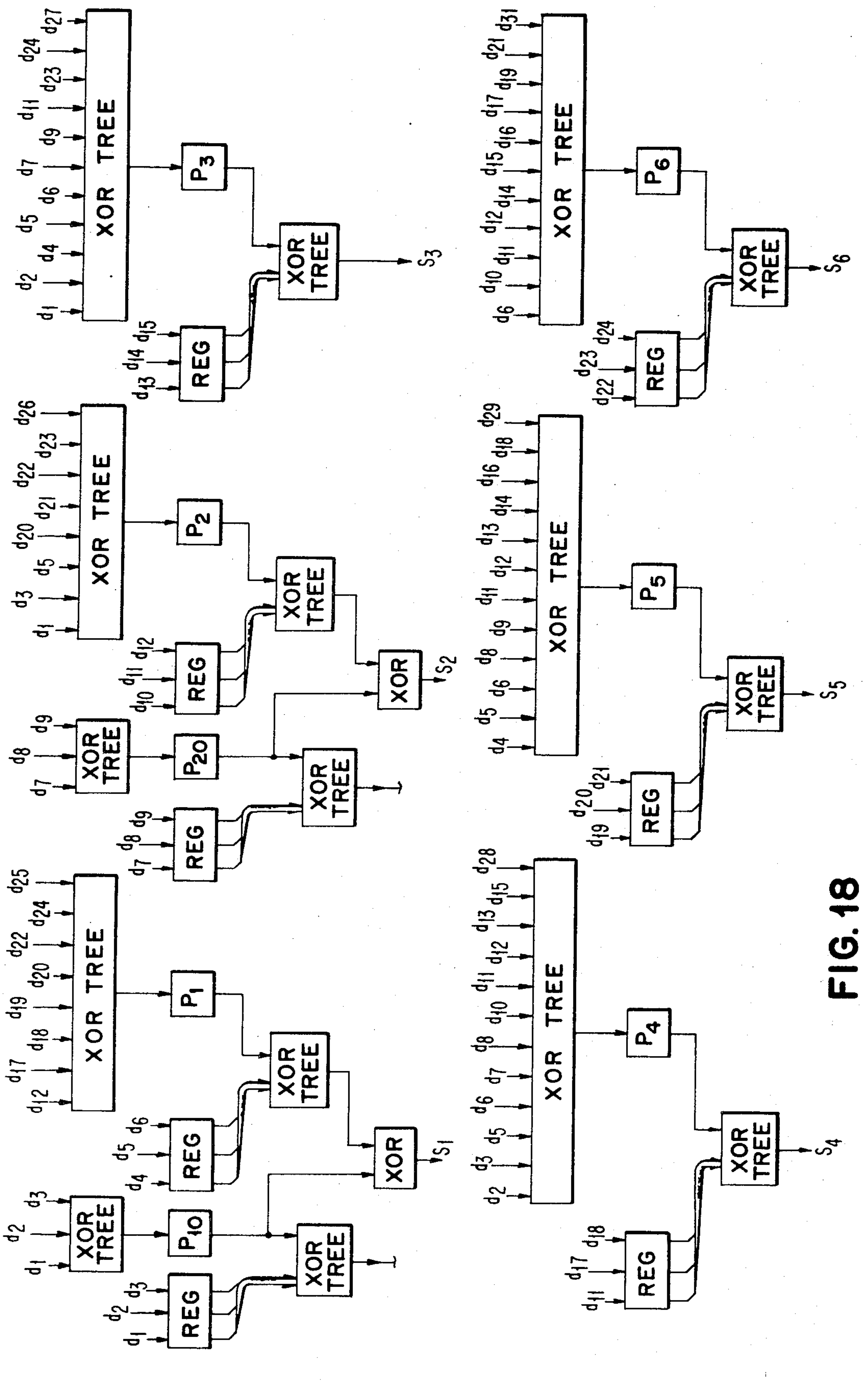
FIG. 18 comprises a logical schematic diagram of the syndrome circuitry necessary for an example where the number of bytes and check bits is different.

In this case, every check bit will correspond to a set of data bits, and each set of data bits will contain one or more whole bytes. Table IV and FIG. 18 illustrates one example of this case, including the circuitry required to implement the syndromes from subsets of data bits as dictated by the parity-check matrix.

(a) Follow the procedures as before to get a parity bit for the whole set using one check bit and the translator.

(b) Split each set containing $n$ (two or more) bytes into $n$ parts. Generate $n-1$ parity bits for the first $n-1$ bytes and use this parity bit for the byte parity check. The $n$th byte will use the original parity bit.

(c) Form the XOR of the generated parity bits and the $n$th parity check (the one using the parity bit formed from translation) to get the syndrome bit corresponding to the check bit.

(d) Perform all error signals and corrections using the syndrome bits and the equations used before.

(e) Once again, any number of bits can form a byte, as shown in the example above using three bit bytes.

TABLE I $M = 8, b = 4, k = 8 \times 4 = 32, r = 7\ 8 = 7 \times 1 + 1$

| 1 2 3 4 5 6 7 8 9 10 | 11 12 13 14 15 16 17 18 19 20 | 21 22 23 |
|---|---|---|
| 1 1 1 1 1 1 1 1 0 0 | 0 0 0 0 0 0 0 0 | |
| | 0 1 | 0 1 0 |
| 1 0 1 0 1 0 0 0 1 1 | 1 1 0 0 0 0 0 0 | |
| | 0 0 | 0 0 1 |
| 1 1 0 1 0 0 0 0 1 0 | 1 0 1 1 1 1 0 0 | |
| | 0 0 | 0 0 0 |
| 0 1 1 0 0 1 1 0 1 1 | 0 1 1 0 1 0 1 1 | |
| | 1 1 | 0 0 0 |
| 0 0 0 1 1 1 0 1 0 1 | 1 0 1 1 0 1 1 0 | |
| | 1 0 | 1 1 1 |
| 0 0 0 0 0 0 0 1 0 0 | 0 1 0 1 1 0 1 1 | |
| | 0 1 | 1 0 1 |
| 0 0 0 0 0 0 1 0 0 0 | 0 0 0 0 0 1 0 1 | |
| | 1 0 | 1 1 0 |

| 24 25 26 27 28 29 30 | 31 32 33 34 35 36 37 38 39 |
|---|---|
| 0 1 1 0 0 1 | |
| 0 | 1 0 1 0 0 0 0 0 |
| | 0 |
| 1 0 1 1 0 1 | |
| 1 | 0 1 0 1 0 0 0 0 |
| | 0 |
| 0 0 0 0 1 0 | |
| 1 | 1 0 0 0 1 0 0 0 |
| | 0 |
| 0 0 0 0 0 0 | |
| 0 | 0 1 0 0 0 1 0 0 |
| | 0 |
| 1 0 0 0 0 0 | |
| 0 | 0 0 0 0 0 0 1 0 |
| | 0 |
| 0 1 1 1 1 0 | |
| 0 | 0 0 0 0 0 0 0 1 |
| | 0 |
| 1 1 0 1 1 1 | |
| 1 | 1 1 0 0 0 0 0 0 |
| | 1 |

TABLE II $k = 16, r = 6, n = 22$, 2 bytes

| | | $d_1$ 1 | $d_2$ 2 | $d_3$ 3 | $d_4$ 4 | $d_5$ 5 | $d_6$ 6 | $d_7$ 7 | $d_8$ 8 |
|---|---|---|---|---|---|---|---|---|---|
| Parity | $S_1$ | 1 | 1 | 1 | 1 | 1 | 1 | 1 | 1 |
| Connection | $S_2$ | 1 | 1 | 1 | 1 | 0 | 0 | 0 | 0 |
| Matrix | $S_3$ | 1 | 0 | 0 | 0 | 1 | 1 | 1 | 0 |
| | $S_4$ | 0 | 1 | 0 | 0 | 1 | 0 | 0 | 0 |
| | $S_5$ | 0 | 0 | 1 | 0 | 0 | 1 | 0 | 1 |
| | $S_6$ | 0 | 0 | 0 | 1 | 0 | 0 | 1 | 1 |

| $d_9$ 9 | $d_{10}$ 10 | $d_{11}$ 11 | $d_{12}$ 12 | $d_{13}$ 13 | $d_{14}$ 14 | $d_{15}$ 15 | $d_{16}$ 16 |
|---|---|---|---|---|---|---|---|
| 0 | 1 | 0 | 0 | 1 | 0 | 0 | 0 |
| 0 | 0 | 1 | 0 | 0 | 1 | 0 | 1 |
| 0 | 0 | 0 | 1 | 0 | 0 | 1 | 1 |
| 1 | 1 | 1 | 1 | 1 | 1 | 1 | 1 |
| 1 | 1 | 1 | 1 | 0 | 0 | 0 | 0 |
| 1 | 0 | 0 | 0 | 0 | 0 | 0 | 0 |

| $c_1$ 17 | $c_2$ 18 | $c_3$ 19 | $c_4$ 20 | $c_5$ 21 | $c_6$ 22 |
|---|---|---|---|---|---|
| 1 | 0 | 0 | 0 | 0 | 0 |
| 0 | 1 | 0 | 0 | 0 | 0 |
| 0 | 0 | 1 | 0 | 0 | 0 |
| 0 | 0 | 0 | 1 | 0 | 0 |
| 0 | 0 | 0 | 0 | 1 | 0 |
| 0 | 0 | 0 | 0 | 0 | 1 |

TABLE III $k = 16\ r = 6\ n = 22$ 4 bytes

| | $d_1d_2d_3d_4$ 1 2 3 4 | $d_5d_6d_7d_8$ 5 6 7 8 | $d_9d_{10}d_{11}d_{12}$ 9 10 11 12 |
|---|---|---|---|
| $S_1$ | 1 1 1 1 | 0 0 0 0 | 0 1 1 0 |
| $S_2$ | 1 1 0 0 | 1 1 1 1 | 0 0 0 0 |
| $S_3$ | 1 0 1 1 | 1 1 0 1 | 0 0 0 1 |
| $S_4$ | 0 1 1 0 | 1 0 1 0 | 1 1 1 1 |
| $S_5$ | 0 0 0 0 | 0 1 1 0 | 1 1 0 0 |
| $S_6$ | 0 0 0 1 | 0 0 0 1 | 1 0 1 1 |

| $d_{13}$ 13 | $d_{14}$ 14 | $d_{15}$ 15 | $d_{16}$ 16 | $c_1$ 17 | $c_2$ 18 | $c_3$ 19 | $c_4$ 20 | $c_5$ 21 | $c_6$ 22 |
|---|---|---|---|---|---|---|---|---|---|
| 1 | 0 | 1 | 0 | 1 | 0 | 0 | 0 | 0 | 0 |
| 0 | 1 | 1 | 0 | 0 | 1 | 0 | 0 | 0 | 0 |
| 0 | 0 | 0 | 1 | 0 | 0 | 1 | 0 | 0 | 0 |
| 0 | 0 | 0 | 0 | 0 | 0 | 0 | 1 | 0 | 0 |
| 1 | 1 | 1 | 1 | 0 | 0 | 0 | 0 | 1 | 0 |
| 1 | 1 | 0 | 1 | 0 | 0 | 0 | 0 | 0 | 1 |

TABLE IV

| 1 2 3 4 5 6 | 7 8 9 | 10 | 11 | 12 | 13 | 14 | 15 | 16 | 17 | 18 |
|---|---|---|---|---|---|---|---|---|---|---|
| 1 1 1 1 1 1 | 0 0 0 | 0 | 0 | 1 | 0 | 0 | 0 | 0 | 1 | 1 |
| 1 0 1 0 1 0 | 1 1 1 | 1 | 1 | 1 | 0 | 0 | 0 | 0 | 0 | 0 |
| 1 1 0 1 1 1 | 1 0 1 | 0 | 1 | 0 | 1 | 1 | 1 | 0 | 0 | 0 |
| 0 1 1 0 1 1 | 1 1 0 | 1 | 1 | 1 | 1 | 0 | 1 | 1 | 0 | 1 |
| 0 0 0 1 1 1 | 0 1 1 | 0 | 1 | 1 | 1 | 1 | 0 | 1 | 0 | 1 |
| 0 0 0 0 0 1 | 0 0 0 | 1 | 1 | 1 | 0 | 1 | 1 | 1 | 0 | 0 |

| 19 | 20 | 21 | 22 | 23 | 24 | 25 | 26 | 27 | 28 | 29 | 31 |
|---|---|---|---|---|---|---|---|---|---|---|---|
| 1 | 1 | 0 | 1 | 0 | 1 | 1 | 0 | 0 | 0 | 0 | 0 |
| 0 | 1 | 1 | 1 | 1 | 0 | 0 | 1 | 0 | 0 | 0 | 0 |
| 0 | 0 | 0 | 0 | 1 | 1 | 0 | 0 | 1 | 0 | 0 | 0 |
| 0 | 0 | 0 | 0 | 0 | 0 | 0 | 0 | 0 | 1 | 0 | 0 |
| 1 | 1 | 1 | 0 | 0 | 0 | 0 | 0 | 0 | 0 | 1 | 0 |
| 1 | 0 | 1 | 1 | 1 | 1 | 0 | 0 | 0 | 0 | 0 | 1 |

Description of the Disclosed Error-Detection System shown in FIGS. 6A–6H and FIGS. 2B and 2C At this point, it is assumed that the reader is familiar with the previous general descriptions of the operation of the system as well as familiar with the theoretical considerations such as the design of the multi function Connection Matrix and more particularly as to how it is constructed from the parity-check matrix. The following description is for the purpose of specifying just how data is gated from the initial input register MR down through the Connection Matrix into the register MDR. Further, the data flow and circuit components utilized in generating the syndrome bits, distinguishing between different types of error conditions and finally the circuitry responsible for making data bit corrections. It should of course be clearly understood that the present embodiment is intended to be exemplary only in that many changes in the form and details of the particular hardware, the gating arrangements, timing components, testing mechanisms, etc. could readily be accomplished by a person skilled in the art without departing from the spirit and scope of the present invention as will be set forth in the pending claims.

Figure 2:
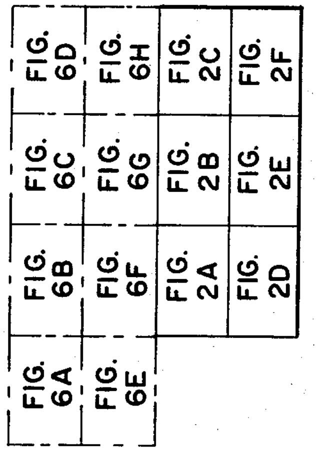
FIG. 2 comprises an organizational drawing for FIGS. 2A through 2F.

Although the specific detection embodiment is actually comprised of the composite of FIGS. 6A–6H and FIGS. 2B and 2C as shown in FIG. 2, whenever general reference is made to the figure, it will simply be called FIG. 6 for the sake of convenience. However, in certain instances when referring to specific circuitry, the particular figure designation will be set forth.

Referring now to the disclosed embodiment, the MR register is shown appearing across the top of FIG. 6 and specifically extends across FIGS. 6A, 6B, 6C and 6D. It is assumed that gating means are provided in the memory and the CPU to load this register although these are not shown specifically. In this register, bits numbering 1–64 are used for the eight data bytes of 8 bits each and the bits 65–72 are used for the eight check bits. The Connection Matrix also specifically shown on FIG. 1 is implemented in the embodiment of FIG. 6 by the eight cables numbered 204, 206, 208, 210, 212, 214, 216 and 218. Each of these cables has 19 inputs from the MR register as explained previously. Eighteen of these inputs are from the data bits and one is from the check bits. Each of the cables just mentioned is applied to an EXCLUSIVE-OR tree circuit. There are eight of these EXCLUSIVE-OR tree circuits labelled 172–186 inclusive. As mentioned previously, the details of one of the 19 input EXCLUSIVE-OR trees is shown on FIG. 15. The eight data bytes of eight bits each in the MR register are applied to the eight gates 188 through 202 inclusive. These eight gates correspond to gate 124 on FIG. 1A, and are all enabled by a CR-1, CW-1, A-3, B-5, C-2, or signal applied to OR gate 125 which in turn produces an output on wire 126. The outputs of the EXCLUSIVE-OR trees 172–186 inclusive are also applied to the gates 188–202 inclusive. Referring now to the right-hand portion of FIG. 6D, the wire 156 produces the parity bit for a byte number symbol 1. The wire 158 produces the parity bit for byte No. 8. The wire 160 produces the parity bit for byte No. 7. The wire 162 produces the parity bit for byte No. 6. The wire 164 produces the parity bit for byte No. 5. the wire 166 produces the parity for byte No. 4. The wire 168 produces the parity bit for byte No. 3 and the wire 170 produces the parity bit for byte No. 2. As was explained previously, the connections of the Connection Matrix relative to the specific data and check bits is directly determinable from the rotational parity-check matrix shown on FIG. 17 and generally described previously. During a read access, the CR clock is started shortly after the MR register is loaded. The CR-1 pulse is applied through an OR circuit 125 to wire 126 in order to ingate the MDR register and also to gate 340 in order to ingete the register S shown on FIG. 2J which is utilized to store the syndrome bits. The register MDR is made up of eight sections of nine bits each. Each section contains eight data bits and one parity bit. Each nine bit section is applied to one of the EXCLUSIVE-OR trees 222–236 inclusive. These inclusive OR trees are similarly to the detailed EXCLUSIVE-OR tree illustrated in FIG. 15 except that they have nine inputs instead of the nineteen shown in FIG. 15. The eight outputs of the just-mentioned EXCLUSIVE-OR circuits are utilized to set the eight syndrome bits in the register S shown on FIG. 2C.

From CR-1 the clock advances to CR-2. The CR-2 pulse is used to test to see whether or not there is an error. If odd parity is used, a no error condition is indicated when all of the *S* bits are 1. In other words, on FIG. 2B, line 238 will be active if there is no error and line 240 will be active if there is an error. This is true because the AND circuit 237 will be enabled by all ones appearing in the *S* register as will be readily understood. The CR-2 pulse is applied to gate 242 still on FIG. 2B in order to test the condition of wires 238 and 240. If there is no error, the clock will branch to CR-4 via wire 396. This in effect will tell the system to send the data appearing in the MDR register out to the CPU or elsewhere in the system since no error is present. If there is an error, however, the clock will branch to CR-3 via wire 398. Wires 396 and 398 are also shown on FIGS. 10 where they effect the just-mentioned branching of the CR clock sequence. If line 240 is active, it necessarily indicates the presence of an error and it is next necessary to test to see if the error is a single error or not. This is done by the clock pulse CR-3, which is applied to gate 244 on FIG. 2B in order to make this test. If there is a single error, the EXCLUSIVE-OR tree 246 will have a "1" output. This is because an odd number of ones will be present in the *S* Register in the case of a single error. The AND circuit 248 will have an output because line 240 is active. If AND circuit 248 has an output at the time the CR-3 pulse is applied to gate 244, the clock will branch to CR-6 via the wire 400. This implies a single error. If AND circuit 248 does not have an output at the time that the CR-3 pulse is applied to gate 244, the clock will branch to stage CR-5 via wire 402. Wires 400 and 402 are also shown on the CR clock circuit on FIG. 10. The clock pulse CR-5 causes a system interrupt. This is because a double error has been detected and it is not possible to make a correction. Accordingly, some other mechanism provided by the operating system must be called into play at this time. However, this has no bearing on the present invention. Assuming now that line 400 was active, clock step CR-6 is activated which initiates the correction procedure.

What must now be determined is whether or not the single error was a check bit error requiring only correction of the specific check bit involved which must be performed as a parity bit correction back in the MDR Register or a single data bit error. This is done by applying clock pulse CR-6 to the gate 250 on FIG. 2C. Gate 250 receives a true and complement input from the output of OR block 251. OR block 251 is corrected to the eight lines labelled B1 through B8 on FIGS. 2C and 2F. As will be explained subsequently, these lines are corrected to the syndrome Register *S* and one and only one of the lines will be set to a "1" if an error is present in a particular byte. Thus, if one line B1–B8 is at "1," OR 251 will be enabled indicating a data error. Hence, if the OR block 251 produces an output, it will mean that a byte error has been diagnosed activating line 354 and initiating the clock pulse CR-7. This clock pulse is applied to the line 254 in FIGS. 6E, 6F, 6G and 6H. It will be noted that this clock pulse is gated into each of the gates such as 255 appearing below each of the bit storage locations of the MDR register. The function of the pulse is to EXCLUSIVE-OR the complement contents of the *S* Register with the contents of the parity bit storage location of the MDR register. This is done with the EXCLUSIVE-OR circuit such as 257. The outputs of the EXCLUSIVE-OR circuit then pass through the gate circuits 255 and in effect any parity bit stored in the parity bit storage location of the MDR register will be changed via the just-described circuitry on the initiation of a clock pulse CR-7 provided that the associated syndrome bit for that particular byte parity is set at a "0." Thus, by way of example, referring to the byte No. 1 storage location of the MDR Register appearing in the lefthand portion of FIG. 6E, assume that the parity bit is set to a "1." Assume also that the syndrome bit position 1 has indicated a check bit error in this location thereby activating the line $\overline{100}$. This being the case, there will be no output from the EXCLUSIVE-OR circuit 257 which in turn will produce an output from the inverter 259 which signal will pass through the gate circuit 255 on the occurrence of a clock pulse CR-7, and will reset the bit location through OR circuit 261 to "0." In all those parity bit locations where the corresponding syndrome bit in the S Register is a "1," the parity bit will not be changed by the just-described circuitry on the application of the clock pulse CR-7.

Assuming now that a single error is detected and the correction is to be made, line 404 is activated by applying the clock pulse CR-6 to gate 405. The activation of line 404 initiates the single data error correction clock sequences A, B, C and D shown on FIGS. 11–14.

The operation of the correction circuitry and, more specifically, the four embodiments thereof under control of the A, B, C and D clocks form the details of the present invention and will be set forth in detail subsequently. For the present description, it is assumed that the correction in the data bit is wide and the corrected data word returned into register MR from where it is gated through the Connection Matrix and back into register MDR.

Completion of the correction operation completes the description of a memory read access. Next a write access will be described, it being remembered that FIGS. 7 and 8 describe the process and also the CW clock which controls the system during a memory write cycle. It will be remembered that prior to a write cycle, both the MR and the MDR registers are loaded with both data and parity bits appearing on the line from the CPU. But first a check must be made to see if the parity is correct on the received data in the MDR register. This is done by applying the clock pulse CW-1 on line 145 to ingate the S Register through the EXCLUSIVE-OR circuits 222–236 on FIGS. 6E, 6F, 6G and 6H. As described previously, this merely performs a parity check and assuming odd parity is present, the S Register should now contain all ones. The turn off of CW-1 initiates CW-2 is applied to line 148 on FIG. 2B and tests the contents of the S Register for correct parity or all ones by examining the output of the AND circuit 237. If line 238 is active, it indicates that the S Register was truly set to all ones and no error is present which initiates clock pulse CW-4. If on the other hand, a parity error is detected, this branches the system to clock pulse CW-3 which will signal the system that a parity error has been detected and that the data must be retransferred into the MR and MDR registers.

Figure 2F:
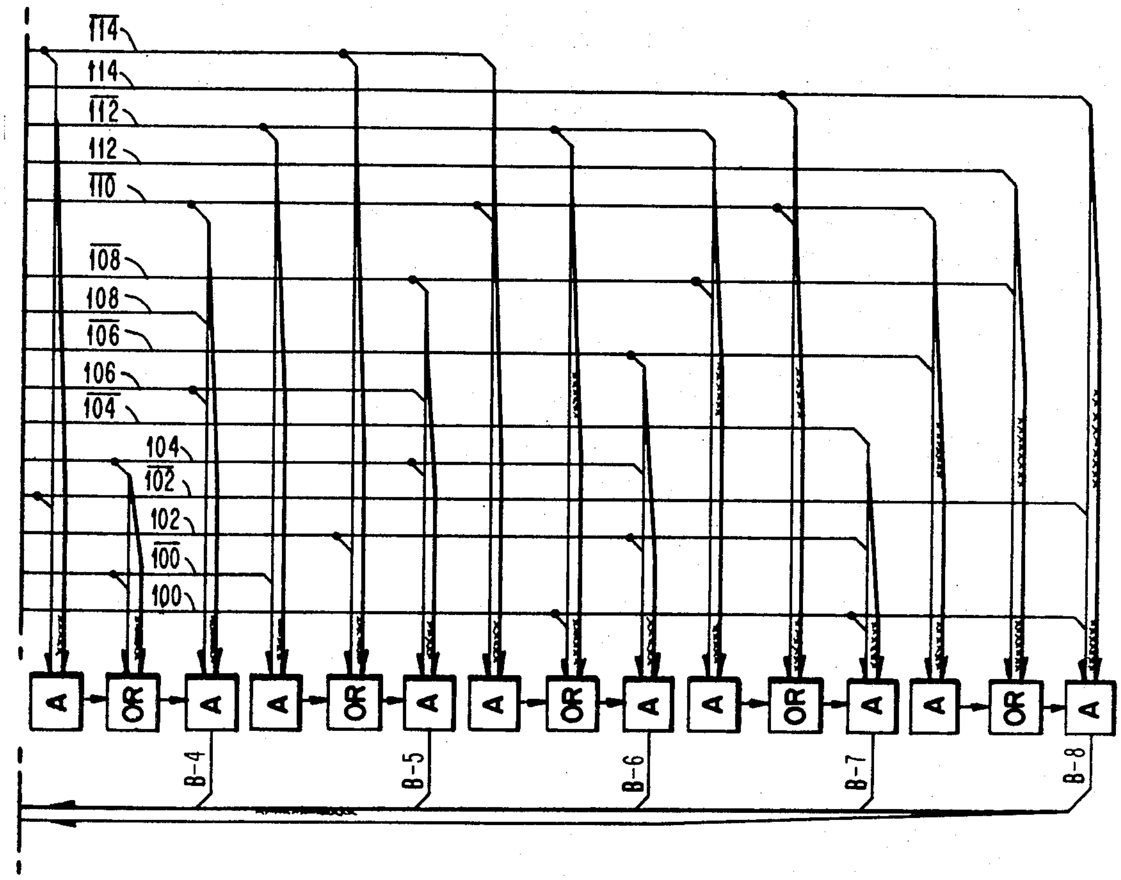
FIGS. 2A through 2F constitute a combination functional and logical block diagram of the present embodiment of the present invention.
Figure 2A:
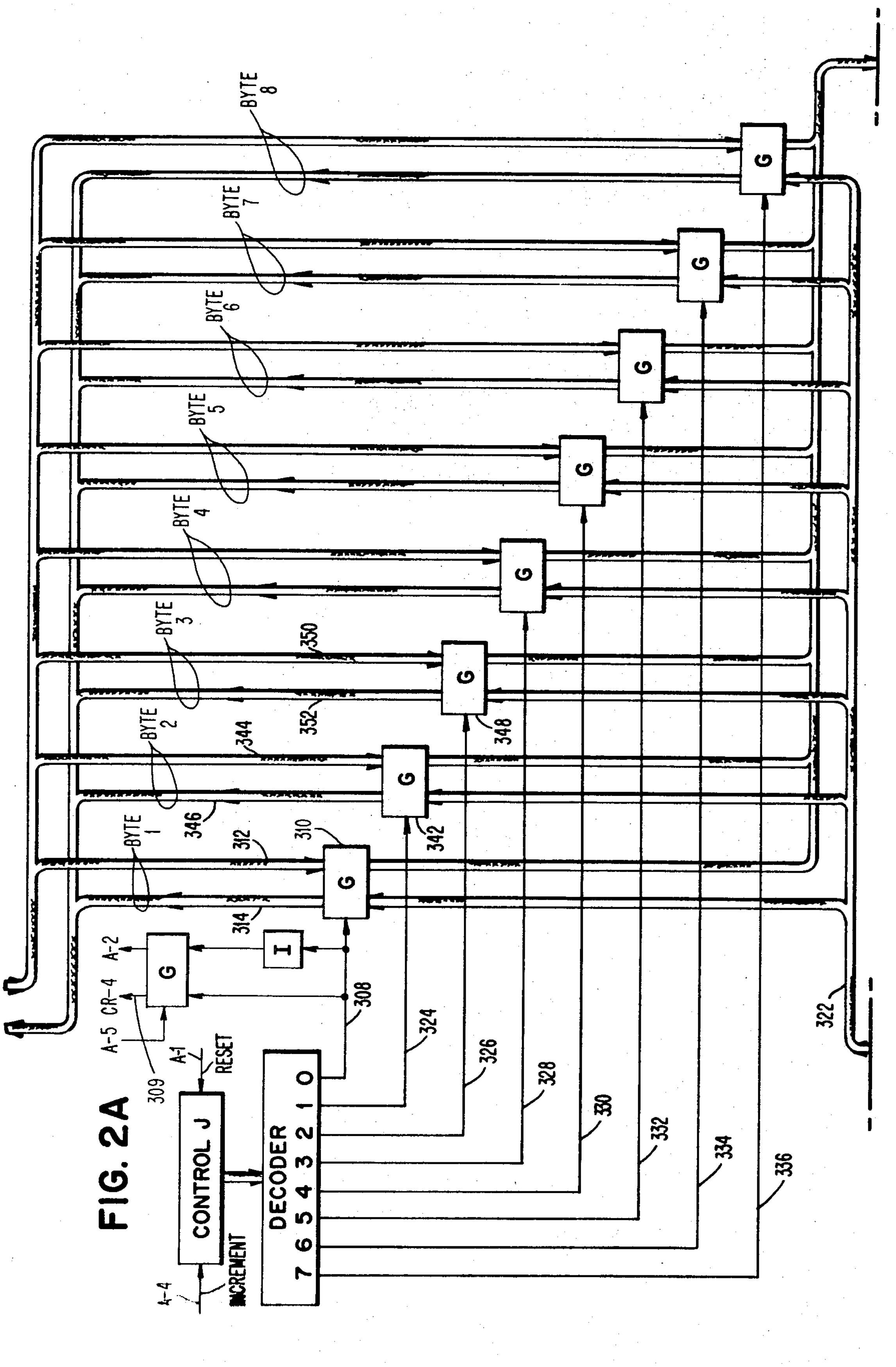
Figure 2B:
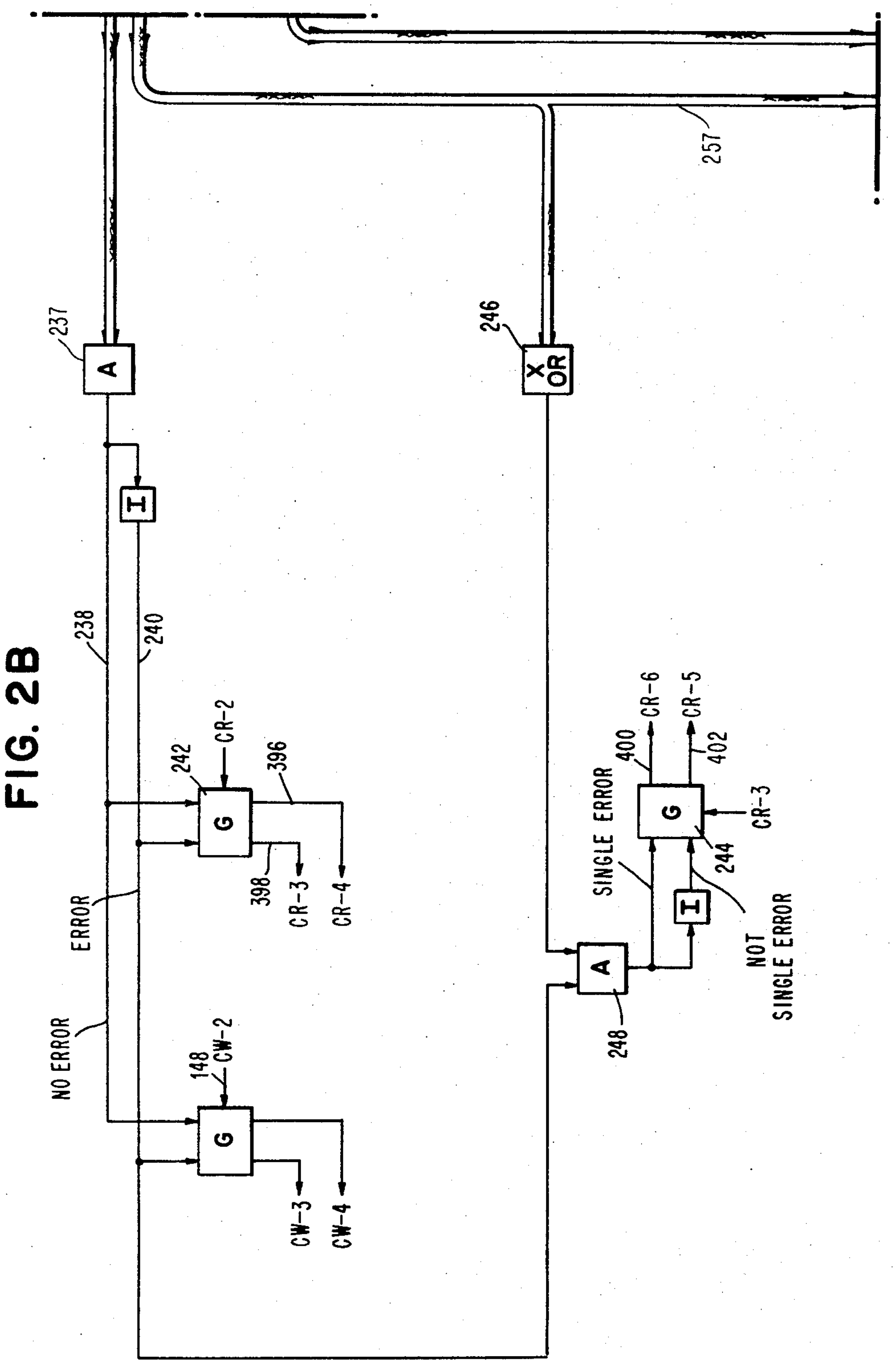

Assume next that no error has occurred and that line 149 on FIG. 2B is activated. This line then actuates the clock stage CW-4, which is applied via line 126 through OR circuit 125 to gate the contents of the MR register through the Connection Matrix to generate the required check bits and store them in the appropriate check bit storage locations of the MDR register. It will be noted that line 125 emanates from the OR circuit 125 on FIG. 6D. The turn off of CW-4 initiates clock stage CW-5 which in effect sends a "data valid" write memory signal to the memory whereby the entire contents of the MDR register which now contains the correct data bits and also the generated check bits are sent to the memory where they will be appropriately stored.

This completes the description of the write access for the system and thus completes the overall description of the disclosed embodiment of FIGS. 6A through 6H and FIGS. 2B and 2C without the details of the present correction circuitry.

As stated previously, many changes in modifications could be made in the details of the overall embodiment without departing from the broad teachings of the present invention. Also, the particular check code, word size and obviously the parity-check matrix could also be changed. In the present example, there are a total of 64 bits broken up into eight bytes of eight bits each together with eight check bits for a Hamming code having the desired properties of single-error correction and double-error detection. As was apparent in the previous discussion of Hamming codes, the situation can certainly arise wherein the particular byte size and the number of bits per byte may be such in a given instance that the number of byte parity bits will differ from the number of check bits and thus syndrome bits. In this situation, the Connection Matrix can still be utilized for the purpose of generating the parity bits that are necessary and also the same number of syndrome bits. However, for additional syndrome bits special purpose circuitry just for that purpose must be dedicated. Accordingly, it would be appreciated that the ultimate utilization of the present invention is in a system where there are the same number of syndrome bits and byte parity bits for ultimate utilization of the dual function circuitry.

The preceeding description of the disclosed error-detection circuitry explained the overall operation of an SEC/DED Hamming type coding circuitry insofar as it allows the generation of syndrome bits which are subsequently utilized to detect error conditions as well as to correct same. Also, the overall operation of such an error detection and correction system has been set forth with the description of the operation of the CR clock and the CW clock. Further, the above description indicates the manner in which a parity-bit error is detected and corrected as well as how a double error situation is handled. The above two error conditions, although they must be detected, do not form an essential part of the present invention which relates primarily to the correction of single-data errors.

It should be understood, however, that the specific translation circuitry disclosed and described herein is not essential to the present error-correction system. In other words, any error-detection system capable of generating the proper syndrome bits and provided with overall circuitry to control memory "read" and "write" operations are all that would be required. However, for the preferred embodiments, a rotational SEC/DED code would have to be used in order to maintain the proper bit-correction patterns in the correction circuitry as will be apparent from the following description.

Figure 2C:
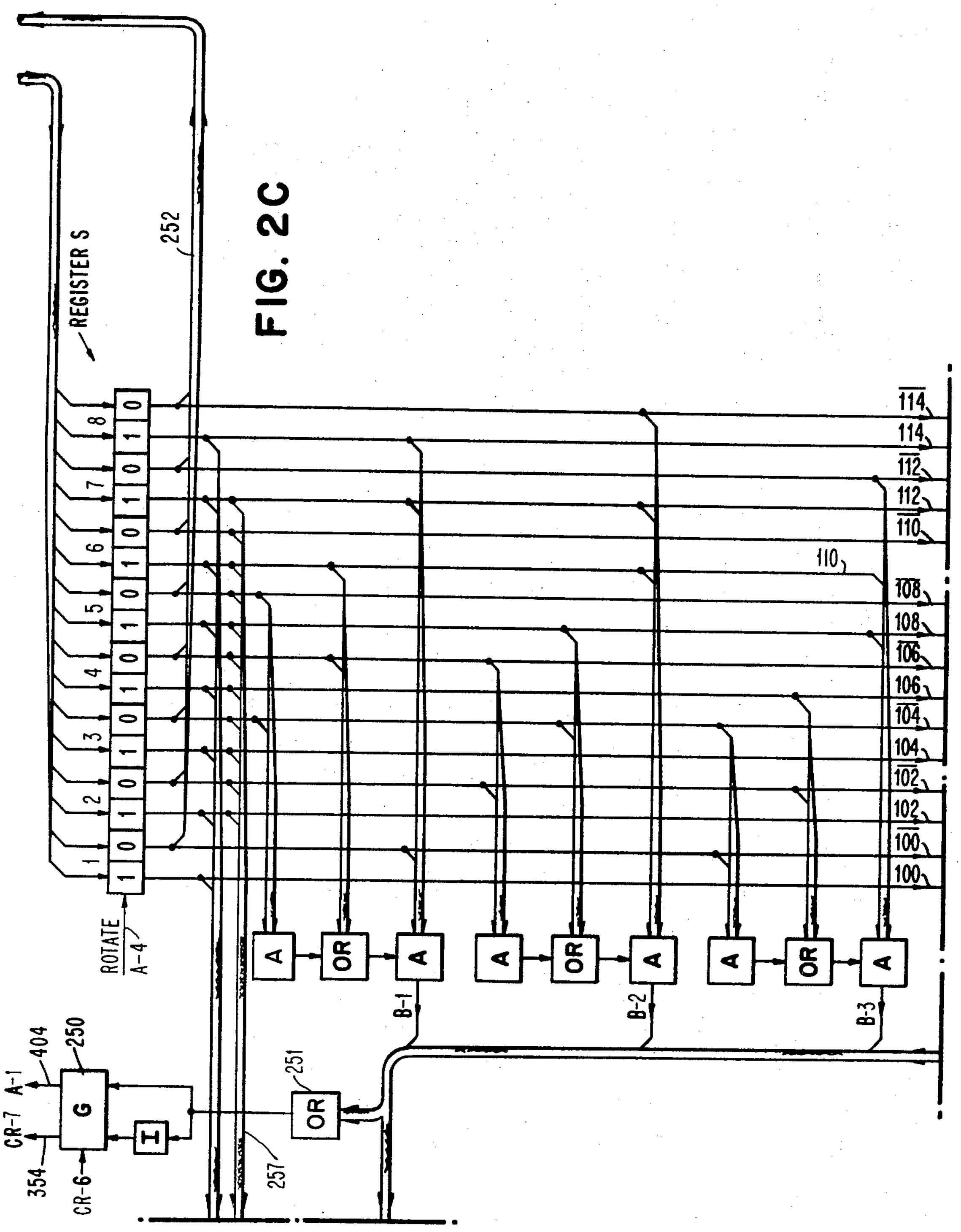
Figure 2D:
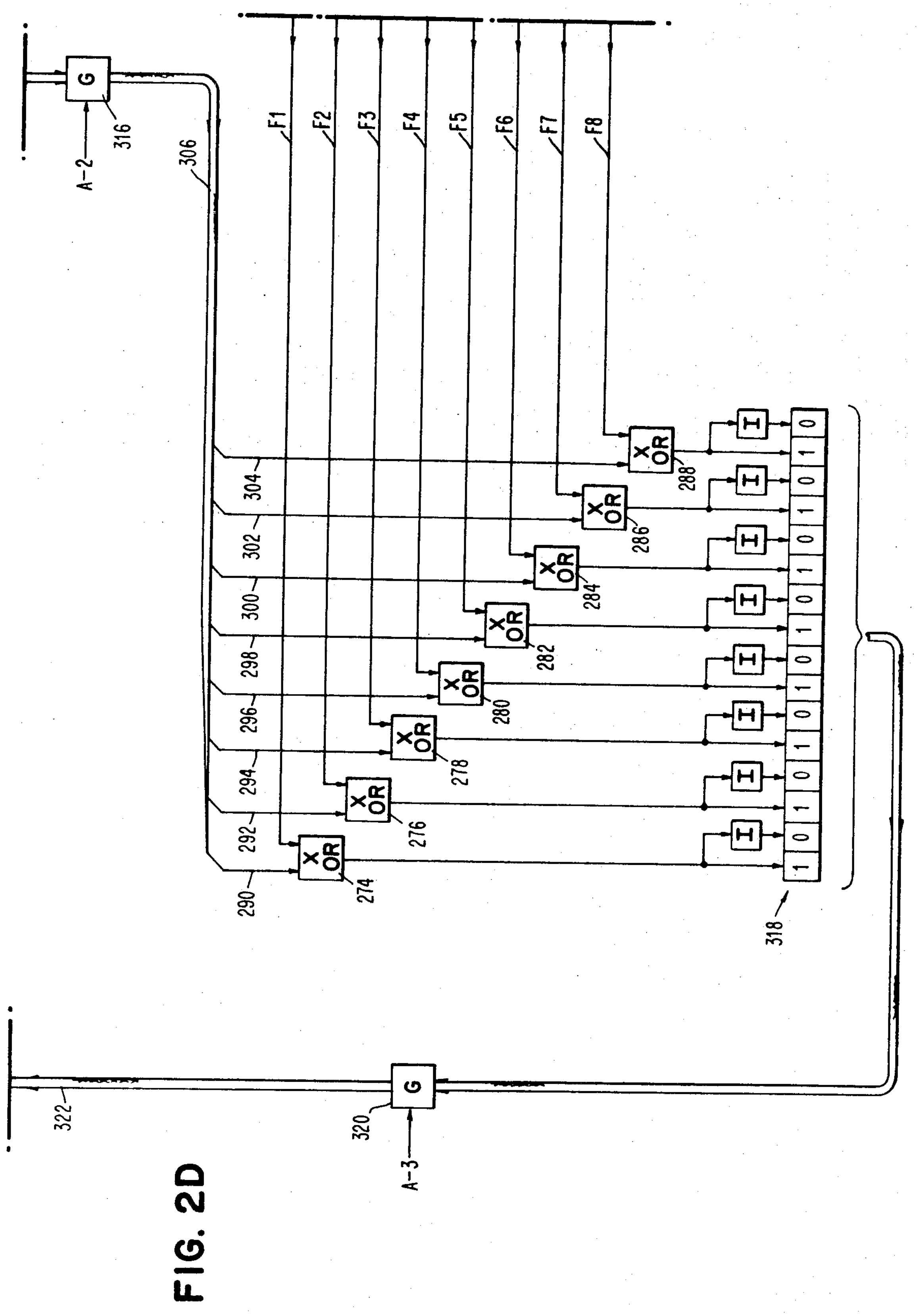

It should be noted that in the previous description of the operation of the system the error-detection circuitry was stated to be in FIGS. 6A through 6H and also FIGS. 2B and 2C. However, it will be noted that the Register S as well as the gating and timing controls shown on FIGS. 2B, 3B, 4B and 5B are essentially identical and further, that the operation and organization of the Register S is identical on FIGS. 2C, 3C, 4C and 5C. The only exception to this is that on FIG. 4C and the embodiment wherein the incorrect byte is immediately identified and the correction-bit pattern sent immediately to the correction circuitry, it is not necessary to utilize a "rotate" input to the Register S. However, this will be apparent from the following specific description of FIG. 4. Also, in the four embodiments of FIGS. 2, 3, 4 and 5, wherever a control line performs substantially the same function in a different embodiment, the same reference numerals are used. Thus, for example, the same numbers are used on the B FIGS. of the drawings for the various gate circuits which control "tests for branch" conditions. Similarly, the output line 400 from the gate circuit 250 in the C FIG. of these four embodiments, is labeled 404 in each case even though in the various embodiments it initiates the first clock sequence of the respective clocks A, B, C and D.

As stated generally in the early portion of the specification, one of the significant contributions of the present invention is the design of a "byte-error indication circuit." It has been found that by suitably testing various ones of the syndrome bits stored in the Register S, an immediate identification of the byte in error may be made when a single error exists in the data word. A general discussion of the characteristics of the code pattern which allows this test to be made will follow as well as the specific description of the four embodiments of FIGS. 2, 3, 4 and 5.

Figure 2E:
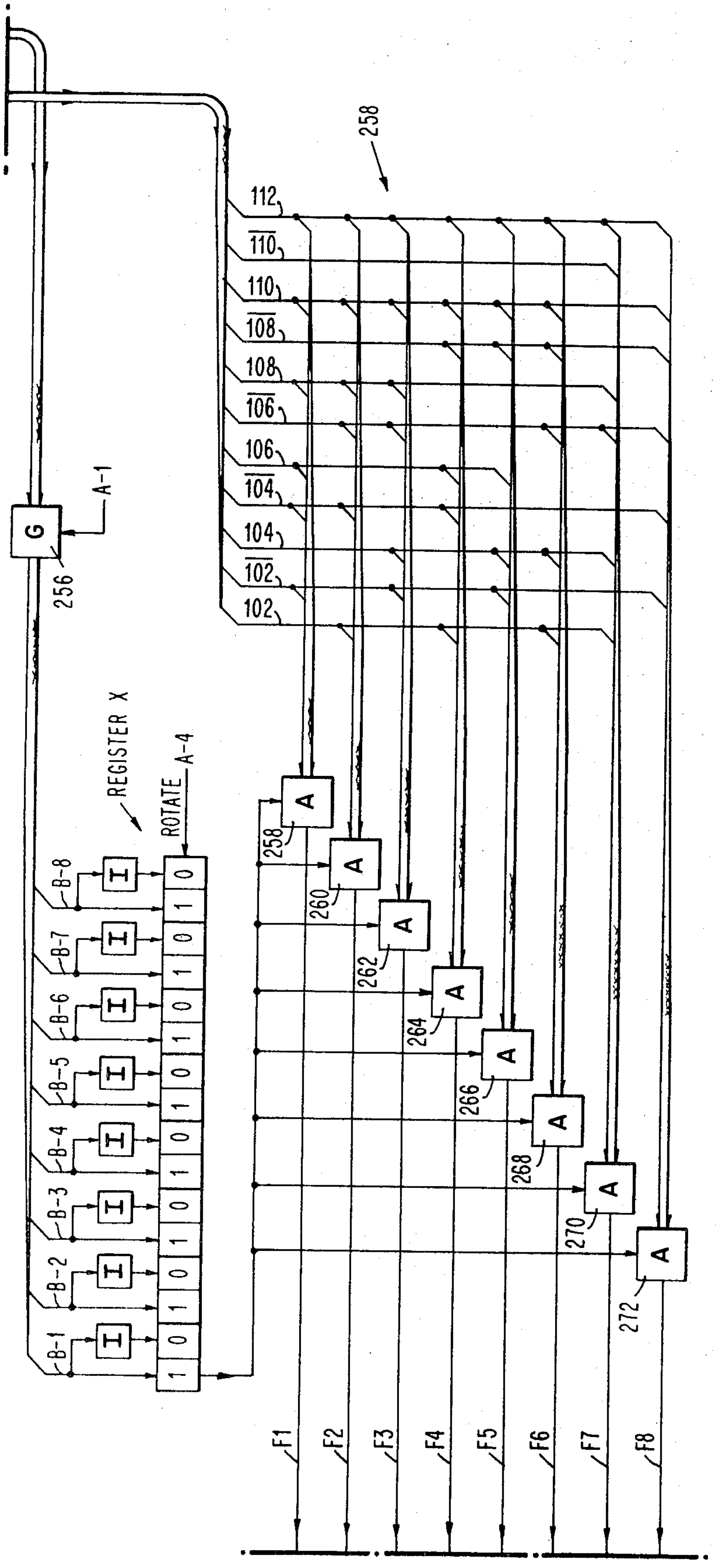
Figure 3F:
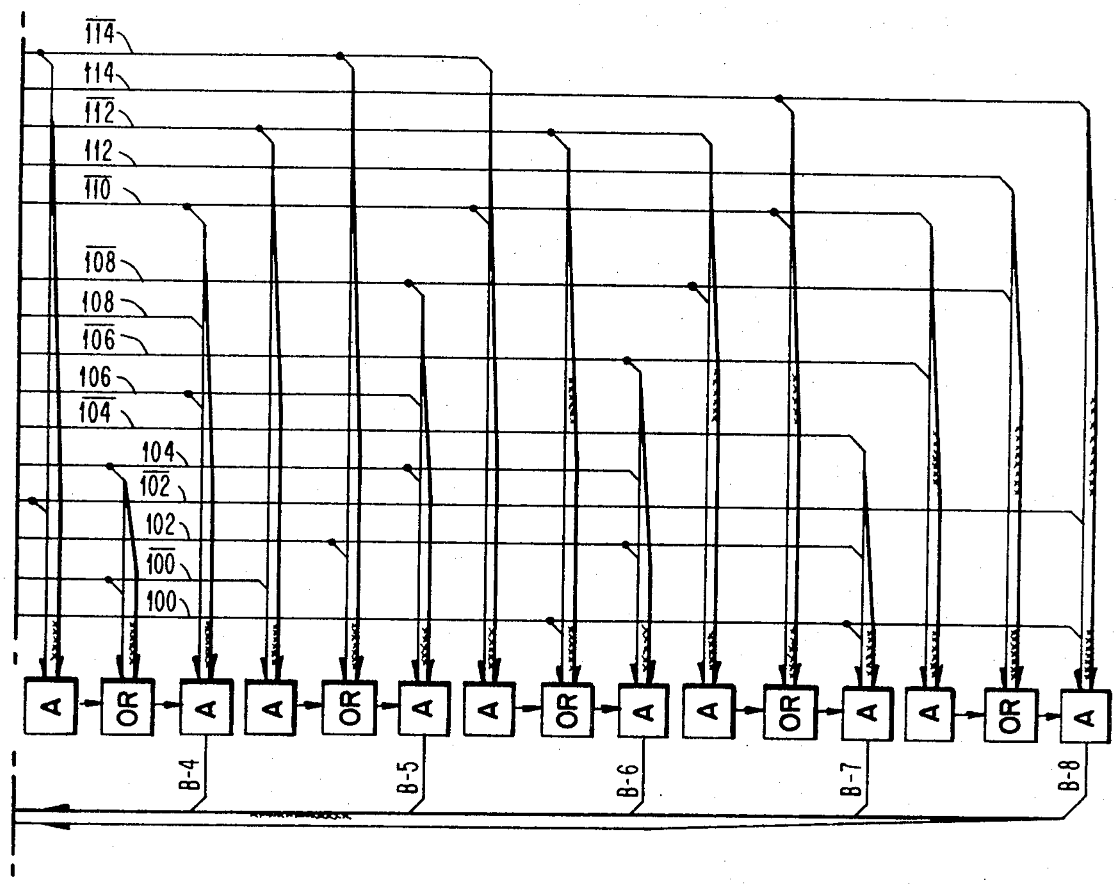
FIGS. 3A through 3F comprise a combination functional and logical block diagram of a second embodiment of the present invention.
Figure 3A:
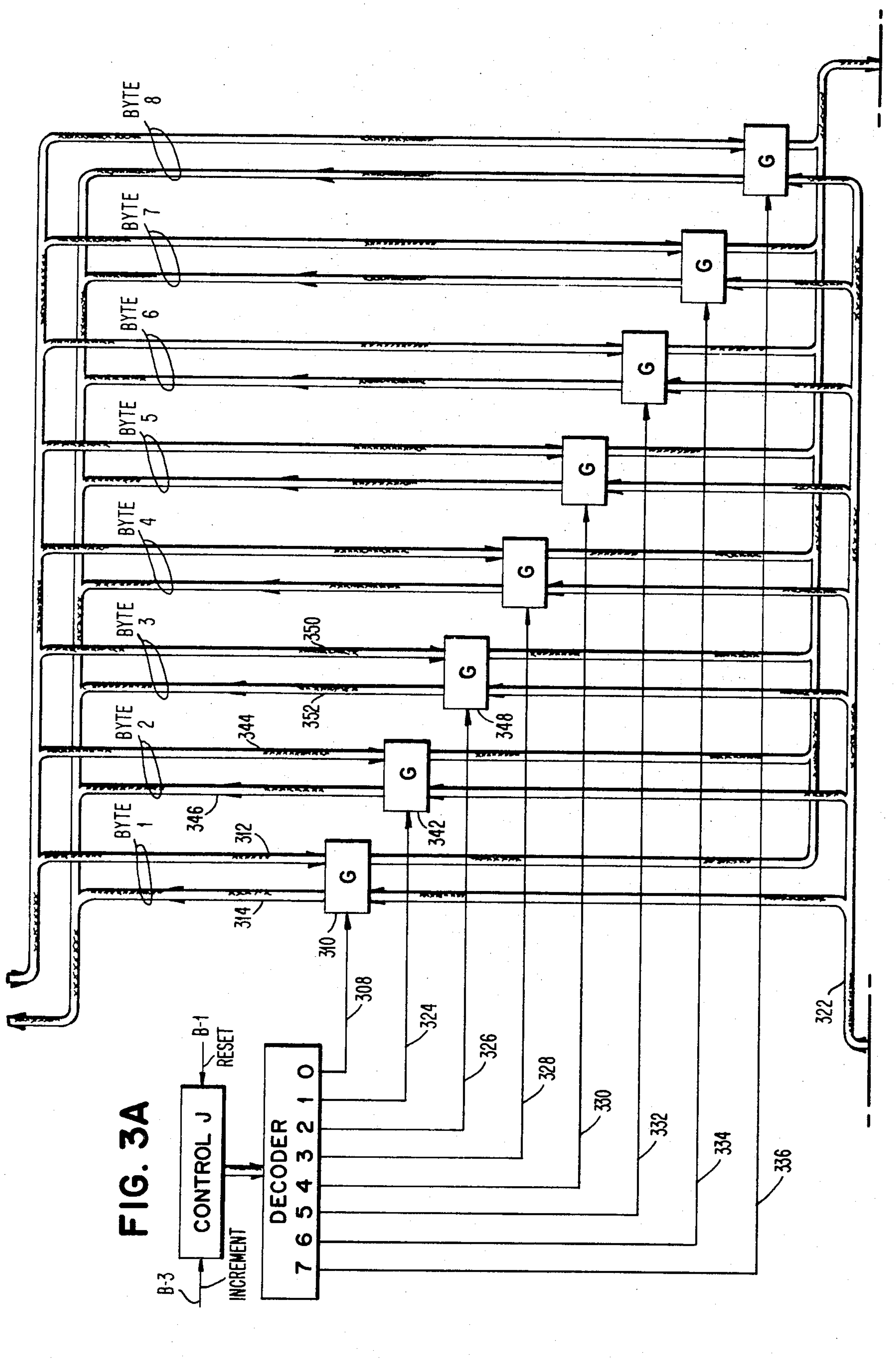
Figure 3B:
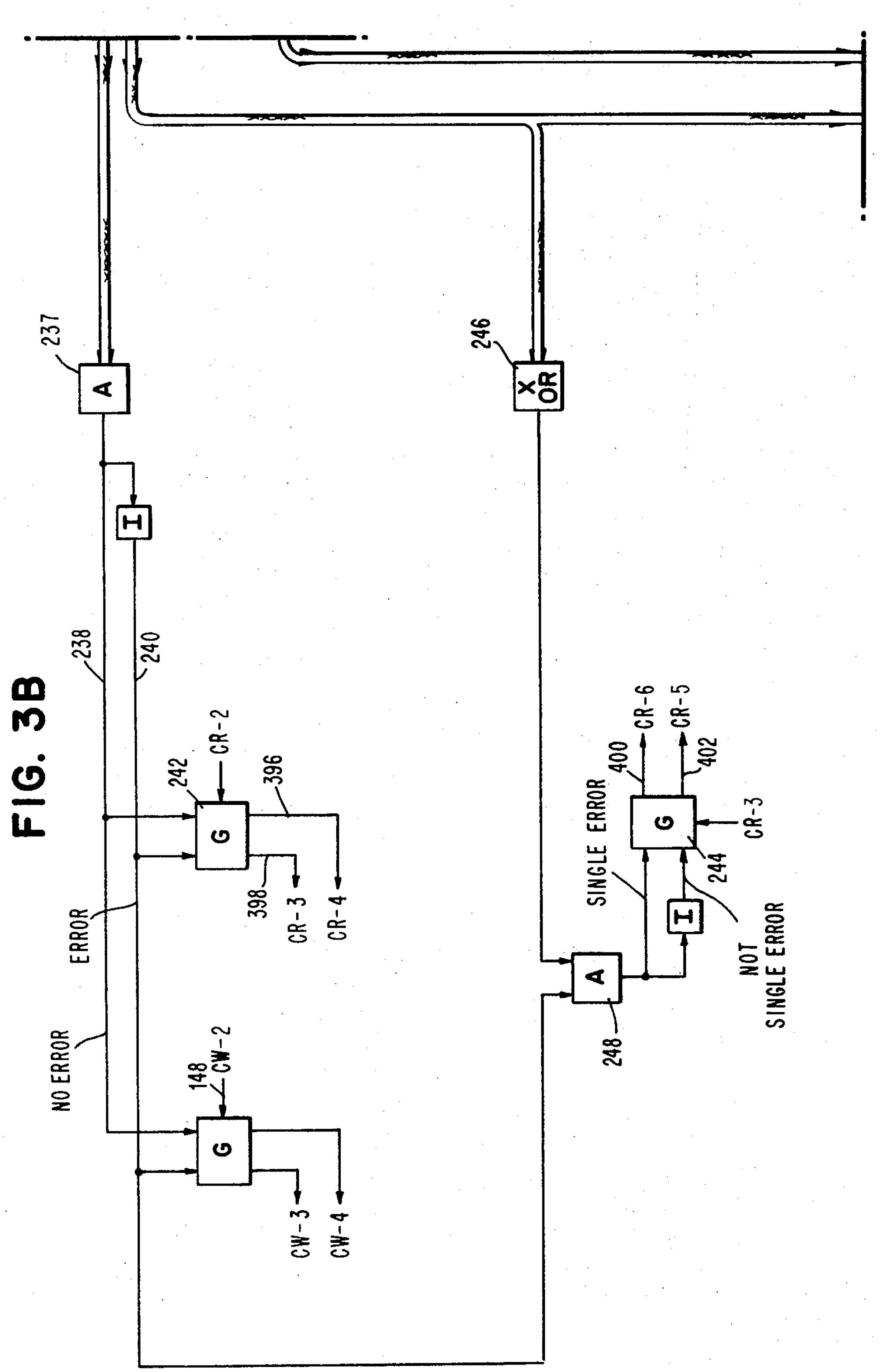
Figure 3C:
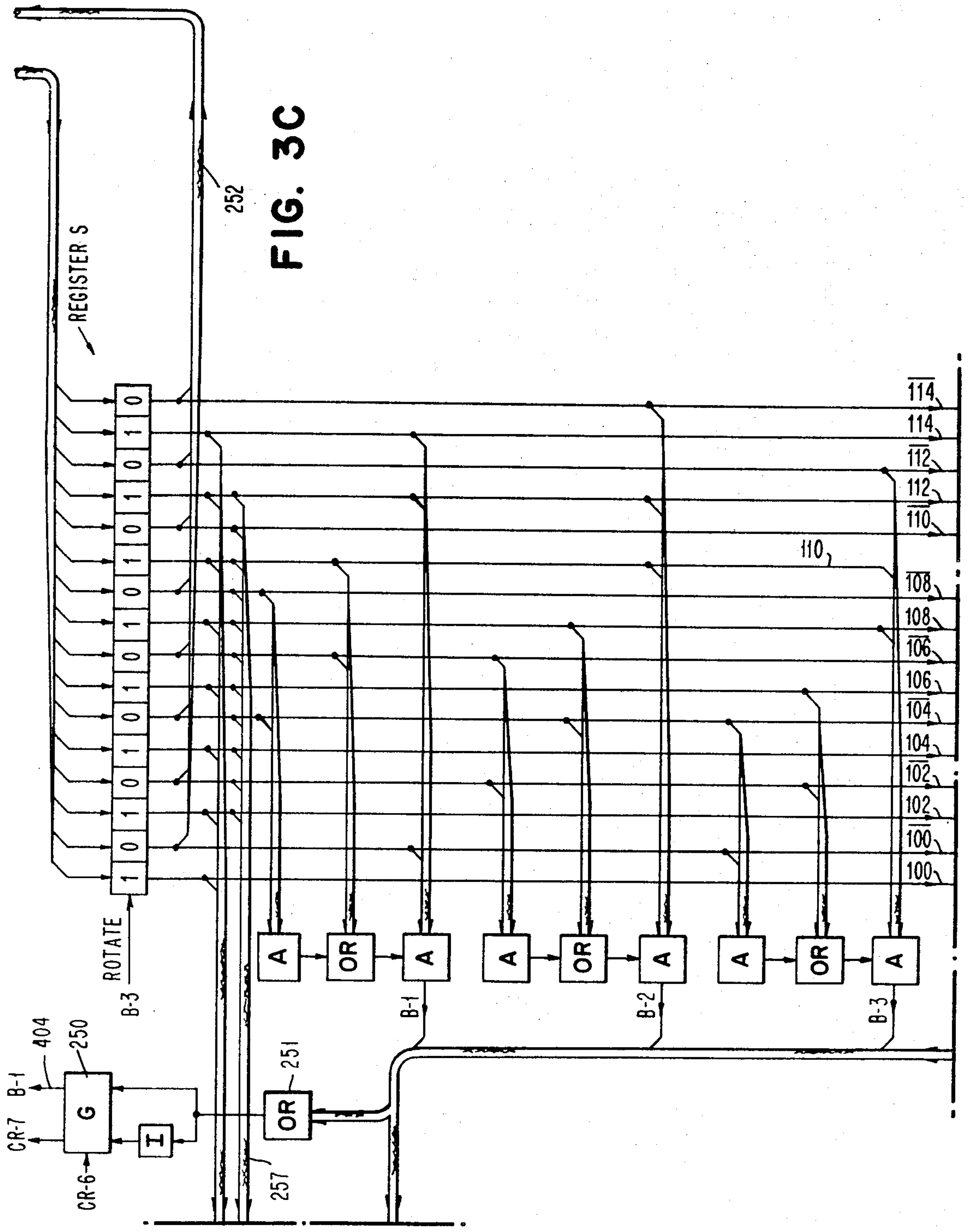
Figure 3D:
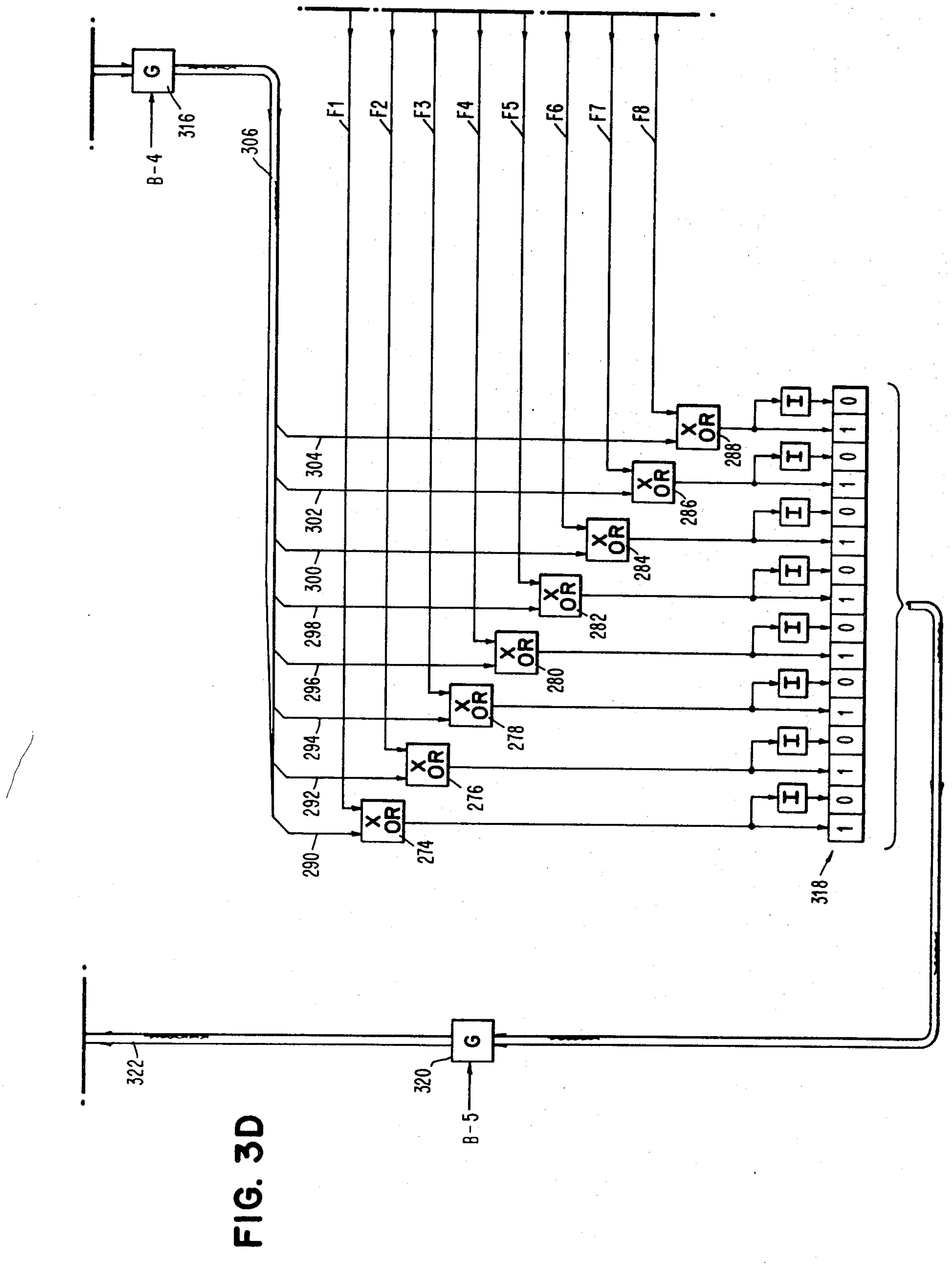
Figure 3E:
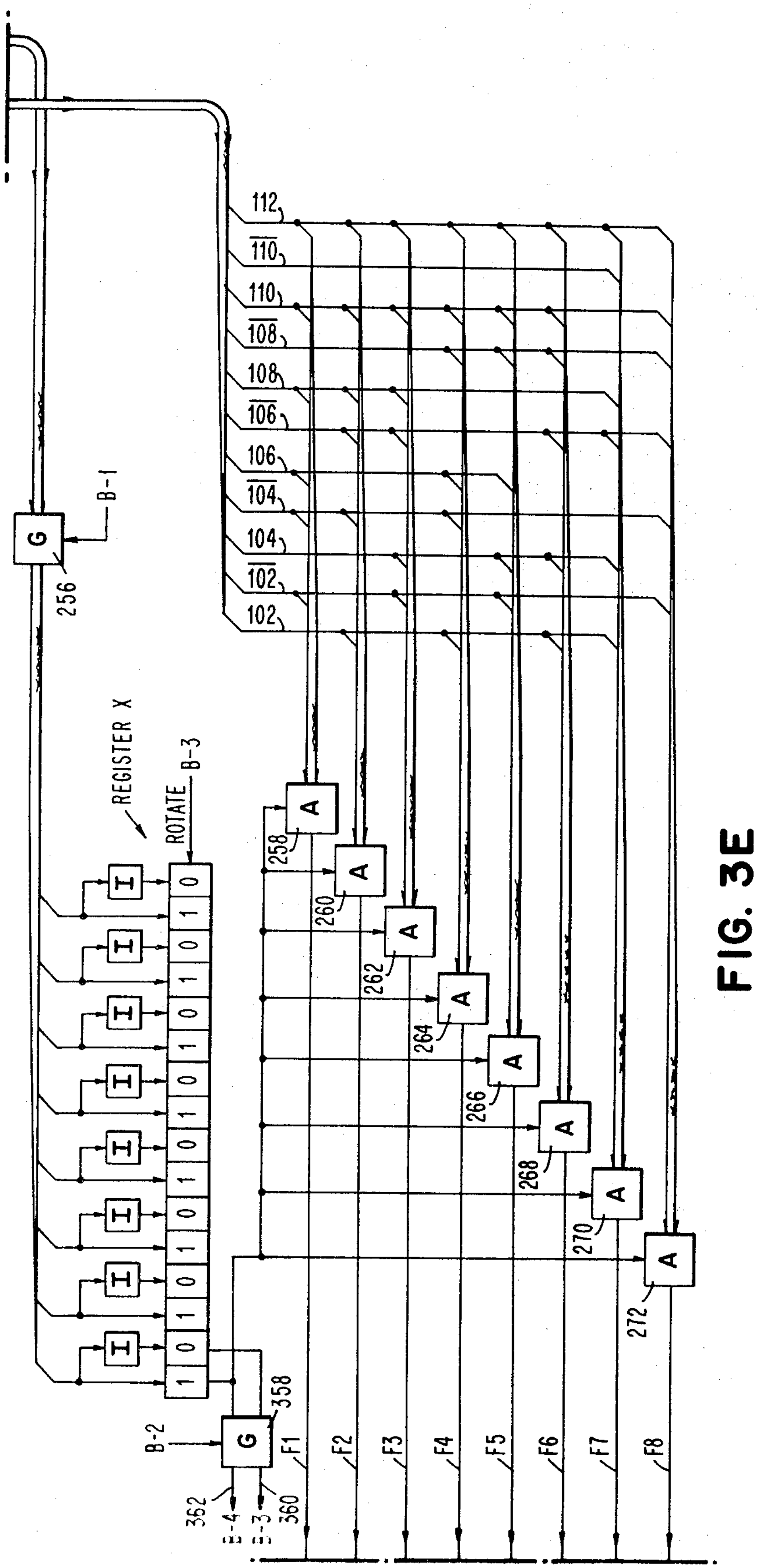
Figure 4D:
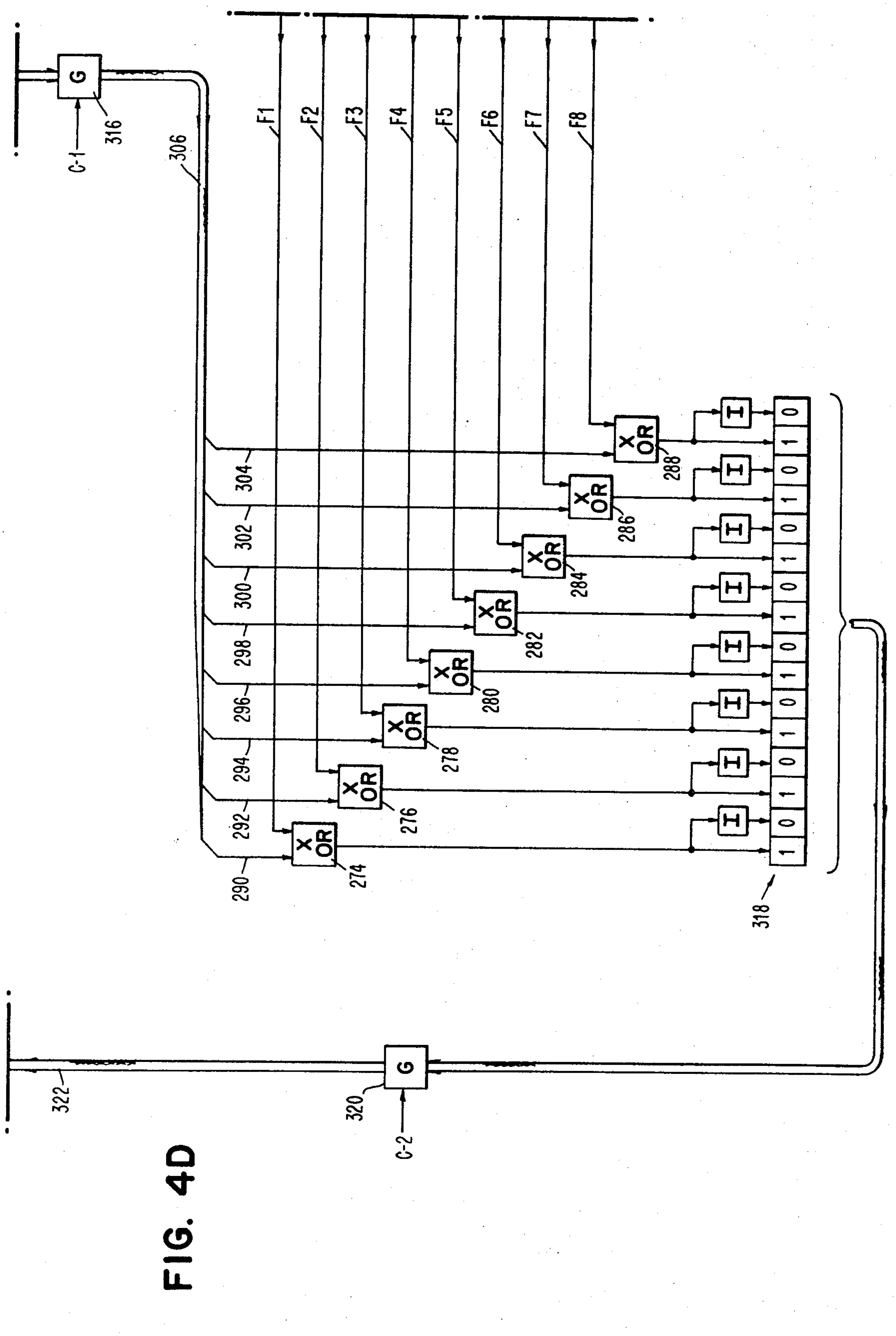
Figure 4E:
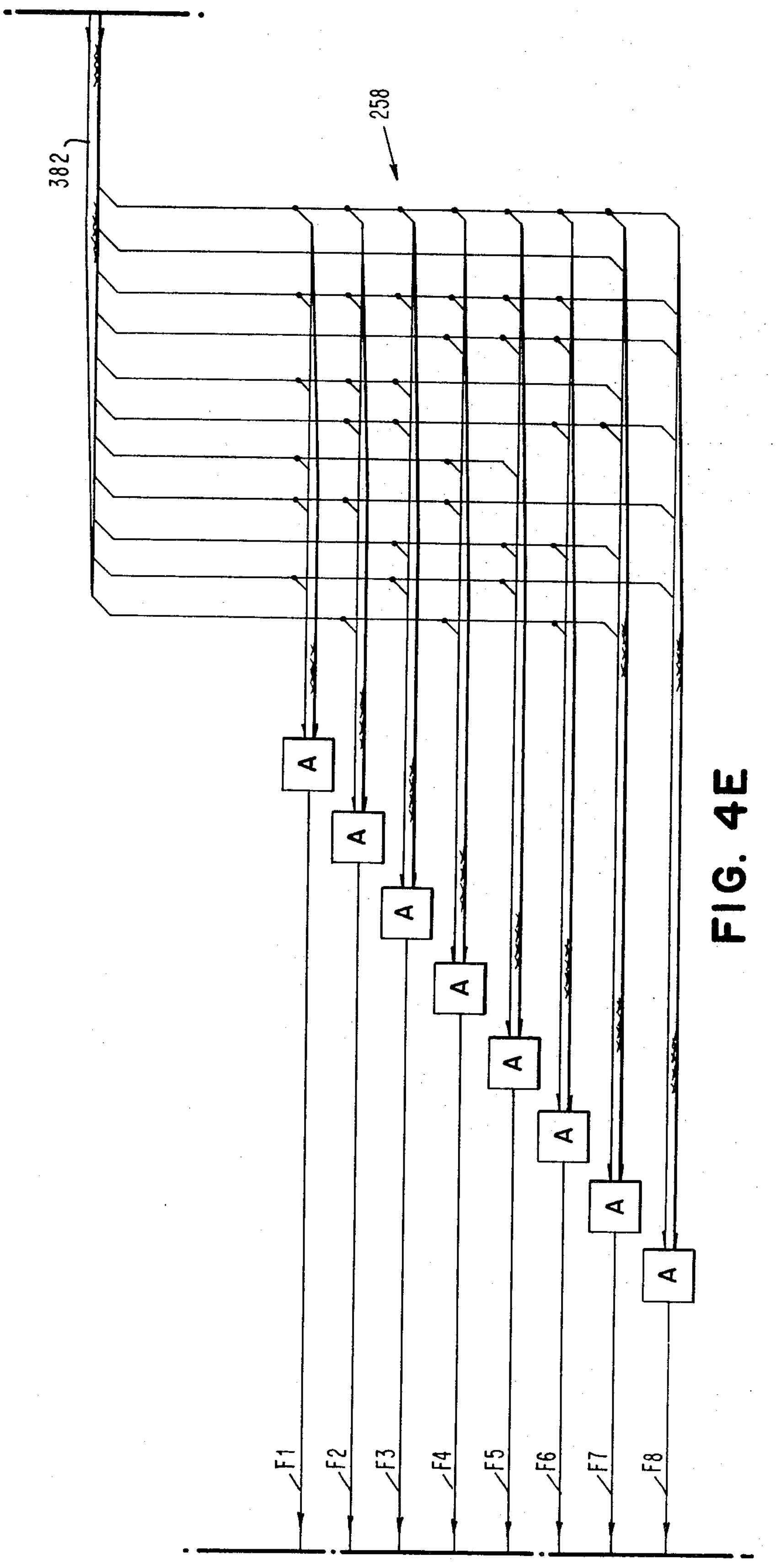
Figure 4F:
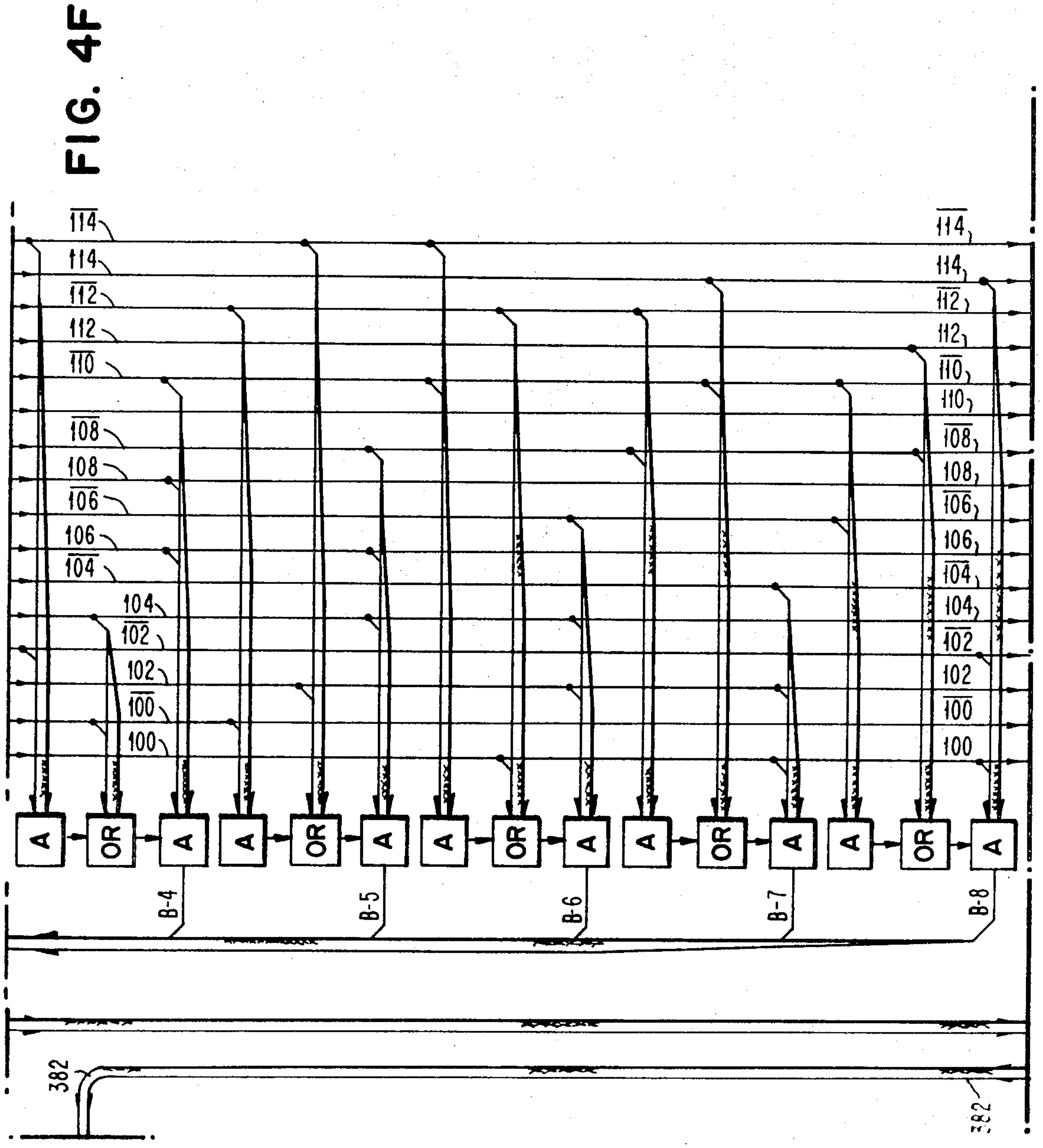

A second significant contribution of the present invention is a recognition that by using a rotational Hamming SEC/DED code, the syndrome bits once generated and stored, may be rotated or shifted a bit at a time and the proper correction patterns for various bits of the data word may be automatically generated by virtue of this rotational concept when using a fixed connection circuitry such as shown on FIGS. 2E, 3E and 4E.

The following general description of the manner in which rotational codes may be generated and just exactly what is meant by such rotational codes, is in somewhat greater detail than that of the previous description.

The design of the connection matrices for the generation of the "byte-error indicators" (B1–B8) and also the bit-correction pattern generation is keyed in to the presently disclosed example in terms of a single block of the single parity check or connection matrix of FIG. 16 and also the fully expanded parity connection matrix of FIG. 17. It is believed that this description will fully illustrate the way in which a rotational parity-connection matrix may be generated and a proper code selected for almost any data word and memory configuration having the storage capabilities for storing the data word with at least the minimum required number of SEC/DED Hamming code check bits. Further, utilizing this explanation, it would be obvious to one skilled in the art as to how the proper connections to the syndrome storage register could be made once the parity connection matrix for the particular machine and data configuration were known.

METHODS OF CONSTRUCTING PARITY CHECK/CONNECTION MATRICES

If there are $m$ bytes of $b$ bits, then there are $mb = K$ data bits. Given $K$, the usual Hamming relationship (cf. W.W. Peterson, Error Correcting Codes) determines the number of check bits $r$. All parity connection matrices will have $K+r$ columns and $r$ rows. The last $r$ columns will have one "1" and $(r-1)$ "0's" arranged so the $r$ columns have a "1" in the $1^{st}, r^{th}, (r-1)^{st}, \ldots, 2^{nd}$ row. Each column corresponds to a check bit. (see FIG. 16, box 426).

A SEC/DED code is called a rotational code if the following conditions are satisfied:

(1) the columns of the parity connection matrix corresponding to the $j^{th}$ byte all have 1's in the $\{1+[(r+1-j) \bmod r]\}^{th}$ row (to match the $j^{th}$ check bit).

(2) once the columns of the parity-connection matrix corresponding to the $1^{st}$ byte have been determined, the columns for the succeeding bytes are determined by rotating the columns corresponding to the first byte so that the rows of all 1's are properly aligned.

(3) each column of the parity-connection matrix has an odd number of 1's. If $m=r$, the maximum value of $b$ is fixed for rotational codes, as shown in the following table.

| $r$ | $\binom{r}{3}$ | $\binom{r}{5}$ | $\binom{r}{7}$ | $\binom{r}{9}$ | $\binom{r}{11}$ | $b_m=$ max $b$ | $r x b_m$ | max $K = 2^{r-1}-r$ |
|---|---|---|---|---|---|---|---|---|
| 4 | 4 | | | | | 1 | 4 | 4 |
| 5 | 2×5 | 1 | | | | 2 | 10 | 11 |
| 6 | 3×6+2 | 6 | | | | 4 | 24 | 26 |
| 7 | 5×7 | 3×7 | 1 | | | 8 | 56 | 57 |
| 8 | 7×8 | 7×8 | 8 | | | 15 | 120 | 120 |
| 9 | 9×9+3 | 14×9 | 4×9 | 1 | | 27 | 243 | 247 |
| 10 | 12×10 | 25×10+2 | 12×10 | 10 | | 50 | 500 | 502 |
| 11 | 15×11 | 42×11 | 30×11 | 15×11 | 1 | 92 | 1012 | 1013 |

Case 1. number of bytes = number of check bits width of bytes ≤ max byte width

Using the attached list L, the following method will result in an appropriate code. For a given $r=r_0$, pick as many columns with three 1's as possible from L for which min $r \leq r_0$. If these are less than $b$ such columns, repeat the process for five 1's, then for seven 1's, nine 1's, eleven 1's.

Form the parity-connection matrix for the other bytes by the appropriate rotation.

Example 1. $m=r=6, b=4$

Choose the columns

```
1 1 1
1 0 1
1 1 0
0 1 1
0 0 0
0 0 0
```

all for min $r \leq 6$ from L. These are all the columns with three 1's which can be chosen. Complete the parity-connection matrix for the first byte with

```
1
1
1
1
1
0
```

which has five 1's. The complete code is shown in Table 1. All columns are distinct as is necessary.

Example 2. $m=r=7$ $b=7$

Choose the following columns:

| 4 5 6 7 7 6 7 |
|---|
| 1 1 1 1 1 1 1 |
| 1 0 1 0 1 1 1 |
| 1 1 0 1 0 1 1 |
| 0 1 1 0 0 1 1 |
| 0 0 0 1 1 1 0 |
| 0 0 0 0 0 0 1 |
| 0 0 0 0 0 0 0 |

and rotate them as before.

Case 2. number of bytes > number of check bits

In this case, $m>r$. If $2b<$max byte width and $2r \geq m$, then the techniques used in the previously identified copending application are all right. In general, if $jb<$max byte width and $jr \geq m$, then these techniques will work. In the cases $r=5, 6, 7, 9, 10$, try to use one of the unused columns. Consider the case $r=8$, $m=9$, $b=8$.

Such a code is shown in Table 2. Use the columns for max $b$ in the first byte, then rotate one of the columns not rotated to form the columns for bytes 3 through 9 into the appropriate position. The second column is a vertically downward rotation of the first.

| | |
|---|---|
| 1 | 0 |
| 1 | 1 |
| 1 | 1 |
| 0 | 1 |
| 0 | 1 |
| 1 | 0 |
| 0 | 0 |

As a general procedure, if there are $j$ bytes of width greater than $b_m$, the additional columns used must be rotated less than $(r-j)$ times from those columns in the first byte (since rotation $r$ times is the identity). Examine these bytes and pick those which work.

Case 3. number of bytes less than number of check bits

If the width of the bytes is less than the maximum byte width $b_m$, then the previous procedures may be applied. Since $m<r$, choose any $m$ out of a possible $r$ rotations. In general, if the number of bytes is $\leq r/j$, and the byte width is $\leq jb_m$, then a slight extension of previous methods will suffice (e.g., form $P_1$ from one check bit, $P_2$ from another, and then byte parity as $P_1$ XOR $P_2$ if the number of bytes is $r/2$ with width $=2b_m$, etc.).

If the byte width is $> b_m$, then consider the set of unused columns as before. In general, there will be no combination possible.

TABLE 1

| | | | | | | |
|---|---|---|---|---|---|---|
| 1111 | 1011 | 1101 | 0111 | 0001 | 0000 | 100000 |
| 1011 | 1101 | 0111 | 0001 | 0000 | 1111 | 000001 |
| 1101 | 0111 | 0001 | 0000 | 1111 | 1011 | 000010 |
| 0111 | 0001 | 0000 | 1111 | 1011 | 1101 | 000100 |
| 0001 | 0000 | 1111 | 1011 | 1101 | 0111 | 001000 |
| 0000 | 1111 | 1011 | 1101 | 0111 | 0001 | 010000 |

TABLE 2 r=8, m=9, b=8

| | | | | |
|---|---|---|---|---|
| $S_1$ | 11111111 | 11111111 | 1 1 1 1 | 11 1 1 |
| $S_2$ | 1 1 1 1 | 111 1111 | 11 1 1 | 11 111 |
| $S_3$ | 11 1 1 | 11 1 111 | 11 111 | 111 1 |
| $S_4$ | 11 111 | 1 111 11 | 111 1 | 1 |
| $S_5$ | 111 1 | 111 11 | 1 | |
| $S_6$ | 1 | 11111 1 | | |
| $S_7$ | 1 | 1111 | | 11111111 |
| $S_8$ | | | 11111111 | 1 1 1 1 |
| | 1 11 | 1 | 1 | 11 1 |
| $S_1$ | 11 111 | 111 1 | 1 | |
| $S_2$ | 111 1 | 1 | | |
| $S_3$ | 1 | | | 11111111 |
| $S_4$ | | | 111111 11 | 1 1 1 1 |
| $S_5$ | | 1111111 1 | 1 1 1 1 | 11 1 1 |
| $S_6$ | 11111111 | 1 1 1 1 | 11 1 1 | 11 111 |
| $S_7$ | 1 1 1 1 | 11 1 1 | 11 111 | 1 |
| $S_8$ | 11 1 1 | 11 11 1 | 11 1 1 | 1 |
| | 1 1 | 1 | | |
| $S_1$ | | 1 | | |
| $S_2$ | 11111111 | | 1 | |
| $S_3$ | 1 1 1 1 | 1 | | |
| $S_4$ | 11 1 1 | 1 1 | | |
| $S_5$ | 11 111 | 1 | | |
| $S_6$ | 111 1 | 1 | | |
| $S_7$ | 1 | 1 | | |
| $S_8$ | | 1 | | |

TABLE L1

List of column patterns for parity check matrix for SEC/DED

Serial Byte Transistor

Make list for $r=11$, Pick from list in order when possible.

| | 1 2 3 4 5 6 7 8 9 10 11 | min. r |
|---|---|---|
| 1) | (1 1 1 0 0 0 0 0 0 0 0) | 4 |
| 2) | (1 0 1 1 0 0 0 0 0 0 0) | 5 |
| 3) | (1 1 0 1 0 0 0 0 0 0 0) | 6 |
| 4) | (1 0 1 0 1 0 0 0 0 0 0) | |
| 5) | (1 1 0 0 1 0 0 0 0 0 0) | 7 |
| 6) | (1 0 0 1 1 0 0 0 0 0 0) | |
| 7) | (1 0 0 1 0 1 0 0 0 0 0) | 8 |
| 8) | (1 0 1 0 0 1 0 0 0 0 0) | |
| 9) | (1 0 0 0 1 1 0 0 0 0 0) | 9 |
| 10) | (1 1 0 0 0 1 0 0 0 0 0) | |
| 11) | (1 0 0 1 0 0 1 0 0 0 0) | |
| 12) | (1 0 1 0 0 0 1 0 0 0 0) | 10 |
| 13) | (1 0 0 0 1 0 1 0 0 0 0) | |
| 14) | (1 1 0 0 0 0 1 0 0 0 0) | |
| 15) | (1 0 0 1 0 0 0 1 0 0 0) | 11 |

| | | |
|---|---|---|
| 1) | (1 1 1 1 1 1 1 1 1 0 0) | 10 |
| 2) | (1 1 1 1 1 1 1 1 0 1 0) | |
| 3) | (1 1 1 1 1 1 1 0 1 1 0) | |
| 4) | (1 1 1 1 1 1 0 1 1 1 0) | |
| 5) | (1 1 1 1 1 0 1 1 1 1 0) | 11 |

| | 1 2 3 4 5 6 7 8 9 10 11 | min. r. |
|---|---|---|
| 1) | (1 1 1 1 1 1 1 0 0 0 0) | 8 |
| 2) | (1 1 1 1 1 1 0 1 0 0 0) | |
| 3) | (1 1 1 1 1 0 1 1 0 0 0) | |
| 4) | (1 1 1 1 0 1 1 1 0 0 0) | 9 |
| 5) | (1 1 1 0 1 1 1 1 0 0 0) | |
| 6) | (1 1 0 1 1 1 1 1 0 0 0) | |
| 7) | (1 0 1 1 1 1 1 1 0 0 0) | |
| 8) | (1 1 1 1 1 1 0 1 0 1 0 0) | |
| 9) | (1 1 1 1 0 1 1 0 1 0 0) | |
| 10) | (1 1 1 1 0 1 0 1 1 0 0) | |
| 11) | (1 1 1 0 1 1 1 0 1 0 0) | |
| 12) | (1 1 1 0 1 1 0 1 1 0 0) | 10 |
| 13 | (1 1 1 0 1 0 1 1 1 0 0) | |
| 14) | (1 1 0 1 1 1 1 0 1 0 0) | |
| 15) | (1 1 0 1 1 1 0 1 1 0 0) | |
| 16) | (1 1 0 1 1 0 1 1 1 0 0) | |
| 17) | (1 1 0 1 0 1 1 1 1 0 0) | |
| 18) | (1 0 1 1 1 1 1 0 1 0 0) | |
| 19) | (1 0 1 1 1 1 0 1 1 0 0) | |

| | | |
|---|---|---|
| 20) | (1 0 1 1 1 0 1 1 1 0 0) | |
| 21) | (1 0 1 1 0 1 1 1 1 0 0) | 11 |
| 22) | (1 1 1 1 1 1 0 0 1 0 0) | |
| 23) | (1 1 1 1 1 0 0 1 1 0 0) | |
| 24) | (1 1 1 1 0 0 1 1 1 0 0) | 10 |
| 25) | (1 0 1 0 1 1 1 1 1 0 0) | |
| 26) | (1 0 1 1 0 1 1 0 1 1 0) | |
| 27) | (1 1 1 0 1 1 0 1 0 1 0) | |
| 28) | (1 1 1 1 0 1 0 1 0 1 0) | 11 |
| 29) | (1 1 1 0 1 0 1 1 0 1 0) | |
| 30) | (1 1 1 0 1 0 1 0 1 1 0) | |

TABLE L2

| | 1 2 3 4 5 6 7 8 9 10 11 | min. r. |
|---|---|---|
| 1) | (1 1 1 1 1 0 0 0 0 0 0) | 6 |
| 2) | (1 1 1 1 0 1 0 0 0 0 0) | |
| 3) | (1 1 1 0 1 1 0 0 0 0 0) | 7 |
| 4) | (1 1 0 1 1 1 0 0 0 0 0) | |
| 5) | (1 0 1 1 1 1 0 0 0 0 0) | |
| 6) | (1 1 0 1 0 1 1 0 0 0 0) | |
| 7) | (1 1 1 0 1 0 1 0 0 0 0) | 8 |
| 8) | (1 0 1 0 1 1 1 0 0 0 0) | |
| 9) | (1 1 0 0 1 1 1 0 0 0 0) | |
| 10) | (1 0 0 1 1 1 1 0 0 0 0) | |
| 11) | (1 0 1 1 0 1 1 0 0 0 0) | |
| 12) | (1 0 1 1 1 0 1 0 0 0 0) | |
| 13) | (1 1 0 1 1 0 1 0 0 0 0) | |
| 14) | (1 0 1 0 1 0 1 1 0 0 0) | 9 |
| 15) | (1 1 1 0 0 1 1 0 0 0 0) | |
| 16) | (1 1 1 1 0 0 1 0 0 0 0) | |
| 17) | (1 0 1 0 1 1 0 1 0 0 0) | |
| 18) | (1 0 1 0 0 1 1 1 0 0 0) | |
| 19) | (1 1 0 1 0 1 0 1 0 0 0) | |
| 20) | (1 0 1 1 0 1 0 1 0 0 0) | |
| 21) | (1 1 1 0 1 0 0 1 0 0 0) | |

| | 1 2 3 4 5 6 7 8 9 10 11 | min. $r$. |
|---|---|---|
| 22) | (1 1 0 1 1 0 0 1 0 0 0) | |
| 23) | (1 1 0 1 0 0 1 1 0 0 0) | |
| 24) | (1 1 0 0 1 0 1 1 0 0 0) | |
| 25) | (1 0 1 1 1 0 0 1 0 0 0) | 10 |
| 26) | (1 1 1 1 0 0 0 1 0 0 0) | |
| 27) | (1 1 1 0 0 1 0 1 0 0 0) | |
| 28) | (1 1 1 0 0 0 1 1 0 0 0) | |
| 29) | (1 1 0 0 1 1 0 1 0 0 0) | |
| 30) | (1 0 1 1 0 0 1 1 0 0 0) | |
| 31) | (1 0 0 1 1 1 0 1 0 0 0) | |
| 32) | (1 0 0 1 1 0 1 1 0 0 0) | |
| 33) | (1 0 0 1 0 1 1 1 0 0 0) | |
| 34) | (1 0 1 0 1 0 1 0 1 0 0) | |
| 35) | (1 0 1 0 1 1 0 0 1 0 0) | |
| 36) | (1 0 1 0 1 0 0 1 1 0 0) | |
| 37) | (1 0 1 0 0 1 1 0 111 0 0) | |
| 38) | (1 0 1 0 0 1 0 1 1 0 0) | |
| 39) | (1 1 1 0 0 1 0 0 1 0 0) | |
| 40) | (1 1 0 1 0 1 0 0 1 0 0) | 11 |
| 41) | (1 1 0 0 1 1 0 0 1 0 0) | |
| 42) | (1 1 0 0 1 0 0 1 1 0 0) | 11 |

Identification of the Byte Containing the Error

The particular byte containing the erroneous bit can be identified by byte identifier equations which, in turn, are generatable from an examination of the parity correction matrix. For the simple case of a 72 bit word with eight ($r$=8) bytes of eight data bits, the byte identifier equations are generated for each byte by working only with the columns of the parity correction matrix (P/C/M) which correspond to the byte; i.e., have a row of solid 1's in the $\{1+[(r+1-j) \bmod r]\}^{th}$ row for the $j^{th}$ byte which, for the case of being discussed, is 1 for the first byte, 8 for the second byte, 7 for the third byte, etc. Hence, the block of the P/C/M shown in FIG. 15 is to be used to generate a byte identifier equation for the byte identifier, $b_1$, of the first byte. The use of this block, from the P/C/M, to generate the expression for $b_1$ is very simply explained: interpret the columns of the block as binary representations of the Boolean syndrome variables and write a simplified expression for the conjunction of the terms represented by the columns. The first column is 11100000 and the term is written $\overline{S}_1\ \overline{S}_2\ \overline{S}_3\ S_4\ S_5\ S_6\ S_7\ S_8$ according to the rule (applicable only in odd parity – the assignment of 1 and 0 are reversed for even parity) for the $i^{th}$ variable $V_i$ of the term as:

$V_i = S_i$ if the $i^{th}$ (row) element of the column is a 0.

$V_i = \overline{S}_i$ if the $i^{th}$ (row) element of the column is a 1.

The terms for FIG. 15 are: $\overline{S}_1\overline{S}_2\overline{S}_3S_4S_5S_6S_7S_8$, $\overline{S}_1S_2\overline{S}_3\overline{S}_4S_5S_6S_7S_8$, . . . , $\overline{S}_1\overline{S}_2\overline{S}_3\overline{S}_4\overline{S}_5S_6S_7S_8$. for columns 1, 2, . . . , 8. The conjunction (ANDing together) of all such terms can be simplified, usually by sight but more assuredly any time any of many well-known schemes (Karnaugh Map, etc.), to give $b_1$ (or the other byte identifiers, depending on the byte chosen).

Correction of the Bad Bit

A simple example should suffice to show how the correction can be made once the byte identifiers and syndromes are known. Consider the P/C/M of FIG. 16 and the first embodiment as shown in FIGS. 2B and FIG. 2C. Assume that data bit $d_{19}$ (of byte 3) is in error (complemented from correct value). The syndrome register will contain 1 0 1 1 1 1 0 0. The byte identifiers are given as $$b_{81} = \overline{S_1}\ S_7\ S_8\ [S_6 \vee \overline{S_4} \vee \overline{S_5}] = 0$$
$$b_{82} = \overline{S_8}\ S_6\ S_7\ [S_5 \vee \overline{S_3} \vee \overline{S_2}\ \overline{S_4}] = 0$$
$$b_{83} = \overline{S_7}\ S_5\ S_6\ [S_4 \vee \overline{S_2} \vee \overline{S_1}\ \overline{S_3}] = 1$$
$$b_{84} = \overline{S_6}\ S_4\ S_5\ [S_3 \vee \overline{S_1} \vee \overline{S_8}\ \overline{S_3}] = 0$$

. . .

etc.

Hence, the contents of the X Register are 0 0 1 0 0 0 0 0, indicating that $b_3$ is in error. Now Register X will be "rotated" twice to give 1 0 0 0 0 0 0 0 and the leading 1 will gate out the correction functions formed in AND gates 258, 260, 262, 272. The S Register is also rotated in synchronism with the X rotation BUT NOT UNTIL $b_{81}$, $b_{82}$, . . . , $b_{88}$ have been formed and gated into X. Thus, the original contents of the S Register are shifted right from 1 0 1 1 1 1 0 0 to 0 0 1 0 1 1 1 1 and the output of gate 262 (line F3) has value 1 and inverts (complements) the third bit of the third byte $d_{19}$, through XOR 278. Connection is essentially done except for gating.

General Description of the Embodiments of FIGS. 2 through 5

The following is a general description of the four embodiments of the correction circuitry of the present invention as shown in FIGS. 2, 3, 4 and 5. This descriptive material merely sets forth the broad operating principles of the embodiments as the specific description of the individual logic circuitry will be set forth subsequently in detail. In the general description of these four embodiments, it will be assumed that a test for errors has been made and that a single error, not in the parity bits, has been found. As will be remembered, if the single error is found in one of the parity bits, the contents of the Register S are merely gated back, EXCLUSIVE-ORed with the parity bit and dropped into the parity bit positions of the MDR register and the appropriate incorrect parity bit will be automatically corrected by this single operation. Also, if a double error is found to exist, it will be assumed that the appropriate signal is sent to the system control and an interrupt routine as described in the previously-referenced docket initiated to in some way take care of this double error condition which cannot be corrected by the present circuitry.

Referring now to the embodiments of FIG. 2 (FIGS. 2A to 2F), the logic circuitry appearing on FIGS. 2C and 2F is connected to the Register S which tests the syndrome bits to determine which byte contains an error. All of the lines B1–B8 will be zero except for the one line corresponding to the byte which contains the error which will be set as a 1. This logic circuitry appears in all four of the embodiments. In the second embodiment, the circuitry in function is repeated on FIGS. 3C and 3F, in the third embodiment (on FIGS. 4C and 4F), and in the fifth embodiment (on FIGS. 5C and 5E). In all of the embodiments, this byte error-detection circuitry operates in the same fashion.

Receeding now to the manner in which the byte error indication is used, in the embodiments of FIGS. 2, 3 and 5, the eight outputs of the byte-detection circuitry are loaded into the Register X wherein it will be noted all positions will be set to a 0 with the exception of the position corresponding to the byte which is an error. As the various system clocks of the three embodiments are actuated, the contents of the Register X are shifted until the 1 corresponding to the byte error is in the leftmost position. At this point, a bit error correction pattern which is obtained by appropriately combining the syndrome bit from the Register S and combined with the byte in error which will be gated through the correction circuitry. The actual byte correction circuitry is shown on FIGS. 2D, 3D, and 4D, in the embodiments of FIG. 5 this actual correction is performed in the arithmetic and logic unit of the overall system CPU as will be explained subsequently. As will be appreciated from the previous description of the present error correction code, after the syndrome bits have been generated, it is possible to combine the various syndrome bits assuming of course that a rotational parity encoding scheme has been utilized to generate the check bits. The actual bit-correction patterns may be generated from the contents of the Register X which contain the syndrome bits by appropriately connecting the various storage positions of the Register S and combining same with the faulty byte in the correction circuitry.

Figure 4G:
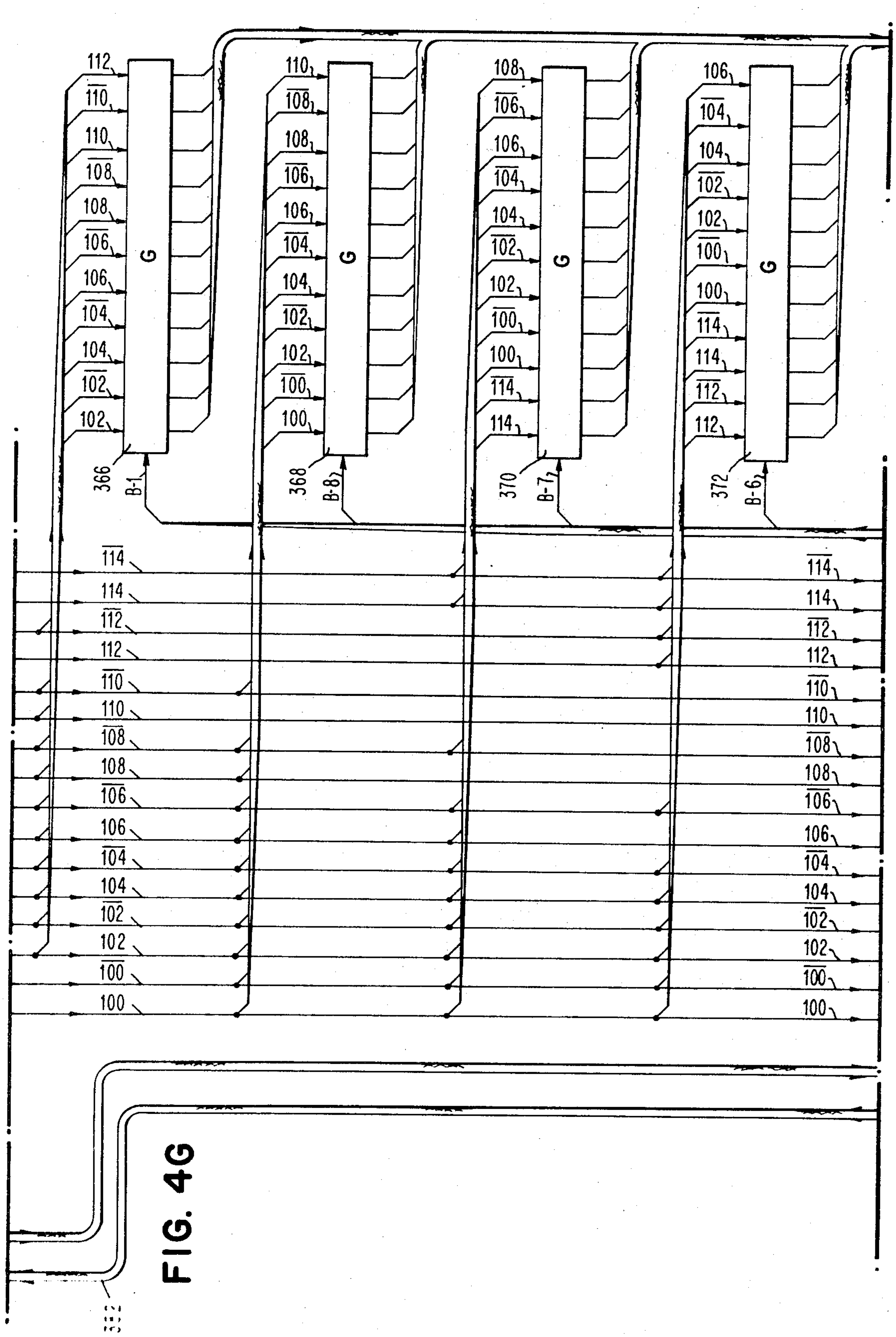
Figure 4H:
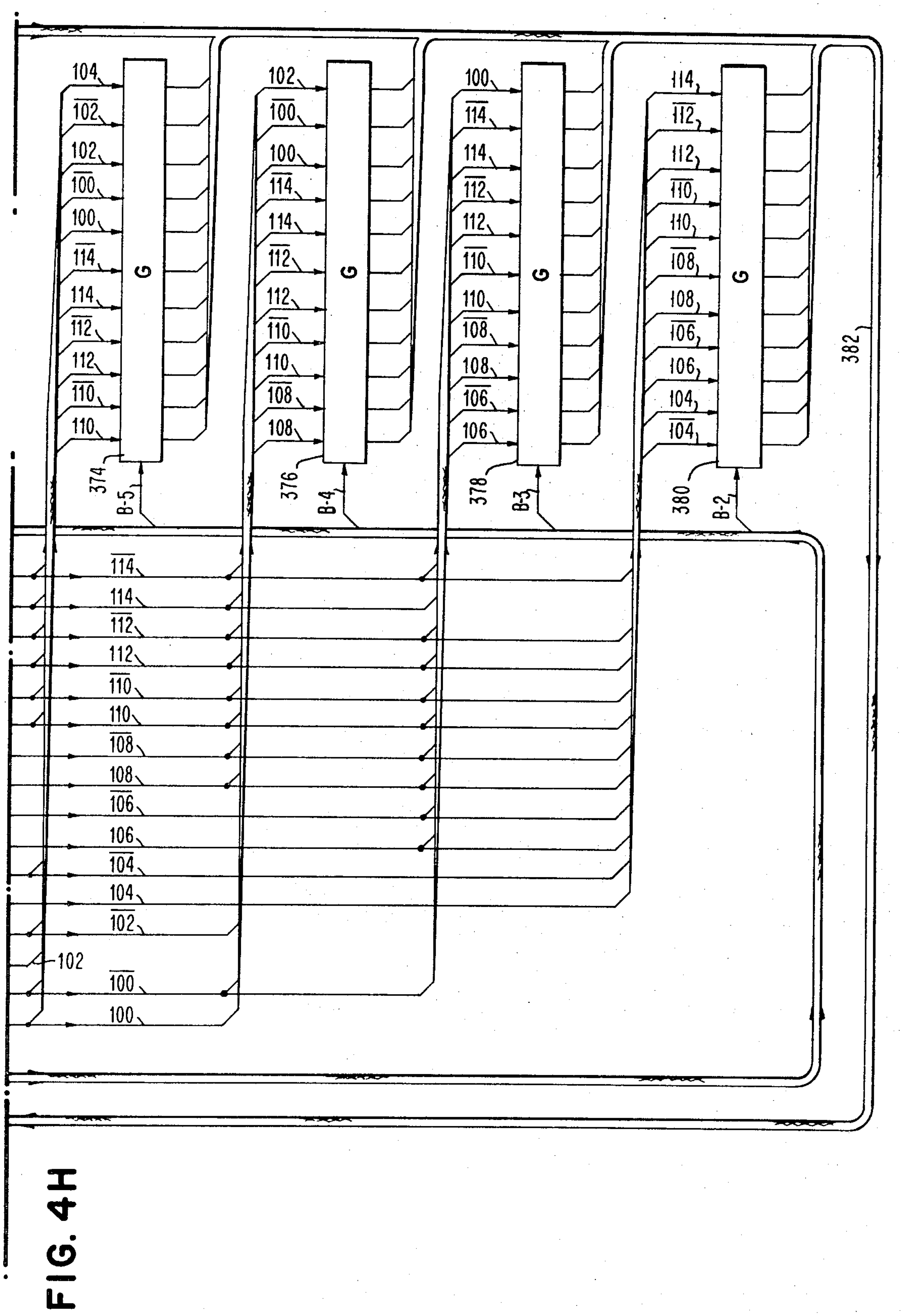
Figure 5E:
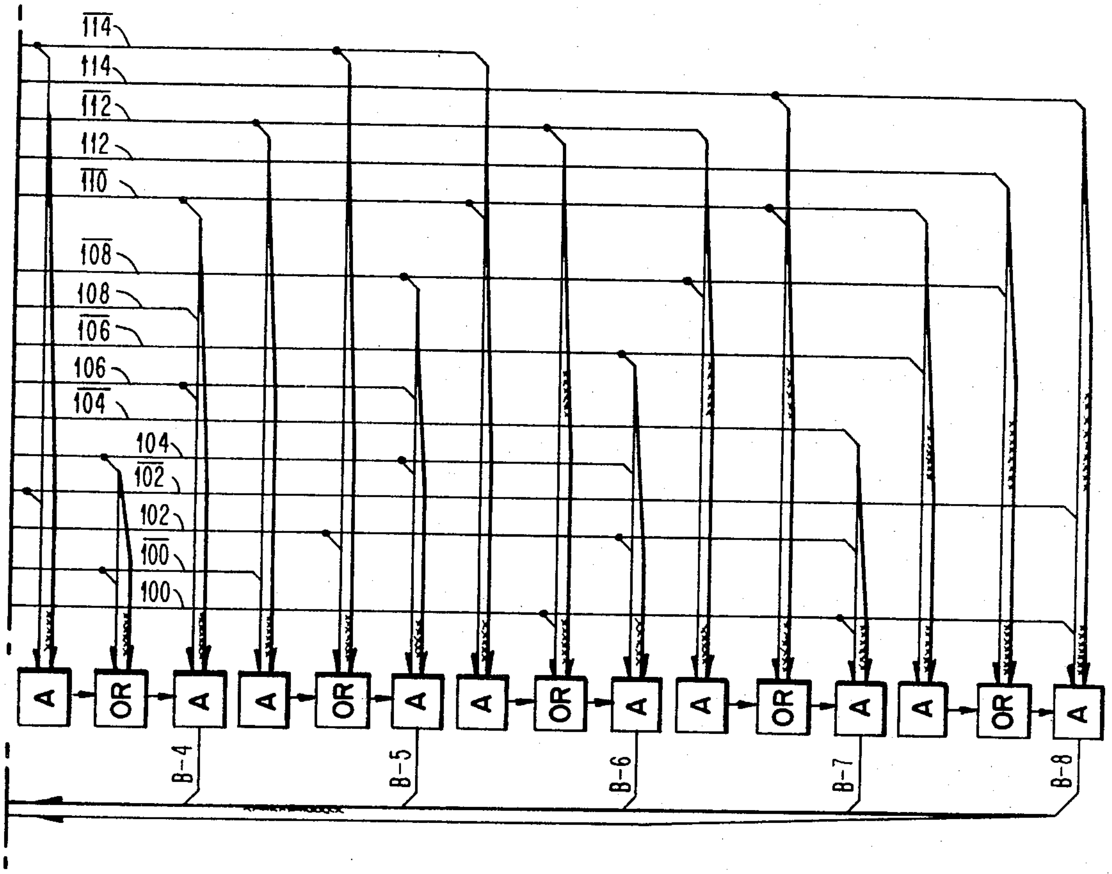
FIGS. 5A through 5E comprise a combination functional and logical block diagram of a fourth embodiment of the present invention.
Figure 5A:
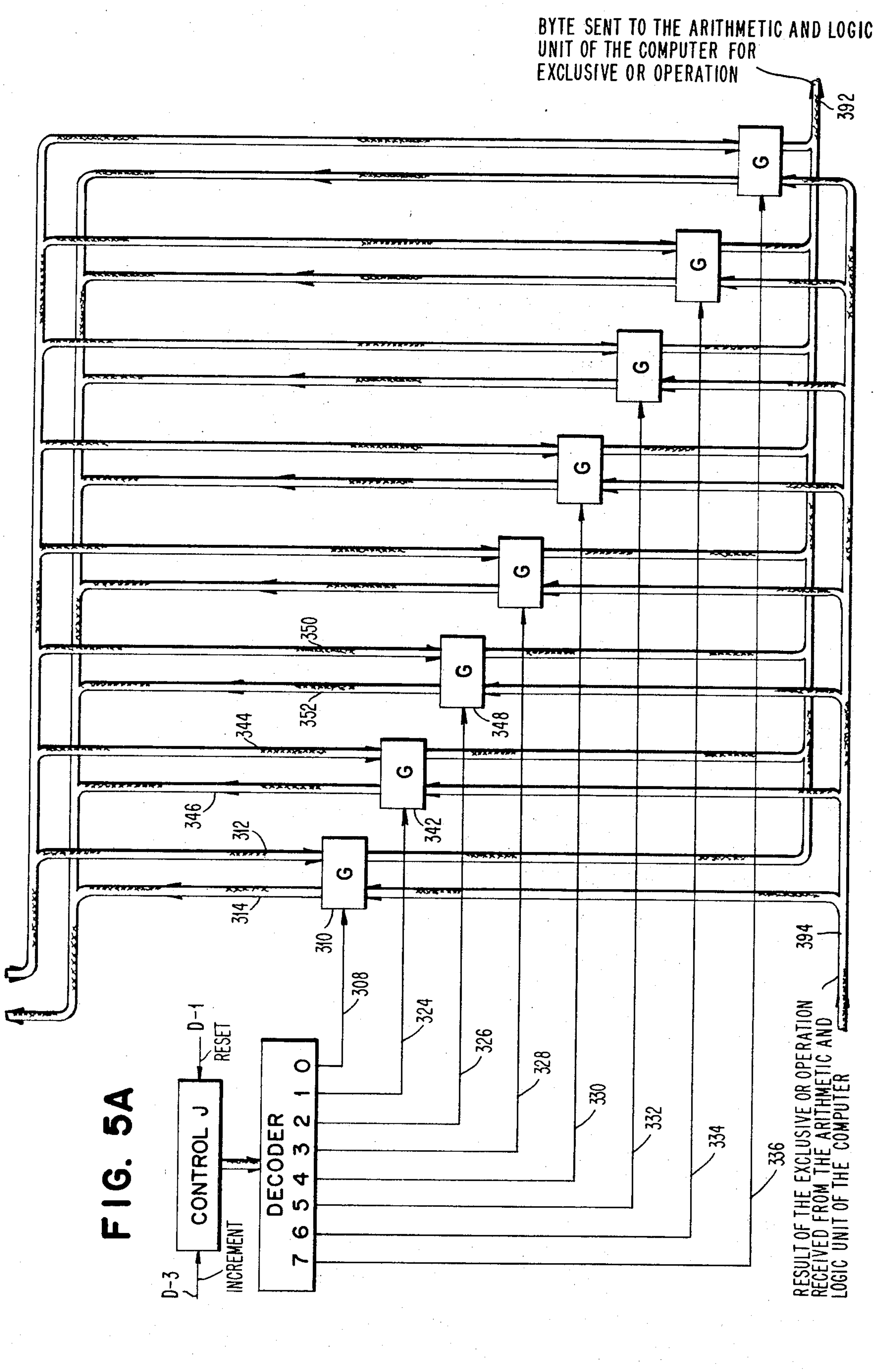
Figure 5B:
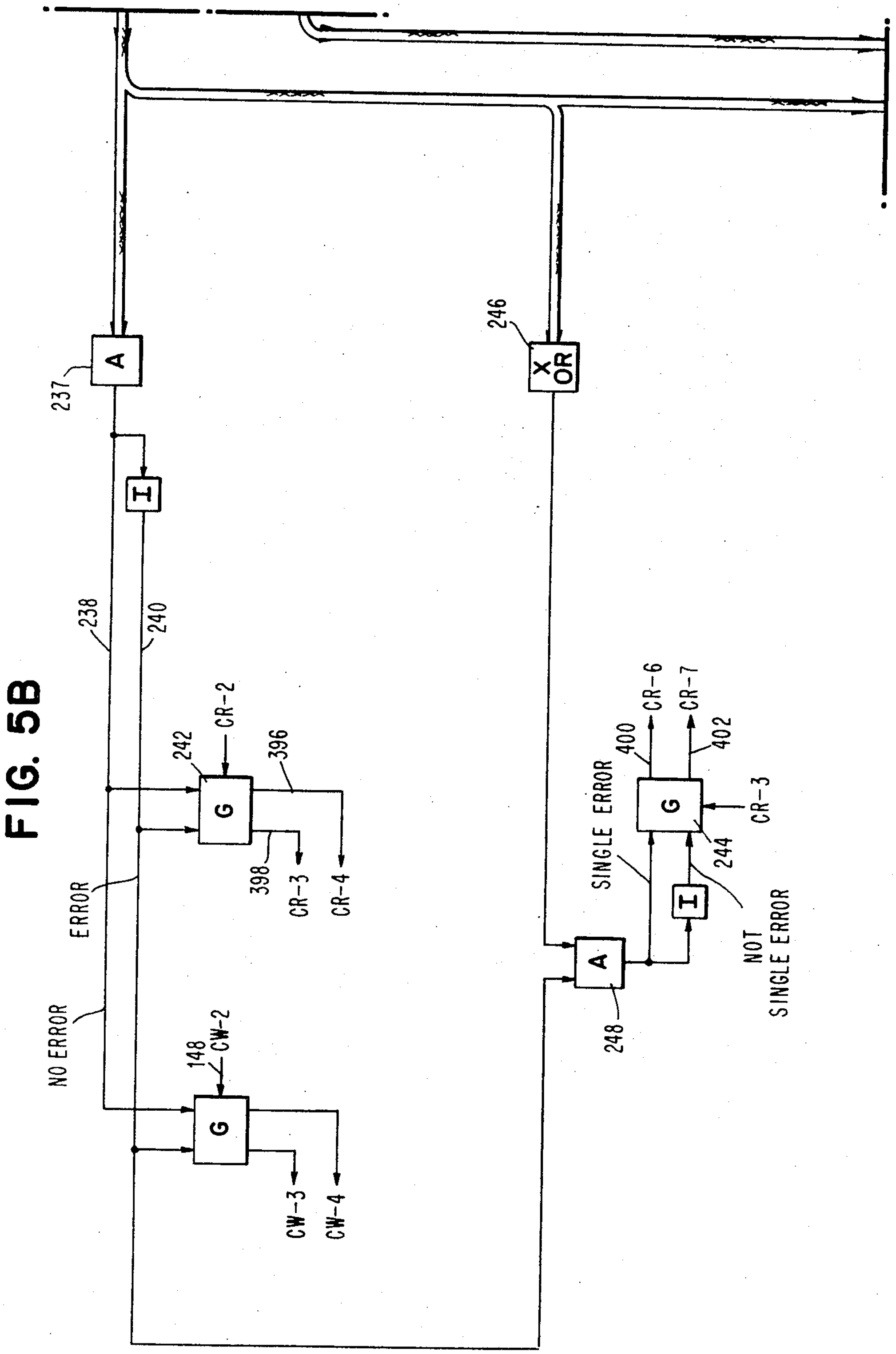
Figure 5C:
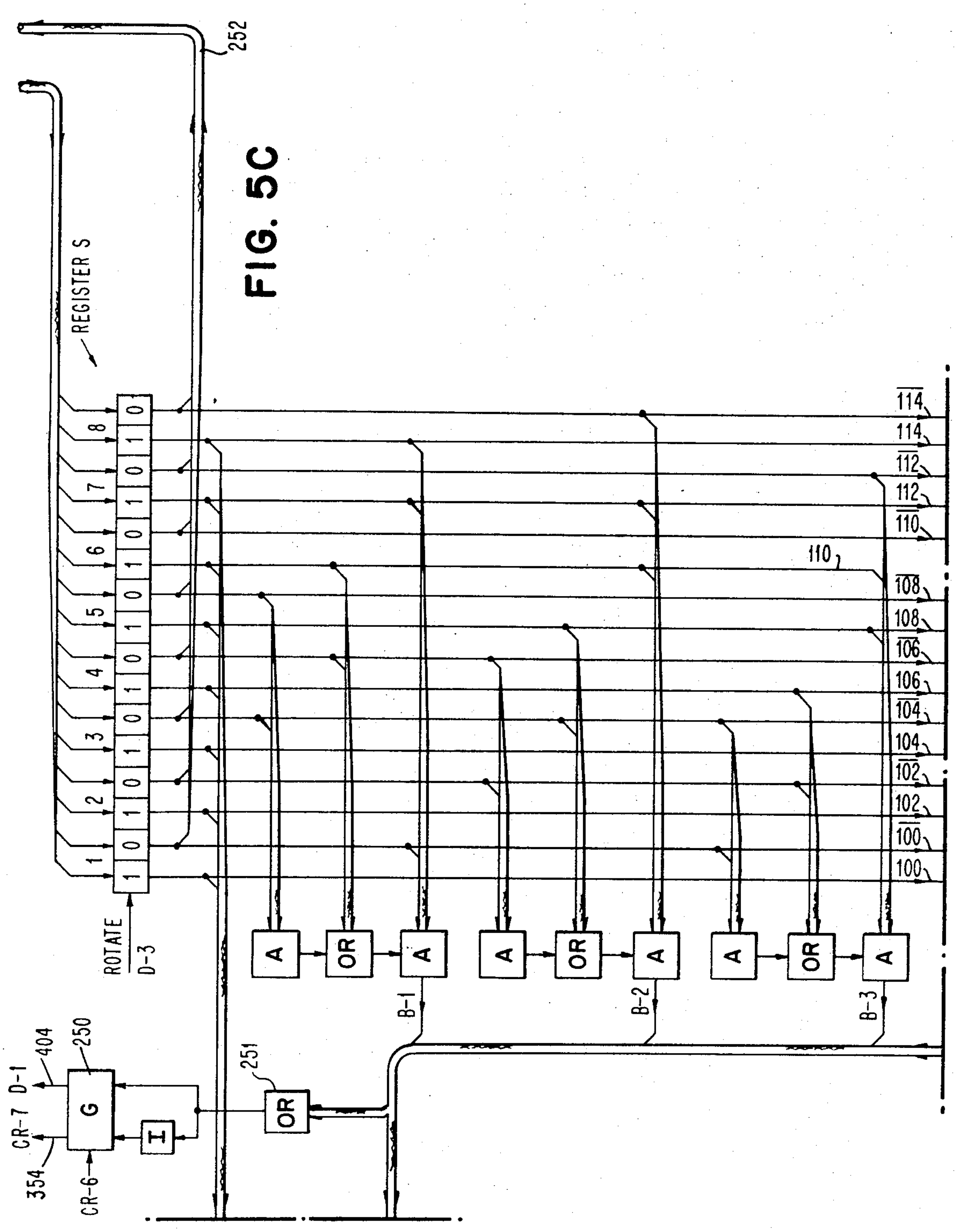
Figure 5D:
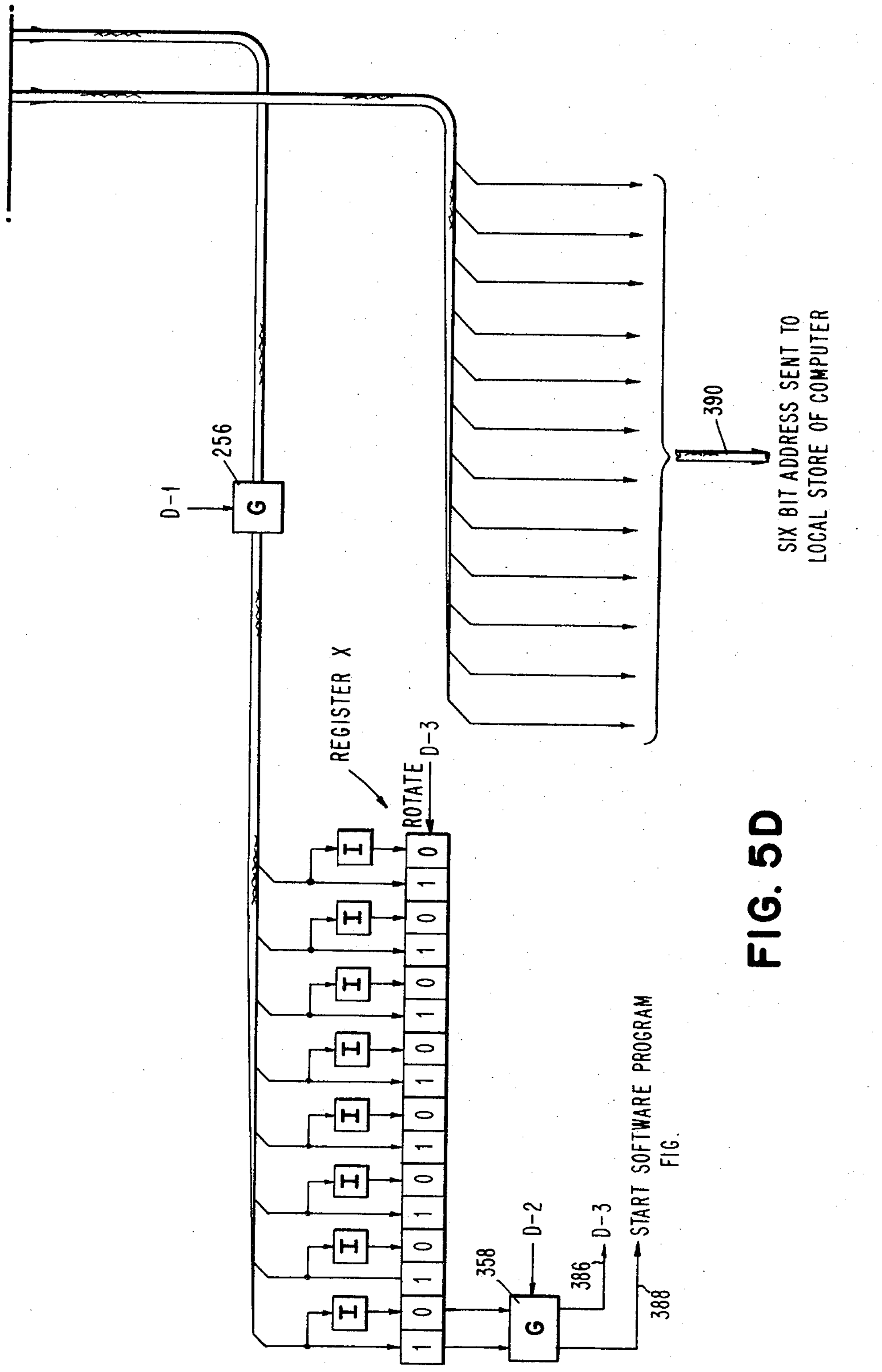

In the embodiments of the FIGS. 2, 3, and 5 the contents of the Register S are continuously rotated (1 → 2, 2 → 3, . . . , 8 → 1) in synchronism with the Control Counter J and the Register X so that each time a new byte is being introduced into the system as a possible candidate for correction, the correct syndrome rotational pattern is maintained in the Register S so that the sixth set of connections shown on FIGS. 2E, 3E, 4E and the address generation circuitry shown on FIG. 5D for addressing the local store will allow the correct syndrome bit-correction pattern to be introduced. It should be noted that on FIG. 4E, the cross-connection matrix is not connected to the Register S bit instead, the effective rotation is obtained by utilizing four gate circuits shown on FIGS. 4G and 4H.

In FIG. 5D, instead of obtaining the actual correction pattern from the Register S, an address is developed from the current setting of the current setting of the Register S which provides an access into a preassigned bit position of a Local store where the proper correction pattern is stored and may be accessed when combined with the byte which has been found to be in error.

In the embodiment of FIG. 2, the clocking-in controls are arranged so that all bytes are examined as candidates for correction. However, the correction pattern specifically will be gated through the correction circuitry only when the incorrect byte is introduced into the correction circuitry. When a correct byte, i.e., without error, is passed through, there will be no correction pattern introduced and the byte will pass through the correction circuitry in unaltered form. The significance of this embodiment is that all eight bytes are passed through the circuitry and the complete set is completed for the correction routine is terminated.

Alternatively, in the embodiment of FIG. 3, a modified system clock is utilized so that each byte beginning with byte 1 is examined until the single incorrect byte is located. After this is corrected, the correction operation is terminated and the correct word has been sent to the CPO for whatever use is to be made the same. The embodiments of FIGS. 2 and 3 are the same in all other respects.

In the embodiment of FIG. 4, the significance of the change in circuitry here is that an indication of the byte in error is sent immediately to the gating controls and the byte in error is gated into the correction circuitry on the first cycle. At the same time, the appropriate gate on FIGS. 4G and 4H is energized to send the correct syndrome pattern into the correction circuitry for correcting the actual bit in error. Thus, in the embodiment of FIG. 4, the complete correction operation is performed at a single cycle of operation. However, as will be appreciated a good deal more, the circuitry is required.

The embodiment of FIG. 5 is similar to the embodiments of FIGS. 2 and 3 in that a rotational scheme is employed utilizing the control counter J, the Register X, and the Register S whereby the contents of the Register X are rotated until the specific byte in which the error resides has been found or is shifted into the leftmost position of the Register X. At this point, the embodiment of FIG. 5 initiates a correction cycle utilizing the arithmetic and logical unit of the CPU to effect the EXCLUSIVE-ORing of the incorrect data byte with the proper correction-bit pattern. In this case, instead of utilizing the contents of the Register S directly through the connection matrix shown on FIGS. 2E, 3E and 4E respectively, the contents of the Register S are utilized to access a set of 64 correction patterns prestored in a special storage unit of the main computer system which would preferably be some sort of a very high reliability read-only store. In this embodiment also, only six bit positions of the Register S need be examined for the purpose of developing the address due to the rotational characteristics of the present coding scheme and wherein the proper rotational relationship is maintained by means of the rotate signal being applied to the Register S each time the system steps through the correction routine. The embodiment of FIG. 5 as with the embodiment of FIG. 3 as soon as the incorrect byte has been located and corrected, the correction cycle terminates. It is believed that a period skilled in the art would be readily able to develop the addressing scheme for the local store accessing from the six bits available in the Register S in this particular detail is not set forth herein.

From the previous general description of the four embodiments of the present invention shown in FIGS. 2, 3, 4 and 5, it will be readily appreciated that the present correction scheme may provide only that circuitry necessary to correct an erroneous byte rather than correcting the entire data word through a parallel correction matrix as was disclosed and described in the copending application Ser. No. 51,302.

Before proceding with a specific description of a typical operation of each of the embodiments of FIGS. 2, 3, 4 and 5, a general description of FIGS. 11, 12, 13, and 14 will be set forth. It will first be noticed that the CR clock of FIG. 10 contains an OR circuit 397. It will be noted that there are four possible clock inputs to the OR circuit in addition to the line 396. Obviously, these four inputs apply respectively to FIGS. 2, 3, 4 and 5 which utilize the four clocks A, B, C and D. The clocks themselves are set forth in the above-referenced FIGS. and in their simplest form comprise a series of single shots which are energized as indicated in the FIGS. and wherein it is understood that unless another enabling input is shown, the turnoff of one clock state will initiate the operation of the adjacent stage to which it is shown to be connected. Thus in FIG. 10 in the CR clock, the turnoff of state CR-1 enables stage CR-2. However, stage CR-3 is enabled by a signal appearing on line 398 rather than the turnoff of CR-2. This convention is followed in the A, B, C and D clocks.

As was stated previously, the overall system operation set forth in the above-referenced copending application Ser. No. 51,302 is exactly the same in the presently disclosed system especially insofar as the basic Read or Write access is concerned. Similarly, the CR and CW clocks and flow charts are substantially the same. In the present docket, the difference is directed in the manner in which an actual signal date error is corrected. This is done under control of the A, B, C, and D clocks for the various embodiments of FIGS. 2, 3, 4 and 5 as will be readily appreciated.

Detailed Description of the Embodiments of FIGS. 2–5.

The following description of the four embodiments of FIGS. 2 through 5 assumes that the syndrome bits have been generated and are currently residing in the Register S in all cases and also that the CR clock has proceeded through CR-6 and the system has branched through gate circuit 250 so that line 404 on FIG. C in all four embodiments is active, thus initiating the single data-error correction sequences of the four embodiments as shown on FIGS. 2 through 5. As stated previously, each of these embodiments is shown as a composite of several figures but for the sake of simplicity, unless a specific reference is being made, the single figure reference will be made, i.e., FIG. 3 rather than FIG. 3A through 3F.

Figure 11:
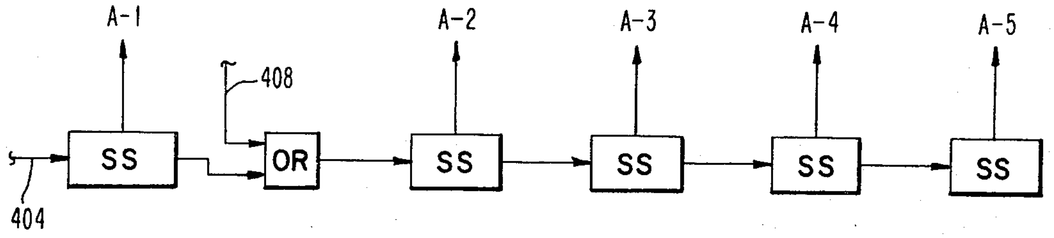
FIG. 11 comprises a logical schematic diagram of the A-Clock which controls the gating of the data and syndrome bits through the correction circuitry of the present invention in the first embodiment of FIGS. 2A through 2F.

Proceeding first to the embodiment of FIG. 2, the specific operation of the embodiment is controlled by the A clock shown on FIG. 11. The actual sequence of events controlled by this clock is shown in the following listing.

| | |
|---|---|
| A-1 | Reset Content J<br>Gate B values to Register X<br>→ A-2 |
| A-2 | Gate byte through correction circuit<br>→ A-3 |
| A-3 | Gate byte from correction circuit back to MDR<br>→ A-4 |
| A-4 | Increment Control J<br>Rotate Register S<br>Rotate Register X<br>→ A-5 |
| A-5 | Test Control J<br>if on 0 → CR-4<br>if not on 0 → A-2 |

On FIG. 2A it will be noted that clock pulse A-1 is applied to the Control Counter J in order to reset it to "0." Concurrently, on FIG. 2E, the A-1 pulse is also applied to gate 256 in order to ingate the values B-1 through B-8 to the Register X also on FIG. 2E. This latter operation will set one of the bit storage flip-flops making up the eight positions of the Register X to a 1 as explained previously. At this point, it is assumed that there is one erroneous byte presently being corrected by this system.

Before proceeding further, it should be noted that the gating matrix appearing on FIGS. 2A, 3A, 4A and 5A comprise a Byte Gating Circuitry indicated on FIG. 1B. This gating circuitry, two of the members of which are designated as gates 342 and 348, operate under control of the Control Counter J and its associated Decoder whereby, depending upon the setting of the Control Counter J, only one of these gates at a time will be energized whereby the appropriate byte in the MDR register on FIG. 6 will be gated down through the correction circuitry and thence from the correction circuitry back into the MDR Register.

Proceeding with the operation of the first embodiment in the A Clock, referring to FIG. 2C. It will be noted that the wires 102, $\overline{102}$, 104, $\overline{104}$, 106, $\overline{106}$, 108, $\overline{108}$, 110, $\overline{110}$, and 112 are brought from the Register S on FIG. 2C by cable 257 to the connection matrix 258 on FIG. 2E. Also on FIG. 2E, it will be noted that there are the eight AND circuits labelled 258 through 272, which have the indicated outputs labelled F1 through F8. Provided the inputs to the AND circuits are satisfied, various ones of the lines F1 through F8 will be at "1" and the others at "0." Thus, the outputs F1 through F8 constitute or provide the bit-correction pattern to the actual correction circuitry on FIGS. 2D, 3D and 4D. It will thus be noted that the connections to the Register S via the cable 257, the connection matrix 258 and the AND circuits 258 through 272 in effect comprise the total connection and logic matrix which produces the correction bits. It should also be noted that only one of the correction bits F1 through F8 will be set to a "1" at any one time. Since one and only one bit of the erroneous data byte will be in error and the provision of a binary "1" to one of the EXCLUSIVE-OR circuits 274 through 288 will cause the other input to be complemented in the output. This is the desired result as will be readily understood. Again, the operation of the correction circuit and the generation of the correction-bit pattern is exactly the same for the embodiments of FIGS. 2, 3, and 4.

Looking again at the Register X on FIG. 2E, the "1" output of the lefthand bit of the Register X is one input to each of the AND circuits 258 through 272. The result of this configuration is that a correction-bit pattern will be produced from these AND circuits on the lines F1 through F8 only when the lefthand bit positions of the Register X is set to a "1" or, in other words, when a particular byte in error is ready to be corrected. As the contents of the Register X are being rotated, the Control J is also being incremented with the result that with each cycle of the Counter J, a different byte is being gated through the correction circuit comprising the EXCLUSIVE-ORs 274 through 288. However, if the lefthand position of the Register X is set to a "0, " no correction pattern will be gated via lines F1 through F8 to these EXCLUSIVE-ORs and thus, the byte will pass through the correction circuitry unchanged and be gated back to the MDR Register. However, when the lefthand bit position of the Register X is at 1, the proper bit-correction pattern on lines F1–F8 will be introduced into the correction circuitry and the erroneous bits within the erroneous byte will be appropriately corrected and the correct byte will be subsequently stored in register 318 on FIG. D.

The specific manner in which the date bytes and correction patterns are gated under control of the A Clock is as follows. When the Control Counter J has been reset to 0 by clock pulse A-1, wire 308 becomes active to enable gate 310. "1" output of each of the eight data bits forming the lefthand byte of the MDR Register extend via cable 312 through the gate 310 and gate 316 on FIG. 2D which has been enabled by clock pulse A-2 and thence via cable 306 to the EXCLUSIVE-OR circuits 274 through 288. The outputs of the EXCLUSIVE-OR circuits obviously set the register 318. The contents of Register 318 are then gated by means of gate 320, which is energized in turn by clock pulse A-3 and this byte passes via cable 322 back through gate 310 to the cable 314 which extends back to the input wires to the same eight data bits in the lefthand byte of the MDR Register. In this manner, if byte 1 of the MDR Register was erroneous, it will have been corrected via the EXCLUSIVE-OR circuits described previously.

Clock pulse A-4 increments the Control Counter J, the Register S, and the Register X period then proceed to A5. The clock pulse A-5 causes the system to branch to CR-4 if the Control Counter J is currently set to a "0."It will be remembered, however, in clock pulse A-4 that the counter has been incremented so that the only time that the counter 0 will be on 0 at clock pulse A-5 time is when the seventh byte has been gated to the correction circuitry and clock pulse A-4 resets the counter to 0.

It should also be noted that the rotation of the Register S is from the eighth bit position back into the first bit position and then the contents of the other stages shift rightward to the next higher order stage. The rotation of the Register X is as indicated and the incrementing of the Control Counter J is also thought to be obvious since it is reset to 0 at the beginning of each correction cycle.

In the manner thus described, successive bytes of an erroneous data word are gated through the correction circuitry and all correct bytes pass therethrough in unaltered form and only the erroneous byte is provided with the proper corrective bit pattern via lines F1 through F8 under control of the Register X. The significance of this embodiment of the invention is that all eight bytes of the data word are sequentially passed through the correction circuitry before the Control Counter J is reset to 0 allowing the system to branch back out to clock sequence CR-4 which tells the system that it can go ahead and that the proper corrections have been made and that the read operation can be completed.

It should be noted that part of the process of gating the contents of Register 318 back into the MDR Register comprises applying clock pulse A-3 to OR circuit 125 on FIG. 6D, which causes the entire contents of the MR Register to be gated through the connection matrix to in effect reload the MDR Register. Unless a change has been made in one of the bytes and said byte is gated into the MR Register, there will be no change in the contents of the MDR Register. However, if one bit is changed via the correction circuitry on the erroneous byte is encountered, that bit will be obviously changed in the MDR Register.

Figure 12:
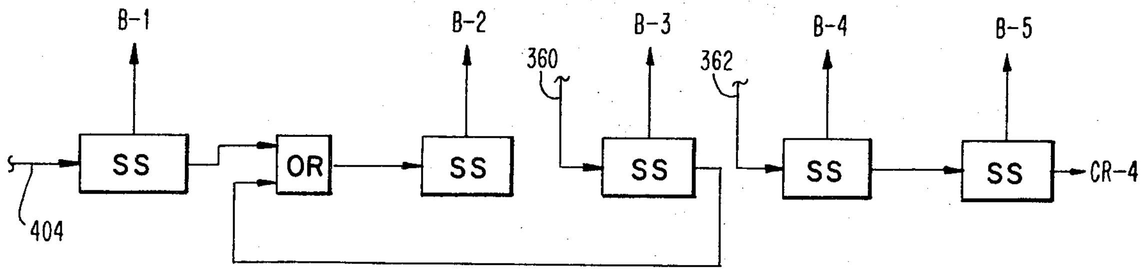
FIG. 12 comprises a logical schematic diagram of the B-clock which controls the gating of the data and syndrome bits through the correction circuitry of the present invention for the embodiment disclosed in FIGS. 3A through 3F.

This completes the description of the first embodiment of the present correction circuitry which is controlled by the A Clock. The second embodiment of the invention shown in FIG. 3 will not be set forth. It should first be noted, as stated previously, that the two embodiments are extremely similar, the primary difference being that the embodiment of FIG. 3 proceeds only until the incorrect byte has been corrected and then the system branches back to allow the clock sequence beginning with CR 4 to proceed. This embodiment operates under control of the B Clock, which is shown in FIG. 12. The sequences and operations performed by the B Clock are set forth in the following listing:

| | |
|---|---|
| B-1 | Reset Counter J<br>Gate B values to Register X<br>→ B-2 |
| B-2 | As left most bit of Register X = 1<br>No → B-3<br>Yes → B-4 |
| B-3 | Increment Counter J<br>Rotate Register S<br>Rotate Register X<br>→ B-2 |
| B-4 | Gate byte through correction circuit<br>→ B-5 |
| B-5 | Gate byte from correction circuit back to MDR<br>→ CR-4 |

Clock pulse B-1 is initiated by line 404 on FIG. 3C when the application of clock pulse CR-6 to the gate 250 to determine whether a single data error has been discovered. Clock pulse B-1 is applied to the Control Counter J on FIG. 3A which resets this counter to 0. B-1 is also applied to the gate 256 on FIG. 3A to gate the contents of lines B-1 through B-8 into the Register X. The clock sequence then proceeds to stage B-2. Clock pulse B-2 is applied to gate 358, which determines whether or not the leftmost bit position of the Register X is set to a 1. If not, the clock sequence branches to B-3 which increments the Counter J, the Register X, and the Register S, and then reverts back to clock stage B-

2. Assuming now that a 1 appears in the leftmost bit position, the clock sequence branches to B-4 via line 362. Pulse B-4 is applied to gate circuit 316 on FIG. 3D, which gates the contents of the particular data byte available on cable 306 via the current setting of the decoder on FIG. 3A into the correction circuitry comprising the EXCLUSIVE-OR circuits 274 through 288. Concurrently, the other input of these EXCLUSIVE-OR circuits will be via the lines F1 through F8 which are energized as a result of the AND circuits 258 through 272 having an enabling input as a result of the "1" setting of the Register X. As with the previous embodiment, the proper bit correction pattern is on lines F1 through F8 as a result of the Register S having been rotated by clock pulse B-3. The turnoff B-4 initiates B-5 which gates the contents of the Register 318 back into the MR Register and subsequently into the MDR Register. The turnoff of B-5 initiates clock sequence CR-4 on FIG. 10 and finished the "memory read" cycle.

In both description of this completes the description of the operation of the embodiment of FIG. 3, it being reiterated that this embodiment differs primarily from that of FIG. 2 in that the correction sequence and thus the rotation of the Registers S and X as well as the Control Counter J terminates upon the correction of the actual byte which is erroneous.

Referring now to the embodiment of FIG. 4 as stated previously in the general description, this embodiment differs from the previous two in that the information from the "byte in error" circuitry appearing on lines B1 through B8 is used to directly cause the erroneous byte to be gated through the gating circuitry appearing on FIGS. 4A down into the correction circuitry on FIG. 4D. Concurrently, with this the proper bit-error correction patterns on lines F1 through F8 is gated directly into the correction matrix on FIG. 4E to produce the proper pattern on lines F1 through F8. Instead of rotating the contents of the Register S to cause the proper correction pattern to be available on the lines F1 through F8 when properly gated, these bit patterns are generated directly via the gate circuits and connections shown on FIGS. 4G and 4H. It is noted that the specific connections shown are valid for the present example only and that the connections would vary with a different data set and coding pattern as explained fully previously.

Figure 13:
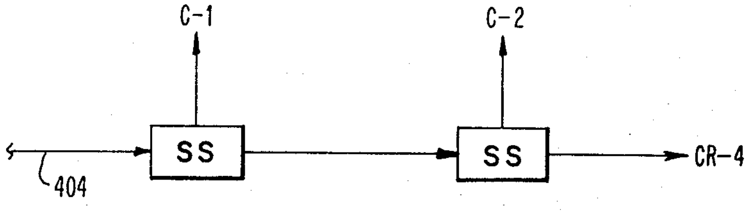
FIG. 13 comprises a logical schematic diagram of the C-Clock, which controls the gating of the data and syndrome bits through the correction circuitry of the present invention for the embodiment disclosed in FIGS. 4A through 4H.

The actual clock sequence for this embodiment is shown in FIG. 13 and comprises only the two stages C1 and C2. The specific functions performed by each clock stage are set forth in the accompanying brief list.

| | |
|---|---|
| C-1 | Gate byte through correction circuit<br>→ C-2 |
| C-2 | Gate byte from correction circuit back to MDR<br>→ C-4 |

It will be noted in examining the embodiment of FIG. 4, that as soon as Register S is engated, one of the lines B1 through B8 will be brought up depending on which logic circuit is satisfied and this line will cause one of the gates on FIG. 4 to be activated as well as one of the gates on FIGS. 4G–4H. Applying pulse C-1 to the gate circuit 316 on FIG. 4D will cause the erroneous byte to be gated over cable 306 to the EXCLUSIVE-OR correction circuitry. Concurrently, the proper correction-bit pattern will have been brought through one of the gates 366 through 380 via cable 382 on FIGS. 4D and 4H over into the connection matrix 258 and the associated AND gates to automatically place the proper bit correction pattern on the lines F1 through F8. The turnoff of clock stage C-1 initiates clock stage C-2 which pulse is applied to a gate circuit 320 on FIG. 4D and also with the OR circuit 125 on FIG. 6D to gate the corrected byte back into the MR Register and subsequently back into the MDR Register. The turnoff of stage C-2 initiates the clock stage CR-4 of FIG. 10 to continue the memory "read" operation. This completes a description of the embodiment of FIG. 4.

Figure 14:
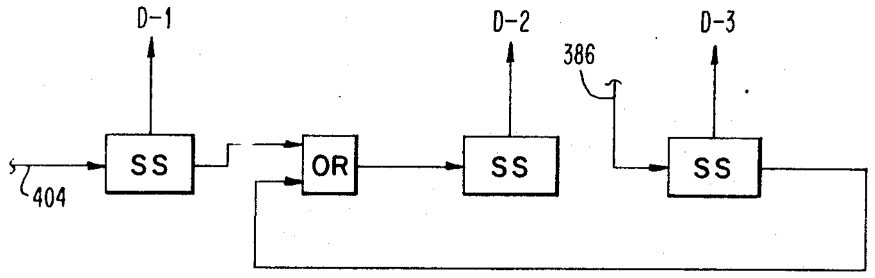
FIG. 14 comprises a logical schematic diagram of the D-clock, which controls the gating of the data and syndrome bits through the correction circuitry and to the ALU of the main system in accordance with the embodiment disclosed in FIGS. 5A through 5E.

The embodiment of FIG. 5 differs from FIGS. 2 and 3 only insofar as the actual hardware utilized to make the bit correction in the erroneous byte. Thus, the gating circuitry on FIG. 5A operates under control of the Counter J and its associated decoder, the syndrome bits of the Register S are rotated under control of the D Clock as is the Register X and the Control Counter J. The contents of the byte identification circuitry are similarly ingated to load the Register X and the actual correction method is initiated when the leftmost bit position of the Register X is set to a "1." This embodiment operates under control of the D Clock, which is shown in FIG. 14 and which is initiated on line 404 on FIG. 5C becomes active as described previously. The sequences of steps in the disclosed hardware FIG. 5, which is controlled by the B Clock, is shown in the following list:

| | |
|---|---|
| D-1 | Reset Counter J<br>Gate B values to Register X<br>→ D-2 |
| D-2 | At leftmost bit of Register X=1<br>No → D-3<br>Yes → Start software program (see FIG. 29) |
| D-3 | Increment Counter J<br>Rotate Register S<br>Rotate Register X<br>→ D-2 |

D-1 resets the Control counter J to a 0 and ingates the lines B-1 through B-8 on FIGS. 5C and 5E through the gate circuit 256 on FIG. 5B into the Register X. The turnoff of D-1 initiates D-2. This clock stage sets the leftmost bit of the Register X by applying a pulse to gate circuit 358 on FIG. 5D. Assuming first that it is set to a zero, line 386 becomes active and clock stage D-3 is actuated which increments the Control J, and rotates the Register S and the Register X. The turnoff D-3 goes back to clock stage D-2, which again has the contents of the Register X and cable 1 appears in the leftmost bit position. At this point, the system branches to line 388 which initiates a software program which would preferably be stored in a very high reliability local store such as some sort of a read-only memory and would perform the following operations within the arithmetic and logical unit. It will first be understood that there will be 64 possible bit-correction patterns stored in this local store which would be addressed in accordance with the bits appearing on the cable 390 shown on FIG. 5D but which emenates from the Register S which was rotated during the D Clock sequencing to place a particular set of bits thereon in accordance with the byte which is found to be in error. The following is a list of the operations which this microprogram would envoke.

1. State — (line 308 leaves action)

2. Send Address on cable 390 to Address Register of Local Store.

3. "Read" Access Local Store.

4. Send Data word from local store to Arithmetic and Logic Unit.

5. Send Byte on Cable 392 to Arithmetic and Logic Unit.

6. Perform EXCLUSIVE-OR operation in Arithmetic and Logic Unit.

7. Send Result of EXCLUSIVE-OR Operation back to cable 394.

8. to CR-4

It is believed that the above sequences would be readily programmable by a person skilled in the art and an actual program listing is not included herein as such would very considerably depending on the particular type of machine and/or local store which would be used. Similarly, the manner in which the addresses are generated from the six bits via cable 390 to a set of decoding circuitry would also be obvious.

The operation performed by the microprogram is exactly the same as that performed in the other three embodiments, i.e., the erroneous bit is sent via cable 394 to the arithmetic and logic unit and this is combined with the data-bit correction pattern obtained from the local store in an EXCLUSIVE-OR circuit such as is commonly available in such arithmetic and logic units and the corrected byte is then returned back to the system and gated into the MR Register. The completion of the microprogram provides a signal which reloads the MDR Register from the MR Register and reinitiates the clock step CR-4.

CONCLUSIONS

The above description of the detailed operation of the embodiment of FIG. 5 completes the description of the four disclosed embodiments of the present invention. As stated previously the subject matter of the present invention is directed to the correction of single data errors which have been detected utilizing an SEC/DED Hamming code. In the preferred embodiment of the invention, the particular code utilized with a given data configuration, i.e., the number and size of the bytes in a data word, is chosen to be rotational in nature. As abundantly explained previously, the rotational characteristic of the code allows the syndrome bits generated from the data and check bits to be rotated in a special register which in turn permits correction to be made using an absolute minimum of correction decoding circuitry. By the correction decoding circuitry is meant the required connections to logically combine the various syndrome bits to provide the desired error correction. The rotational characteristic allows a single byte sized decoder to provide the necessary bit-correction patterns when the contents of the syndrome register are appropriately rotated.

Closely associated with this inventive concept is the discovery that by appropriately interrogating and combining the initial syndrome bits generated, an immediate identification of the byte which contains the single erroneous bit may be made. This latter feature, together with the rotational characteristics of the code, allows corrections to be made a byte at a time instead of necessitating correction of the entire data word in parallel as is conventional with such error-correction systems.

It should be noted, however, that the byte identification feature may be utilized without the rotational feature such as disclosed in the embodiment of FIG. 4. In this embodiment, a saving of time is effected since only the incorrect byte need be gated through the correction circuitry. However, it will be apparent that some additional circuitry is required as a result of not utilizing the rotational feature available in the coding pattern.

Thus, the present invention solves at least one of the problems normally inherent in any system utilizing SEC/DED Hamming code. That is, that a great deal of special purpose hardware must be dedicated to the requisite error detection and correction. The present invention at least reduces the required correction hardware by a factor of approximately $1/m$ where $m$ is the number of bytes in a data word.

While the invention has been particularly shown and described with reference to preferred embodiments thereof, it will be understood by those skilled in the art that various changes in form and details may be made therein without departing from the spirit and scope of the invention.

What is claimed is:

1. In a computer memory system including: a main data storage facility, means for storing single-error correction/double-error detection Hamming coded data words in said storage facility, means operable during a read cycle of said memory for generating an error detection and correction syndrome bit pattern from the SEC/DED coded data, and means for determining if a single data-bit error is present in the accessed memory word, the improvement which comprises a single data bit error correction system operative in response to a single data-bit error indication including, means for generating a signal indicative of which byte of the data word is erroneous, error-correction circuit means for correcting a single data bit in an erroneous data byte, means for selectively gating bytes of said data word to said correction circuit means, means for obtaining a bit-correction pattern from said syndrome bits for said erroneous data byte, means for gating said bit-correction pattern to said correction circuit means concurrently with said erroneous data byte whereby said incorrect bit in said erroneous data byte is corrected, means for synchronizing the bit-correction pattern generating means, the erroneous byte gating means, and the bit-correction pattern gating means, and means for returning the corrected byte to the memory system data register after correction.

2. A single data bit error correction system as set forth in claim 1 wherein said correction circuitry comprises a plurality of two input EXCLUSIVE-OR circuits wherein there is one EXCLUSIVE-OR for each bit position of said byte, one of the inputs to said EXCLUSIVE-OR comprising a data bit and the other input comprising one of the correction bits of said bit-correction pattern whereby only one of said correction-pattern bits will be set to a "1, " which will cause the data bit passing through the associated EXCLUSIVE-OR to which said "1" is the other input to be inverted, thus correcting the erronous bit.

3. A single data-bit error-correction system for use with a computer memory system as set forth in claim 1 including:

means for successively gating all of the bytes of a memory data word through said correction circuit means, and means for gating the correction-bit pattern concurrently into said correction circuit means, only when the erroneous data byte is concurrently gated thereto, said correction means effecting no alteration in a data byte passing therethrough unless there is a correction-bit pattern present concurrently, and means for terminating the correction cycle subsequent to the gating of the last data byte through said correction means.

4. A single data bit error system as set forth in claim 1 including means for immediately gating the erroneous data byte into the correction circuitry as soon as said means for generating an indication of the erroneous data byte produces such an indication, and means to actuate the bit correction pattern gating means in response to said erroneous data-byte indication for gating the proper bit correction pattern for the erroneous data byte from the previously generated syndrome bits.

5. A single data-bit error-correction system as set forth in claim 4 wherein said SEC/DED Hamming code is rotational in nature and the syndrome bits generated therefrom also maintain said rotational characteristic and are placed in a syndrome storage means, wherein said means for generating the bit-correction pattern includes as many syndrome gating circuit means as there are data bytes and wherein each syndrome gating-circuit means is connected to said syndrome storage means to in effect rotate the contents thereof one bit position for succeeding data bytes, and means connected to said means for generating the "erroneous byte" signal to actuate the related syndrome gating-circuit means so that a syndrome bit pattern, selectively rotated, is transmitted through a single connection matrix means which generates the actual correction-bit pattern.

6. A single data-error correction system as set forth in claim 1 wherein the SEC/DED Hamming code utilized is rotational in nature and wherein the syndrome bits generated therefrom maintain said rotational characteristic, said system including syndrome storage means, means for sequentially rotating said syndrome storage means so that the contents rotate one bit position during each sequence of rotation, means for sequentially gating successive data bytes accessed from said memory system to said correction-circuit means, a single connection matrix for producing a bit-error correction pattern from said syndrome bit pattern stored in said syndrome storage means, whereby a different correction-bit pattern is produced by said connection matrix depending upon the rotational position of the contents of said syndrome storage means, means for indicating when the erroneous data byte is present in said correction-circuit means, and means for concurrently gating the correction-bit pattern from said connection matrix into said correction-circuit means.

7. A single data bit error correction system as set forth in claim 6 wherein said means for synchronizing comprises, counter and decoder means connected to sequentially control the byte gating means, shift register means for storing the "erroneous bytes" indications wherein only the register position initially corresponding to the erroneous byte is set to a "1,"

said syndrome storage means comprises a shift register in which the initial contents correspond to the rotational syndrome pattern corresponding to the first byte of the data word, and means for concurrently incrementing the counter and shifting both said shift register means as each data byte is examined for an error.

8. A single data-bit error-correction system as set forth in claim 6 including:

means for sequentially gating data bytes through said correction circuit means beginning with a predetermined byte, means for continuing this sequence until the erroneous data byte has been gated to the correction circuit means and the correction-bit pattern is concurrently gated to said correction-circuit means whereby the erroneous byte is corrected and means for terminating the correction sequence upon the actual correction of the erroneous data byte.

9. A single data-bit correction system as set forth in claim 1 wherein the error correction means comprises the main computer arithmetic and logic unit, said system including local storage means for storing predetermined correction-bit patterns for each byte of said data word, and means for generating the address of a particular correction-bit pattern for a particular erroneous data bit from the contents of said syndrome bit storage means whereby when the erroneous data byte is sent to the main computer arithmetic and logic unit the proper bit-correction pattern will be concurrently accessed from said local storage means and sent to said arithmetic and logic unit wherein the single bit-error correction will be effected in the erroneous data byte and means for returning the corrected data byte back to the memory system data register.

10. A single data-bit error-correction system as set forth in claim 9 wherein the SEC/DED Hamming code utilized is rotational in nature and wherein the syndrome bits are sequentially rotated as different data bytes are gated to said system arithmetic and logical unit for potential correction and means for indicating that a particular data byte is the erroneous data byte whereby the currently rotated syndrome bits are utilized to generate the address in the local store for accessing the proper bit-correction pattern for the particular erroneous data byte.

11. A single data-bit error-correction system for use with a computer memory system as set forth in claim 10 wherein the operation of the arithmetic and logic unit in the central computer for making the single data-bit error-correction in the erroneous data byte and for accessing the local storage for the correction-bit pattern and for combining the two to correct the erroneous data byte is performed by means of a microprogram sequence stored in the central computer.

12. In a computer memory system including a main data storage facility, means for storing m-byte, *n*-bit single-error correction/double-error detection Hamming coded data words in said storage facility, means operable during a read cycle of said memory for generating an error detection/correction syndrome bit pattern from the SEC/DED coded data and for storing same, and means for determining if a single data bit error is present in the accessed memory word, the improvement which comprises:

a single data bit error correction system operative in response to a single data bit error indication including, logic circuit means connected to said syndrome storage means for generating an m-bit signal indicative of which byte of the data word is erroneous, a single, connection matrix and logic circuit means for generating an *n*-bit correction pattern from said syndrome bits for said erroneous data byte,

*m*-EXCLUSIVE-OR error-correction circuit means for correcting a single data bit in an erroneous data byte, one of the inputs to each said EXCLUSIVE-OR circuits comprising a data bit and the other input comprising one of the correction bits of said bit-correction pattern,

*m-gating means for selectively gating bytes of said data word to said correction circuit means,* means for gating said *n*-bit correction pattern to said correction circuit means concurrently with said erroneous data byte whereby said incorrect bit in said erroneous data byte is corrected, and means for returning the correct byte to the memory system data register.

13. A single data bit error correction system as set forth in claim 12, said system including wherein said SEC/DED Hamming Code is rotational in nature and the syndrome bits generated therefrom also maintain said rotational characteristic and are placed in said syndrome storage means, means for obtaining immediately from said *m*-bit erroneous data byte signal an indication of which byte is erroneous, means utilizing said last-derived signal for immediately gating the erroneous data byte to said error-correction circuit means, said means for generating the bit-correction pattern including *m*-gating circuit means and wherein each said *m*-gating-circuit means is connected to said syndrome storage means to in effect rotate the contents thereof one bit position for each succeeding data byte, means for utilizing said erroneous byte signal to actuate the proper bit correction pattern gating means to gate the proper bit correction pattern to said correction circuit means concurrently with said erroneous data byte.

14. A single data bit error correction system as set forth in claim 12 including means for synchronizing the bit-correction pattern generating means, the erroneous byte gating means, and the bit-correction pattern gating means comprising:

counter and decoder means connected to sequentially control the byte gating means, shift register means for storing the erroneous byte indications, wherein only the register position initially corresponding to the erroneous byte is set to a unique predetermined recognizable binary designation, said syndrome storage means comprising a shift register in which the initial contents thereof correspond to the rotational syndrome pattern associated with the first byte of the data word, and common pulse source means for concurrently incrementing the counter and shifting both said shift register means as each data byte is examined for an error, and means for selectively actuating said common pulse source means to sequentially access successive bytes of said data word until at least the erroneous byte has been corrected in said correction circuit means.

* * * * *